(12) United States Patent
Strinden et al.

(10) Patent No.: US 11,243,677 B2
(45) Date of Patent: Feb. 8, 2022

(54) SYSTEMS AND METHODS FOR EASE OF GRAPHICAL DISPLAY CONFIGURATION DESIGN IN A PROCESS CONTROL PLANT

(71) Applicant: FISHER-ROSEMOUNT SYSTEMS, INC., Round Rock, TX (US)

(72) Inventors: Daniel R. Strinden, Austin, TX (US); Julian K. Naidoo, Cedar Park, TX (US); Cindy A. Scott, Georgetown, TX (US); Adrian A. Sanchez, Manila (PH); Camilo Fadul, Round Rock, TX (US); Cristopher Ian Sarmiento Uy, Metro Manila (PH); Robert B. Havekost, Austin, TX (US); Stephen G. Hammack, Austin, TX (US); Matthew Joseph Sullivan, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 57 days.

(21) Appl. No.: 16/117,326

(22) Filed: Aug. 30, 2018

(65) Prior Publication Data

US 2019/0102072 A1 Apr. 4, 2019

Related U.S. Application Data

(60) Provisional application No. 62/566,679, filed on Oct. 2, 2017.

(51) Int. Cl.
*G06F 3/0483* (2013.01)
*G06F 3/0484* (2013.01)
(Continued)

(52) U.S. Cl.
CPC ....... *G06F 3/04847* (2013.01); *G05B 19/409* (2013.01); *G06F 3/0483* (2013.01);
(Continued)

(58) Field of Classification Search
CPC ...... G06F 3/04847; G06F 3/0483; G06F 8/38; G06F 9/451; G05B 19/409;
(Continued)

(56) References Cited

U.S. PATENT DOCUMENTS 6,732,296 B1 5/2004 Cherny et al.
7,043,311 B2 5/2006 Nixon et al.
(Continued)

OTHER PUBLICATIONS

"Configuration Software Suite," DeltaV Product Data Sheet (2013).
(Continued)

*Primary Examiner* — Jennifer N Welch
*Assistant Examiner* — Parmanand D Patel
(74) *Attorney, Agent, or Firm* — Marshall, Gerstein & Borun LLP

(57) ABSTRACT

A graphical display configuration system of a process control system provides features within the configuration environment that allow a user to create, define, edit, and easily preview the runtime appearance and/or runtime behavior of graphical elements and/or graphical displays in-line with the configuration workflow of the user, without having to compile and/or download draft graphical configurations into the operating environment of a process plant supported by the process control system, and/or without requiring specialized scripts to be implemented within the operating environment of the process plant. Previews of runtime appearances and/or runtime behaviors of draft configurations of graphical elements and/or graphical displays (that are eventually to be executed within the operating environment of the process control system) are able to generated and presented exclusively within the configuration environment, e.g., for testing and/or verification.

29 Claims, 22 Drawing Sheets

(51) Int. Cl.
*G05B 19/418* (2006.01)
*G05B 19/409* (2006.01)

(52) U.S. Cl.
CPC .............. *G05B 19/41835* (2013.01); *G05B 2219/32128* (2013.01)

(58) Field of Classification Search
CPC .... G05B 2219/32128; G05B 19/41835; G05B 19/4185; G05B 19/0423; H04L 67/12
See application file for complete search history.

(56) References Cited

U.S. PATENT DOCUMENTS

| | | | |
|---|---|---|---|
| 8,127,241 B2 | 2/2012 | Blevins et al. | |
| 9,417,626 B2 | 8/2016 | Jones et al. | |
| 9,501,208 B2 | 11/2016 | Jundt et al. | |
| 2003/0035138 A1* | 2/2003 | Schilling | G06Q 30/06 358/1.15 |
| 2004/0153804 A1* | 8/2004 | Blevins | G05B 19/0428 714/33 |
| 2005/0007249 A1 | 1/2005 | Eryurek et al. | |
| 2005/0155015 A1 | 7/2005 | Novacek | |
| 2007/0179641 A1* | 8/2007 | Lucas | H04L 67/28 700/83 |
| 2007/0266329 A1* | 11/2007 | Gaudette | G06F 8/34 715/763 |
| 2008/0141166 A1* | 6/2008 | Goldberg | G06F 3/04817 715/788 |
| 2009/0019360 A1* | 1/2009 | Lynggaard | G06Q 10/10 715/243 |
| 2009/0187477 A1* | 7/2009 | Bardin | G06Q 30/02 705/14.69 |
| 2010/0115450 A1* | 5/2010 | Scott | G06F 3/0483 715/777 |
| 2010/0222899 A1 | 9/2010 | Blevins et al. | |
| 2010/0222902 A1 | 9/2010 | Eldridge et al. | |
| 2011/0061007 A1 | 3/2011 | Shah et al. | |
| 2011/0230980 A1 | 9/2011 | Hammack et al. | |
| 2014/0100669 A1* | 4/2014 | Hammack | G06F 3/0484 700/17 |
| 2014/0303756 A1 | 10/2014 | Tarnutzer et al. | |
| 2017/0102678 A1 | 4/2017 | Nixon et al. | |
| 2017/0102693 A1 | 4/2017 | Kidd et al. | |
| 2017/0102694 A1 | 4/2017 | Enver et al. | |
| 2017/0102696 A1 | 4/2017 | Bell et al. | |
| 2017/0103103 A1 | 4/2017 | Nixon et al. | |
| 2018/0143600 A1* | 5/2018 | Grabowski | G05B 13/04 |

OTHER PUBLICATIONS

"Control Studio On-Line," DeltaV Distributed Control System (2013).
"DeltaV Operate Themes," DeltaV Distributed Control System (2016).
"DeltaV™ Operate," DeltaV Distributed Control System (2017).
"Human Machine Interfaces for Process Automation Systems," American National Standard (2015).
"Operator Station Software Suite," DeltaV Product Data Sheet (2016).
CIE2000 Calculator. Publicly available prior to Sep. 4, 2018. Retrieved from the Internet at: <URL:http://colormine.org/delta-e-calculator/cie2000>.
Rosenholtz et al., "Measuring Visual Clutter," Journal of Vision, 7(2):1-22 (2007).
"Wires and Connections Circuit Schematic Symbols, Electronics Textbook," (2017).
Extended European Search Report for Application No. 18196722.5, dated Mar. 15, 2019.
Extended European Search Report for Application No. 18196723.3, dated Mar. 18, 2019.

* cited by examiner

120

| DRAFT / WORKING | PUBLISHED |
|---|---|
| 112<br><br>VIEW 1 DRAFT 1  VIEW 1 DRAFT 2<br><br>VIEW 2 DRAFT 1<br>⋮<br>VIEW N DRAFT 1  . . .  VIEW N DRAFT m | VIEW 1 PUB.  VIEW 2 PUB. 1  VIEW 2 PUB. 2<br><br>VIEW 3 PUB.  . . .  VIEW N PUB. |
| 115<br><br>ELEMENT 1 DRAFT 1<br><br>ELEMENT 2 DRAFT 1  ELEMENT 2 DRAFT 2<br>⋮<br>ELEMENT P DRAFT 1  . . .  ELEMENT P DRAFT q | ELEMENT 1 PUB.  ELEMENT 2 PUB.  ELEMENT 3 PUB.<br><br>ELEMENT 4 PUB.  . . .  ELEMENT P PUB. |

Display1

Palette

Search

Faceplate Elements
- Alarm Detail
- DCC/AT Interlocks
- Tab Element
- Title Information

Data Elements
- Chart
- Datalink
- Simple Bar Graph
- Sparkline

Write Elements
- Button
- Checkbox
- Datalink
- Skew Buttons
- Slider

Alarm Elements
- Alarm Detail
- Alarm Summary List
- Top Alarm Indication

Function Block Eleme..
- DCC/AT Interlocks
- SEQ Details
- STD Details

Palette | Selection Pane

Interaction
4 Elements, 8 Interactions

Group1
  Click Open Faceplate
  Hover Tooltip
  Right Click Open Display
Group1; Valve1
  Click
Group2
  Click Open Faceplate
  Hover Tooltip
  Right Click Open Display
Valve2
  Click Copy All to Clipboard Interaction | Graphics Configuration 576
578
574a
574b
574c

SYSTEMS AND METHODS FOR EASE OF GRAPHICAL DISPLAY CONFIGURATION DESIGN IN A PROCESS CONTROL PLANT

CROSS-REFERENCE TO RELATED APPLICATIONS

This application claims priority to and the benefit of the filing date of U.S. Provisional Patent Application No. 62/566,679, filed on Oct. 2, 2017, entitled "Systems And Methods For Graphical Display Configuration and Usage in Process Control Plants," the entire disclosure of which is hereby expressly incorporated by reference herein.

FIELD OF THE DISCLOSURE

This disclosure relates generally to process control systems, and, more particularly, to systems and methods for configuring graphics utilized by operators to view and respond to real-time conditions within and operations of an on-line, industrial process plant.

BACKGROUND

Distributed process control systems are used in chemical, pharmaceutical, petroleum, oil and gas, metals and mining, pulp and paper, or other types of industrial process plants to control one or more industrial processes to thereby generate or produce one or more physical products from raw materials and/or other types of source materials. As such, distributed process control systems typically include one or more process controllers and input/output (I/O) devices communicatively coupled to at least one host or operator interface device and to one or more field devices via analog, digital or combined analog/digital buses, or via a wireless communication link or network. The field devices, which may be, for example, valves, valve positioners, switches, and transmitters (e.g., temperature, pressure, level and flow rate sensors), are located within the process environment and generally perform physical or process control functions, such as opening or closing valves, or measuring process parameters to control one or more industrial processes executing within the process plant or system. Smart field devices, such as field devices conforming to the well-known Fieldbus protocol may also perform control calculations, alarming functions, and other control functions commonly implemented within a controller. The process controllers, which are also typically located within the plant environment, receive signals indicative of process measurements made by sensors or field devices and/or other information pertaining to the field devices and execute a controller application that runs, for example, different control modules that make process control decisions, generate control signals based on the received information, and coordinate with the control modules or blocks being performed in the field devices, such as HART®, Wireless HART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator interfaces, personal computers, or computing devices, data historians, report generators, centralized databases, or other centralized administrative computing devices that are typically, but not always, placed in control rooms or other locations away from the harsher plant environment. Each of these hardware devices typically, though not always, is centralized across the process plant or across a portion of the process plant. These hardware devices run applications that may, for example, enable an operator to view current statuses and operations of processes that are running within the plant, perform functions with respect to controlling a process and/or operating the process plant, such as changing settings of the process control routine, modifying the operation of the control modules within the controllers or the field devices, viewing alarms generated by field devices and controllers, simulating the operation of the process for the purpose of training personnel or testing the process control software, keeping and updating a configuration database, etc. The data highway utilized by the hardware devices, controllers, and field devices may include a wired communication path, a wireless communication path, or a combination of wired and wireless communication paths.

As an example, the DeltaV™ control system, sold by Emerson, includes multiple applications stored within and executed by different user interface devices located at diverse places within a process plant, and in some instances, remotely from the process plant. Each of these applications provides a user interface (UI) to allow a user (e.g., a configuration engineer, an operator, a maintenance technician, etc.) to view and/or modify aspects of the process plant operation and configuration. Throughout this specification, the phrase "user interface" or "UI" is used to refer to an application or screen that allows a user to view or modify the configuration, operation, or status of the process plant. Similarly, the phrase "user interface device" or "UI device" is used herein to refer to a device on which a user interface is operating, whether that device is stationary (e.g., a workstation, wall-mounted display, process control device display, etc.) or mobile (e.g., a laptop computer, tablet computer, smartphone, etc.).

A configuration application, which resides in one or more user workstations or computing devices included in a configuration environment of a process plant, enables configuration engineers and/or other types of users to create or change process control modules and download these process control modules via a data highway to dedicated distributed controllers that operate in an operating environment of the process plant (which is also referred to interchangeably herein as an "operations environment" of the process plant) to control one or more processes during runtime or real-time operations. Typically, these control modules are made up of communicatively interconnected function blocks, which perform functions within the control scheme based on inputs thereto and which provide outputs to other function blocks within the control scheme. Each dedicated controller and, in some cases, one or more field devices, stores and executes a respective controller application that runs the control modules assigned and downloaded thereto to implement actual process control functionality.

The configuration application also allows configuration engineers and/or other users to create or change operator Human-Machine Interfaces (HMIs) or display views that are used by an operator viewing application to display data (e.g., as the data is generated in real-time during runtime operations of the process plant) to an operator and to enable the operator to change various settings, such as set points, within the process control routines during runtime operations. The operator viewing applications that provide the operator HMIs or display views are executed on one or more user interface devices (e.g., operator workstations, operator tablets, operator mobile devices, etc.) included in the operations environment of the process plant (or on one or more remote computing devices in communicative connection with the operator workstations and the data highway). The operator HMIs or display views receive data from the controller applications via the data highway and display this data to operators or other users using the UIs at the user interface devices. Similarly, the operator HMIs or display views may also receive data (e.g., real time data) from other control components or elements included in the operating environment of the process plant other than control modules, such as controllers, process controllers, field devices, I/O cards or devices, other types of hardware devices, units, areas, and the like. A data historian application is typically stored in and executed by a data historian device that collects and stores some or all of the data provided across the data highway while a configuration database application may run in a still further computer attached to the data highway to store the current process control routine configuration, the current operator display configuration, and data associated therewith. Alternatively, the configuration database may be located in the same workstation as the configuration application.

As noted above, the operator viewing applications typically execute in one or more of the operator user interface devices and provide operator HMIs or display views to the operator or maintenance persons regarding the operating state of the control system, control components, and/or devices within the plant, e.g., while the plant is operating in real-time or runtime to control one or more industrial processes. Generally speaking, operator HMIs or display views are used by operators in day-to-day operations (which may, for example, be 24/7 operations) of the process running in the process plant to view and respond to real-time conditions within the process and/or the process plant. At least some of these operator HMIs or display views may take the form of, for example, alarming displays that receive alarms generated by controllers or devices within the process plant, control displays indicating the operating state of the controllers and other devices within the process plant, maintenance displays indicating the operating state of the devices within the process plant, etc. Display views typically execute in the runtime or real-time operating environment of the process plant, and are generally configured to present, in known manners, information or data received from process control modules, devices, and/or other control objects that are also operating within the runtime or real-time operating environment of the process plant. In some known systems, display views have a graphical element (e.g., a graphical representation or graphic) that is associated with a physical or logical element included in the operating environment and that is communicatively tied to the physical or logical element to receive data about the physical or logical element and updates thereto over time, e.g., during runtime operations of the process plant. The graphical element may be configured or defined to dynamically change its appearance on the display screen based on the received data to illustrate, for example, that a tank is half full, to illustrate the flow measured by a flow sensor, etc. As such, as the data provided by the physical or logical element in the operating environment of the process plant changes over time (e.g., is repeatedly or continually updated over time), the appearance of the corresponding graphical element is changed on the display screen accordingly.

In some currently-known operator display configuration architectures for industrial process control systems, each operator workstation independently manages its own alarms and access to real-time control data that is generated by process control modules, devices, and/or other control objects. As such, to customize an operator HMI or display view for a particular operator workstation, custom graphical properties, values, and/or configurations of various display view elements (e.g., graphical and other types of elements) that are to be presented on the runtime display view are defined and associated with the display view within a graphical configuration environment, and the definition or configuration of the display view is downloaded from the configuration environment into the particular operator workstation of the operating environment for execution. Often, custom scripts are programmed into the configuration of the display view so that desired behavior and/or appearances of the various display view elements and/or of the display view itself are executed at the particular operator workstation. Additionally, if the display view appearance or behavior is desired to be modified or changed for the particular operator workstation, typically the modifications must be applied to the configuration of the display view in the graphical configuration environment, and then the modified configuration must be downloaded from the configuration environment for execution at the particular operator workstation. In most cases, this requires that the particular operator workstation cease its execution of the current display view in order for the modified display view configuration to be received and executed at the particular operator workstation.

In other currently-known operator display configuration architectures for industrial process control systems, a common configuration for a display view is downloaded from the graphical configuration environment to multiple operator workstations. To effect particular, customized appearances and/or behaviors of the display view at a particular operator workstation, though, during runtime the particular operator workstation at which the display view is executing must query or otherwise communicate with the graphical configuration environment to obtain necessary information (such as particular configurations of various graphics, runtime values, and/or other information) to effect or implement the desired customized appearances and/or behaviors of the display view at the particular operator workstation. As modern-day process plants may include hundreds of operator workstations, the messages that are sent and received between operator workstations and back-end display configuration servers add a significant load to process plant communication networks.

Recently, the Center for Operator Performance (COP), a research consortium that addresses human capabilities and limitations in industrial process control operating environments through research, collaboration, and human factors engineering, and the International Society of Automation (ISA) have been working to help advance industrial process control system Human Machine Interfaces (HMIs) and their ease of use, for example, by suggesting improvements and guidelines in Human Centered Design (HCD). For example, the American National Standard ANSI/ISA-101.01.-2015 entitled "Human Machine Interfaces for Process Automation Systems" and approved on Jul. 9, 2015 addresses "the philosophy, design, implementation, operation, and maintenance of Human Machine Interfaces (HMIs) for process automated systems including multiple work processes throughout the HMI lifecycle . . . [t]he standard defines the terminology and models to develop and HMI in the work processes recommended to effectively maintain the HMI throughout the lifecycle" (ANSI/ISA-101.01-2015, page 9).

SUMMARY

As discussed above, generally speaking, operator Human-Machine Interfaces (HMIs) or display views are used by operators during the runtime operations of the process to view and respond to conditions within the process and/or process plant. The effectiveness of process plant operators in operating the process safely and effectively, as well as in detecting and responding to various process and process plant conditions depends, in a large part, on how well the operator HMIs or display views are designed (e.g., by the configuration engineers or other operator HMI designers). However, recent changes in how industrial process plants are operated greatly affect the design of operator HMIs. For example, continued competitive pressure in process control industries has led to a significant expansion in the span of a portion of the process for which a single operator is responsible. With this expansion, the number of process graphics that the single operator must monitor and utilize to safely and efficiently run the process has increased several-fold. In fact, in a present day process plant, operators are commonly expected to navigate through hundreds of process graphics. In addition, trends such as increasing intelligence in plant equipment and more automated and advanced control logic in process control industries have led to a significant increase in the level of complexity of the portion of the process for which a single operator is responsible.

Further, the work space that is utilized by a single operator may include one to many consoles or monitors in a variety of sizes. The number and sizes of monitors and/or consoles are often determined by the size and complexity of the portion of the process being monitored by the operator. Additionally, when an operator's work space includes multiple monitors, each monitor typically has a custom layout defined for each monitor's respective monitor size, location, and portion of the process being monitored. For example, the custom layout defines what displays should open on which monitor, how displays on different monitors interact with each other, etc.

Still further, as no two process plants or operating sections within a plant are alike, in practice each process plant often develops and designs its own, custom operational philosophies, graphics, and/or graphical standards for effective operation. Accordingly, the operator HMI graphics, strategies, design, layout, navigation, and/or operator actions may be, to a significant extent, custom built for different operating sections and/or different process plants.

These and other factors have made the configuration engineer's job of designing operating HMIs ever more difficult. Often, configuration engineers must create complex, programmatic extensions to operator HMIs to customize or hone various capabilities for particular operating sections and/or plants. Commonly, configuration engineers must utilize programming languages like Visual Basic or C, and/or other custom programs to create the desired operator HMI. This results in a complex operator HMI suite that is difficult and time consuming to develop, extend, troubleshoot, and maintain.

At least some of the aspects of the novel graphical display configuration and usage systems and methods disclosed herein address these and other modern-day HMI challenges, as well as provide a platform for industrial process control HMI design and use that is not only flexible, easy to use, and easy to maintain, but also helps engineers design and implement their process plant's operating environment HMI in light of current process automation HMI standards and best practices.

In an embodiment, a graphical display configuration and usage system for an industrial process plant (also interchangeably referred to herein as a "graphical configuration system" or a "graphical configuration and usage system") includes a graphical display configuration application that executes in a configuration environment of the process plant. The graphical display configuration application includes a user interface via which various operator HMIs or display views are able to be created, defined, designed, and/or published, e.g., by a configuration engineer. A configured or defined display view, when downloaded into and executing in the operating or operations environment of the process plant, provides an operator or other user with real-time (e.g., continually or repeatedly updated) operating states and statuses of various components and operations associated with the process. As such, a display view typically includes respective links between one or more display view elements presented on the display view and one or more control modules, devices, or control objects that are executing to control the process within the operating environment of the process plant so that, upon download and execution of a published configuration of the display view at a user interface device that is communicatively connected to an operating environment of the process plant (e.g., at an operator workstation, remote computing device, mobile device, etc.), respective indications of one or more values or other data that are provided or generated by the one or more control modules, devices, or control objects while executing in the operating environment of the process plant are presented and repeatedly updated on the executing display view, e.g., via the linked display view elements.

The graphical display configuration system also includes a centralized configuration database or library that stores published configurations or definitions of display views as well as published configurations or definitions of display view elements that are available to be included on or otherwise associated with various display views. In some embodiments, the centralized configuration database or library also stores draft configurations or definitions of display views and/or display view elements. Examples of display view elements include graphics, properties, links to control modules, devices, objects, and/or other control components or elements that are disposed in the operating environment, global variables, parameters, areas or subsections of the display view, and/or other elements and/or portions of the display view. In an example, for a particular display view, the centralized configuration database or library stores a published configuration of the particular display view and optionally one or more working or draft configurations of the particular display view. The published configuration of the particular display view may include one or more published configurations of various display view elements that are to appear on the executing display view, and the published display view configuration is available for download and execution in the operating environment of the process plant. On the other hand, the one or more working or draft configurations of the particular display view are excluded from download and execution in the operating environment of the process plant. That is, working or draft configurations of display views and of display view elements are prevented from being downloaded and executed in the operating environment of the process, and instead are maintained within the configuration environment, e.g., for edit, modification, testing, etc.

The published configuration or definition of the particular display view includes one or more user controls via which an operator or user of the user interface device included in the operating environment of the process plant is able to change an appearance of the executing display view at his or her respective user interface device on-line during runtime operations. For example, the operator, via the one or more user controls at his or her respective user interface device, is able to change the appearance of a graphic, a property of a graphic, an area of the display view, a property and/or content of the area of a display view, a location of a graphic on the display view, particular data sourced by a control module, device, or control object that is to be displayed, and/or other appearances of elements, areas, or portions of the executing display view. Significantly, the graphics configuration system allows the change to the appearance of the executing display view in the operating environment to be implemented at the operator workstation solely based upon contents of the published configuration or definition of the display view that is executing at the operator workstation. That is, the downloaded, published configuration of the display view allows the operator to customize or change the appearance of the display view at the operator's workstation while the display view is executing on-line in the operating environment without having to halt the execution of the display view, without having to download a different configuration of the display view, and without the display view and/or the operator workstation needing to obtain data from the configuration environment to implement the desired change.

Accordingly, when the published configuration or definition of the particular display view is downloaded to multiple user interface devices or operator workstations included in the operating environment of the process plant, each operator or user is able to customize or change the local appearance of the instance of the display view that is executing at his or her workstation independently of other operators or users, and without his or her workstation communicating with the graphical display configuration application and configuration library. Some of the operator-initiated changes or customizations may be implemented in a mutually exclusive manner at a particular workstation, for example, a fill property of a graphic is selected by the operator to be either gray or blue, but not both gray and blue. Some of the changes may not be mutually exclusive at a particular workstation (e.g., the changes may be cumulative or independently applied), such as when the operator drags and drops graphics that are indicative of particular control elements that the operator desires to actively (and easily) monitor into an Active Monitor or Watch window included on the display view.

In an embodiment, a method for configuring graphical displays for runtime or real-time operations of a process plant includes receiving, via a user interface of a graphical display configuration application executing in a configuration environment of a process plant, a definition of a display view. The display view typically includes various graphical elements that are representative of respective control modules, devices, and/or other control components (also referred to interchangeably herein as control elements or control objects) that execute or operate in the operating environment of the process plant, e.g., to control at least a portion of the process, such as controllers, process controllers, field devices, I/O cards or devices, other types of hardware devices, units, areas, etc. Accordingly, the definition of the display view defines a link between a graphical element presented on the display view and a control component or object so that, upon download and execution of the display view in the operating environment of the process plant, one or more values or other data that are generated by the control component or control object while executing in the operating environment of the process plant to control the process are presented and repeatedly updated on the executing display view via the linked graphical element. The graphical element may be, for example, a graphic that is indicative or representative of a particular control module, device, or other control component or object.

Additionally, typically the definition of the display view includes respective definitions of various other graphical portions, elements, or components (and/or combinations thereof) that are included on and/or otherwise associated with the display view, such as graphics, text, properties of graphics and/or text (e.g., color, contrast, animations, etc.), global variables, parameters, different areas of the display view, respective properties and/or content of different areas of the display view, different locations of various graphics, text, and/or areas on the display view, and/or particular operating data that is sourced by control modules, devices, and/or other control objects and their linkages to respective graphics or other elements on the display view, to name a few. Other such graphical portions, elements, and/or components which may be included on and/or otherwise associated with the display view may include, for example, display view hierarchies, display view layouts, timers, embedded links, animation conversion functions, data references, project or plant standards, display themes, content languages and/or indications thereof, application languages and/or indications thereof, tab areas on display views, tooltips and/or other contextual displays, trends and other representations of historized parameters, watch or active monitoring areas, and/or other features, aspects, and/or functionalities provided by the present graphical configuration and usage systems and methods described herein. Still other graphical portions, elements, and/or components which may be included on and/or otherwise associated with the display view may include custom and/or default Graphic Element Module (GEM) configurations (e.g., such as described in co-owned U.S. patent application Ser. No. 15/692,450 filed on Aug. 31, 2017 and entitled "Derived and Linked Definitions with Override," and/or may include operator display switching preview configurations and/or objects associated therewith (e.g., such as described in co-owned U.S. patent application Ser. No. 15/243,176 filed on Aug. 22, 2016 and entitled "Operator Display Switching Preview."

At any rate, for ease of reading herein, such graphical portions, elements, or components (and combinations thereof) that are included on or otherwise associated with a display view are generally referred to interchangeably herein as "graphical display view elements," "graphical elements," "graphical components," "display view elements," "display elements," or "display view components." Typically, each display view element may be defined by or configured using its own separate object, where the object may be created, modified, stored, and published via the graphical configuration and usage systems and methods described herein.

Some of the definitions of display view elements may define mutually exclusive options, for example, the color theme of the display view in its entirety may be selectively changed by the operator between various defined color themes, or the language that is used on the display view is switched by the operator between Arabic and French. Some of the definitions of display view elements may not be mutually exclusive, such as when the operator drags and drops graphics that are indicative of particular control elements that the operator desires to actively (and easily) monitor into an Active Monitor or Watch window included on the display view.

With particular regard to a display view configuration or definition that defines a plurality of properties that are selectable in the operating environment in a mutually exclusive manner for application to a particular portion of the executing display view, the method includes receiving, via the user interface of the graphical display configuration application, an indication of a selection of a subset of a plurality of user interface devices (e.g., operator workstations) that are included in the operating environment of the process plant and to which respective instances of the display view definition are to be downloaded for execution. The selected subset of user interface devices may include more than one user interface device, if desired. The method further includes downloading the definition of the display view (which may be a published definition) into each user interface device included in the selected subset of user interface devices for execution in the operating environment of the process plant, thereby enabling the particular portion of the executing display view to be selectively changed, in the mutually exclusive manner between the plurality of properties, independently at each user interface device. Accordingly, each user interface device implements its respective change solely based upon the contents of the downloaded definition of the display view executing at the user interface device, and without communicating with any other device included in the configuration environment of the process plant to effect or implement the change. Thus, a first operator may select "flashing" for a particular property of a particular graphic included on the display view at his or her workstation, while another operator may select "no flashing" for the particular property of the particular graphic included on the display view at his or her workstation. Both selections are fully supported and solely implemented by the respective downloaded definitions of the display view executing at the workstations without having to halt execution of the display view at the workstations, without having to download a different configuration of the display view to the workstations, and without the display views and/or the operator workstations obtaining data or other information from the configuration environment to implement the desired change.

It is noted that while the disclosure herein refers to graphical display views and graphical display view elements, this is for illustrative and ease of discussion purposes only, and is not meant to be limiting. Indeed, any one or more of the aspects discussed herein with respect to graphical display views may easily be applied to Graphical Element Module (GEM) classes, for example. Similarly, any one or more of the aspects discussed herein with respect to graphical display view elements may be easily applied to GEMs, for example. As is commonly known, GEMs are linked graphical configurable shapes that are reusable and that may be combined with other shapes and/or behaviors. Typically, GEMs provide one or more visual representations or views of a configurable shape, and the definition or configuration of a GEM is stored separately from definitions or configurations of usage/instances of that GEM in specific display views and other objects (e.g., to enable sharing the GEM definition/configuration). As such, the graphical configuration systems and methods described herein and any one or more aspects thereof may be easily applied to GEMs and GEM classes.

BRIEF DESCRIPTION OF THE DRAWINGS

FIG. 2B is a block diagram of an example implementation of the graphical configuration library included in the graphical configuration and usage of system of FIG. 2A;

FIGS. 5E and 5F illustrate an example of indicating or showing operator interactions that have been and/or that are being configured into graphical display view and display view elements while using a graphical display configuration application;

DETAILED DESCRIPTION

Figure 1A:
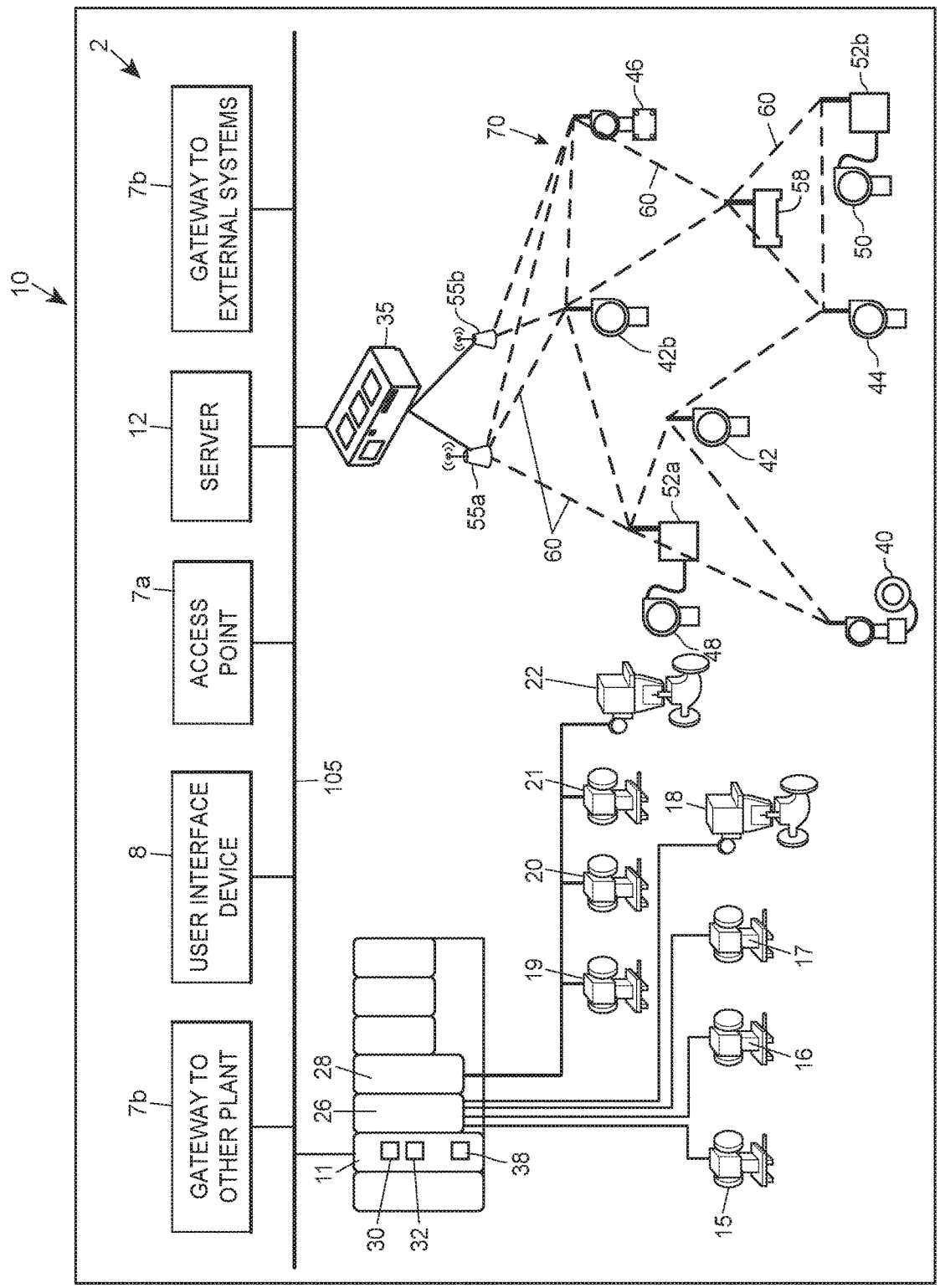
FIG. 1A is a block diagram of a distributed process control network located within a process plant including the graphics configuration and usage systems and methods of the present disclosure.

FIG. 1A is a block diagram of an exemplary process control network or system 2 operating in a process control system or process plant 10 with and/or in which embodiments of the novel graphical display configuration and usage system described herein may be utilized. The process control network or system 2 may include a network backbone 5 providing connectivity directly or indirectly between a variety of other devices. The devices coupled to the network backbone 5 include, in various embodiments, combinations of one or more access points 7a, one or more gateways 7b to other process plants (e.g., via an intranet or corporate wide area network), one or more gateways 7c to external systems (e.g., to the Internet), one or more user interface (UI) devices 8 which may be stationary (e.g., a traditional operator workstation) or mobile computing devices (e.g., a mobile device smart-phone), one or more servers 12 (e.g., which may be implemented as a bank of servers, as a cloud computing system, or another suitable configuration), controllers 11, input/output (I/O) cards 26 and 28, wired field devices 15-22, wireless gateways 35, and wireless communication networks 70. The communication networks 70 may include wireless devices 40-58, which include wireless field devices 40-46, wireless adapters 52a and 52b, access points 55a and 55b, and a router 58. The wireless adapters 52a and 52b may be connected to non-wireless field devices 48 and 50, respectively. The controller 11 may include a processor 30, a memory 32, and one or more control routines 38. Though FIG. 1A depicts only a single one of some of the devices that are directly and/or communicatively connected to the network backbone 5, it will be understood that each of the devices could have multiple instances on the network backbone 5 and, in fact, that the process plant 10 may include multiple network backbones 5.

The UI devices 8 may be communicatively connected to the controller 11 and the wireless gateway 35 via the network backbone 5. The controller 11 may be communicatively connected to wired field devices 15-22 via input/output (I/O) cards 26 and 28 and may be communicatively connected to wireless field devices 40-46 via the network backbone 5 and a wireless gateway 35. The controller 11 may operate to implement a batch process or a continuous process using at least some of the field devices 15-22 and 40-50. The controller 11, which may be, by way of example, the DeltaV™ controller sold by Emerson, is communicatively connected to the process control network backbone 5. The controller 11 may be also communicatively connected to the field devices 15-22 and 40-50 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1A, the controller 11, the field devices 15-22, 48, 50 and the I/O cards 26, 28 are wired devices, and the field devices 40-46 are wireless field devices.

In operation of the UI device 8, the UI device 8 may, in some embodiments, execute a user interface ("UI"), allowing the UI device 8 to accept input via an input interface and provide output at a display. The UI device 8 may receive data (e.g., process related data such as process parameters, log data, sensor data, and/or any other data that may be captured and stored), from the server 12. In other embodiments, the UI may be executed, in whole or in part, at the server 12, where the server 12 may transmit display data to the UI device 8. The UI device 8 may receive UI data (which may include display data and process parameter data) via the backbone 5 from other nodes in the process control network or system 2, such as the controller 11, the wireless gateway 35, and/or the server 12. Based on the UI data received at the UI device 8, the UI device 8 provides output (i.e., visual representations or graphics, some of which may be updated during run-time) representing aspects of the process associated with the process control network or system 2, allowing the user to monitor the process. The user may also affect control of the process by providing input at the UI device 8. To illustrate, the UI device 8 may provide graphics representing, for example, a tank filling process. In such a scenario, the user may read a tank level measurement and decide that the tank needs to be filled. The user may interact with an inlet valve graphic displayed at the UI device 8 and input a command causing the inlet valve to open.

In certain embodiments, the UI device 8 may implement any type of client, such as a thin client, web client, or thick client. For example, the UI device 8 may depend on other nodes, computers, UI devices, or servers for the bulk of the processing necessary for operation of the UI device 8, as might be the case if the UI device is limited in memory, battery power, etc. (e.g., in a wearable device). In such an example, the UI device 8 may communicate with the server 12 or with another UI device, where the server 12 or other UI device may communicate with one or more other nodes (e.g., servers) on the process control network or system 2 and may determine the display data and/or process data to transmit to the UI device 8. Furthermore, the UI device 8 may pass any data related to received user input to the server 12 so that the server 12 may process the data related to user input and operate accordingly. In other words, the UI device 8 may do little more than render graphics and act as a portal to one or more nodes or servers that store the data and execute the routines necessary for operation of the UI device 8. A thin client UI device offers the advantage of minimal hardware requirements for the UI device 8.

In other embodiments, the UI device 8 may be a web client. In such an embodiment, a user of the UI device 8 may interact with the process control system via a browser at the UI device 8. The browser enables the user to access data and resources at another node or server 12 (such as the server 12) via the backbone 5. For example, the browser may receive UI data, such as display data or process parameter data, from the server 12, allowing the browser to depict graphics for controlling and/or monitoring some or all of the process. The browser may also receive user input (such as a mouse click on a graphic). The user input may cause the browser to retrieve or access an information resource stored on the server 12. For example, the mouse click may cause the browser to retrieve (from the server 12) and display information pertaining to the clicked graphic.

In yet other embodiments, the bulk of the processing for the UI device 8 may take place at the UI device 8. For example, the UI device 8 may execute the previously discussed UI. The UI device 8 may also store, access, and analyze data locally.

In operation, a user may interact with the UI device 8 to monitor or control one or more devices in the process control network or system 2, such as any of the field devices 15-22 or the devices 40-50. The user may interact with the UI device 8, for example, to modify or change a parameter associated with a control routine stored in the controller 11. The processor 30 of the controller 11 implements or oversees one or more process control routines (stored in a memory 32), which may include control loops. The processor 30 may communicate with the field devices 15-22 and 40-50 and with other nodes that are communicatively connected to the backbone 5. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be defined and implemented by a user through the UI device 8. The control routines may be stored in any desired type of memory, such as random access memory (RAM), or read only memory (ROM) of the controller 11. Likewise, the control routines may be hard-coded into, for example, one or more EPROMs, EEPROMs, application specific integrated circuits (ASICs), or any other hardware or firmware elements of the controller 11. Thus, the controller 11 may be configured (by a user using a UI device 8 in certain embodiments) to implement (e.g., receive, store, and/or execute) a control strategy or control routine in any desired manner.

In some embodiments of the UI device 8, a user may interact with the UI device 8 to define and implement a control strategy at the controller 11 using what are commonly referred to as function blocks, wherein each function block is an object or other part (e.g., a subroutine) of an overall control routine and operates in conjunction with other function blocks (via communications called links) to implement process control loops within the process control system. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system. Of course, hybrid and other types of function blocks exist. The function blocks may have graphical representations that are provided at the UI device 8, allowing a user to easily modify the types of function blocks, the connections between the function blocks, and the inputs/outputs associated with each of function blocks implemented in the process control system. Function blocks may be downloaded to, stored in, and executed by the controller 11, which is typically the case when these function blocks are used for, or are associated with standard 4-20 mA devices and some types of smart field devices such as HART devices, or may be stored in and implemented by the field devices themselves, which can be the case with Fieldbus devices. The controller 11 may include one or more control routines 38 that may implement one or more control loops. Each control loop is typically referred to as a control module, and may be performed by executing one or more of the function blocks.

Referring still to FIG. 1A, the wireless field devices 40-46 communicate in a wireless network 70 using a wireless protocol, such as the Wireless HART protocol. In certain embodiments, the UI device 8 may be capable of communicating with the wireless field devices 40-46 using the wireless network 70. Such wireless field devices 40-46 may directly communicate with one or more other nodes of the process control network or system 2 that are also configured to communicate wirelessly (using the wireless protocol, for example). To communicate with one or more other nodes that are not configured to communicate wirelessly, the wireless field devices 40-46 may utilize a wireless gateway 35 connected to the backbone 5. Of course, the field devices 15-22 and 40-46 could conform to any other desired standard(s) or protocols, such as any wired or wireless protocols, including any standards or protocols developed in the future.

The wireless gateway 35 may provide access to various wireless devices or nodes 40-46, 52-58 of a wireless communication network 70. In particular, the wireless gateway 35 provides communicative coupling between the wireless devices 40-46, 52-58 and other nodes of the process control network or system 2 (including the controller 11 of FIG. 1A). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks, in an example implementation. In other cases, the wireless gateway 35 may translate commands between wired and wireless protocols that do not share any protocol layers.

Similar to the wired field devices 15-22, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some scenarios, the wireless network 70 may include non-wireless devices 48, 50, which may be wired devices. For example, a field device 48 of FIG. 1A may be a legacy 4-20 mA device and a field device 50 may be a traditional wired HART device. To communicate within the network 70, the field devices 48 and 50 may be connected to the wireless communication network 70 via a respective wireless adaptor (WA) 52a, 52b. Additionally, the wireless adaptors 52a, 52b may support other communication protocols such as Foundation® Fieldbus, PROFIBUS, DeviceNet, etc. Furthermore, the wireless network 70 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 70. The wireless devices 40-46 and 52-58 may communicate with each other and with the wireless gateway 35 over wireless links 60 of the wireless communication network 70.

In certain embodiments, the process control network or system 2 may include other nodes connected to the network backbone 5 that communicate using other wireless protocols. For example, the process control network or system 2 may include one or more wireless access points 7a that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, and/or other wireless communication protocols. Typically, such wireless access points 7a allow handheld or other portable computing devices to communicate over a respective wireless network that is different from the wireless network 70 and that supports a different wireless protocol than the wireless network 70. In some embodiments, the UI device 8 communicates over the process control network or system 2 using a wireless access point 7a. In some scenarios, in addition to portable computing devices, one or more process control devices (e.g., controller 11, field devices 15-22, or wireless devices 35, 40-46, 52-58) may also communicate using the wireless network supported by the access points 7a.

Additionally or alternatively, the process control network or system 2 may include one or more gateways 7b, 7c to systems that are external to the immediate process control system. In such embodiments, the UI device 8 may be used to control, monitor, or otherwise communicate with said external systems. Typically, such systems are customers and/or suppliers of information generated or operated on by the process control system. For example, a plant gateway node 7b may communicatively connect the immediate process plant 10 (having its own respective process control data network backbone 5) with another process plant having its own respective network backbone. In an embodiment, a single network backbone 5 may service multiple process plants or process control environments.

In another example, the plant gateway node 7b may communicatively connect the immediate process plant to a legacy or prior art process plant that does not include a process control network or system 2 or backbone 5. In this example, the plant gateway node 7b may convert or translate messages between a protocol utilized by the process control big data backbone 5 of the plant 10 and a different protocol utilized by the legacy system (e.g., Ethernet, Profibus, Fieldbus, DeviceNet, etc.). In such an example, the UI device 8 may be used to control, monitor, or otherwise communicate with systems or networks in said legacy or prior art process plant.

The process control network or system 2 may include one or more external system gateway nodes 7c to communicatively connect the process control network or system 2 with the network of an external public or private system, such as a laboratory system (e.g., Laboratory Information Management System or LIMS), a personnel rounds database, a materials handling system, a maintenance management system, a product inventory control system, a production scheduling system, a weather data system, a shipping and handling system, a packaging system, the Internet, another provider's process control system, and/or other external systems. The external system gateway nodes 7c may, for example, facilitate communication between the process control system and personnel outside of the process plant (e.g., personnel at home).

Although FIG. 1A illustrates a single controller 11 with a finite number of field devices 15-22, 40-46, and 48-50 communicatively connected thereto, this is only an illustrative and a non-limiting embodiment. Any number of controllers 11 may be included in the process control network or system 2, and any of the controllers 11 may communicate with any number of wired or wireless field devices 15-22, 40-50 to control a process in the plant 10. Furthermore, the process plant 10 may also include any number of wireless gateways 35, routers 58, access points 55, wireless process control communication networks 70, access points 7a, and/or gateways 7b, 7c.

Figure 1B:
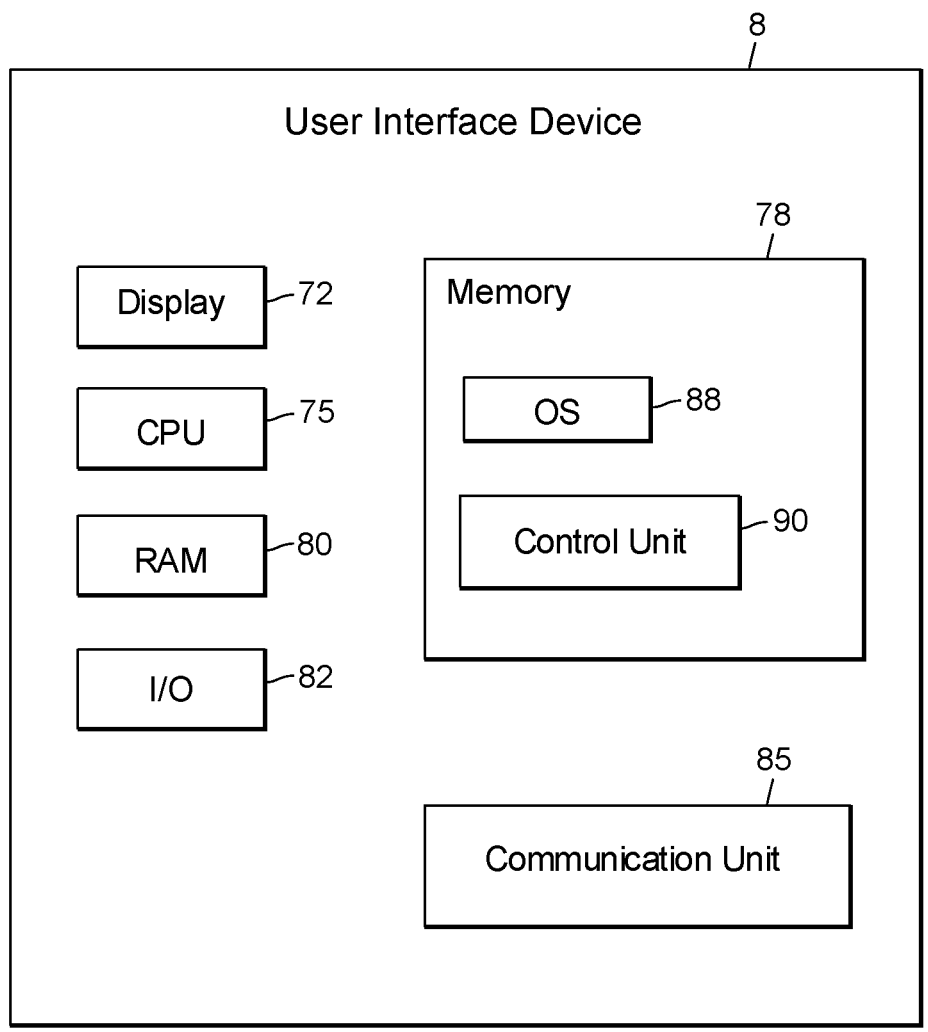
FIG. 1B is a block diagram of an example user interface device schematically illustrated in FIG. 1A.

FIG. 1B illustrates a block diagram of an example UI device 8 which may be utilized in conjunction with embodiments of the novel graphical display configuration and usage system described herein. The UI device 8 may be a desktop computer such as a traditional operator workstation, a control room display, or a mobile computing device such as a laptop computer, a tablet computer, a mobile device smartphone, a personal digital assistant (PDA), a wearable computing device, or any other suitable client computing device. The UI device 8 may execute a graphical display configuration application utilized by a configuration engineer in the configuration environment to create, generate, and/or edit various display view definitions or configurations as well as create, generate, and/or edit various display view element definitions or configurations. The UI device 8 may also execute an operator application utilized by an operator to monitor, observe, and react to various statuses and conditions of the process within the operating environment. The UI device 8 may include a display 72. Further, the UI device 8 includes one or more processors or CPUs 75, a memory 78, a random-access memory (RAM) 80, an input/output (I/O) circuit 82, and a communication unit 85 to transmit and receive data via a local area network, wide area network, and/or any other suitable network, which may be wired and/or wireless. The UI device 8 may communicate with the controllers 11, the server 12, and/or any other suitable computing device.

The memory 78 may include an operating system 88, applications running on the operating system 88 such as the graphical display configuration application and operator application, and a control unit 90 for controlling the display 72 and communicating with the controllers 11 to control on-line operation of the process plant. In some embodiments, the server 12 may transmit a graphical representation of a portion of the process plant to the UI device 8 and in turn, the control unit 90 may cause the graphical representation of the portion of the process plant to be presented on the display 72. Additionally, the control unit 90 may obtain user input from the I/O circuit 82, such as user input from the operator or configuration engineer (also referred to herein as a user) and translate the user input into a request to present a graphical display view in a particular language, a request to include graphics that are indicative of particular control elements in an Active Monitor or Watch window included on the display view, a request to display an adjustment to a process parameter included in one of the process sections, etc.

In some embodiments, the control unit 90 may communicate the translated user input to the server 12 which may generate and transmit the requested UI to the UI device 8 for display. In other embodiments, the control unit 90 may generate the new UI based on the translated user input and present the new UI on the display 72 of the UI device 8. When the translated user input is a request to display an adjustment to a process parameter included in one of the process sections, the control unit 90 may adjust the process parameter value on the display 72 in accordance with the user input from the operator and may provide instructions to the controllers 11 to adjust the process parameter in the process plant. In other embodiments, the control unit 90 may communicate the translated user input to the server 12 which may generate and transmit the adjusted process parameter value to the UI device 8 for display, and provide instructions to the controllers 11 to adjust the process parameter in the process plant.

Figure 2A:
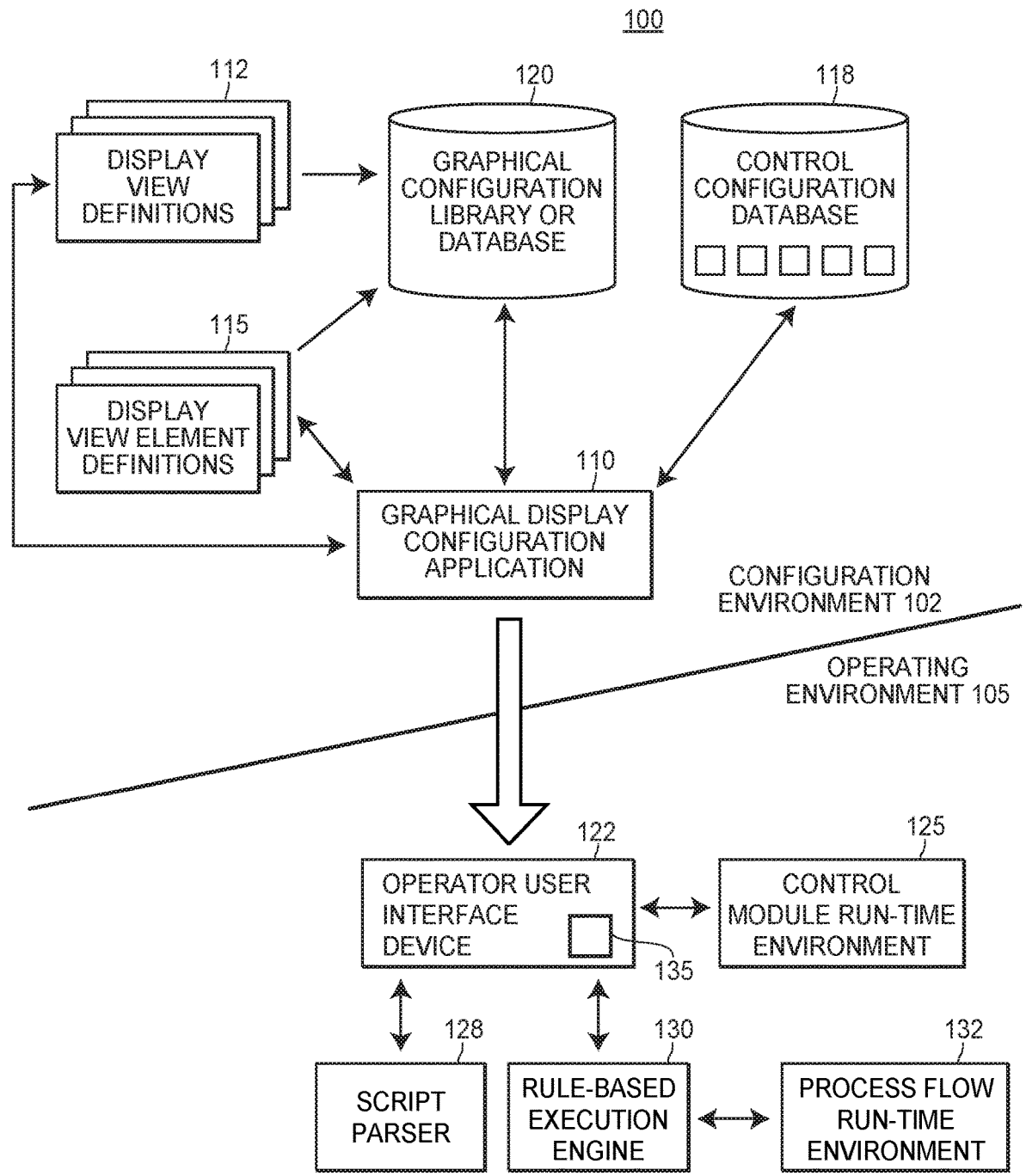
FIG. 2A is a block diagram of an example implementation of a graphical display configuration and usage system in a configuration environment and in an operating environment of a process plant, such as the process plant of FIG. 1A.

FIG. 2A depicts a high-level block diagram illustrating one possible manner of implementing embodiments and/or aspects of the graphical display configuration and usage system 100 described herein within a configuration environment 102 and an operating or operations environment 105 of a process plant or process control system, e.g., of the process plant 10 of FIG. 1A. The configuration environment 102 of the process control system is interchangeably referred to herein as the "off-line" environment 102 or the "back-end" environment 102 of the process control system, and the operating environment 105 of the process control system is interchangeably referred to herein as the "operations," "on-line," "front-end," or "field" environment 105 of the process control system.

As illustrated in FIG. 2A, the configuration environment 102 includes a graphical display configuration application 110 that includes a user interface via which a configuration engineer or user may create, generate, and/or edit various display view definitions or configurations 112 as well as create, generate, and/or edit various display view element definitions or configurations 115. For example, the graphical display configuration application 110 may execute on an instance of the user device 8 of FIGS. 1A and/or 1B. Each display view configuration 112 and each display view element configuration 115 may be implemented as a respective object, for example. Generally speaking, a display view definition 112 may be configured to include (among other components) one or more display element definitions 115. Typically, a display view definition 112 is configured to include at least one display element (e.g., a graphical element) that is linked to a particular control module, device, or other type of control object so that in the operating environment 105, runtime data associated with the particular control module, device, or control object may be represented via the linked display element(s) on the executing display view, e.g., in a continually or repeatedly updated manner. The particular control module, device, or control object typically is defined in a control configuration database 118 (e.g., its configuration is stored in the control configuration database 118), and may be represented within the display view definition 112 by a designated control tag or other suitable indicator, for example. As shown in FIG. 2A, the display view-related definitions or configurations 112, 115 are stored in a centralized graphical configuration database or library 120 so that the graphical display-related configurations 112, 115 are available for download and execution in the operating environment 105 to thereby allow operators or users to monitor, observe, and react to various statuses and conditions of the process within the operating environment 105. It is noted that although the graphical configuration database 120 and the control configuration database 118 are illustrated in FIG. 2A as being separate databases within the configuration environment 102 of the process control system 10, in some implementations, at least portions or the entireties of the configuration databases 120, 118 may be integrally implemented as a unitary database or library.

At any rate, in FIG. 2A, a display view configuration 112 may be defined to specify one or more control objects 118 that are associated with or bound to respective display view elements 115 included on the display view 112, and then the definitions of the display view elements 115 and the control objects 118 respectively bound thereto are instantiated and provided to (e.g., are downloaded into) one or more different operator workstations or user interface devices 122 included in the operating environment 105 of the process plant 10. In an example, the user interface device or workstation 122 may take the form of the user interface device 8 of FIG. 1B. The instantiated display view 112 executing at the user interface device 122 communicates with the control module runtime environment 125, which may be executed in controllers and field devices associated with the process, to access or otherwise obtain data or other information from the control module runtime environment 125, e.g., as defined by the bound control objects 118 of the display view 112. The user interface device 122 may communicate with the control module runtime environment 125 using any desired or preconfigured communication networks, such as the data highway 5 and/or the wireless communication networks 70 of FIG. 1A.

In some embodiments, user interface device 122 uses a download script parser 128 to parse at least some of the downloaded display view configuration 112 during its execution (e.g., to perform just in time object code conversion), although use of the download script parser 128 by the user interface device 122 is not necessary or required, e.g., when a downloaded display view configuration 112 does not include any scripts.

In some embodiments, the user interface device 122 uses a rule-based execution engine 130 to execute process flow algorithms or other rule based procedures (e.g., as provided by a process flow runtime environment 132) that are indicated by or bound to the display view element objects 115 and/or to the display view object 112, such as when one or more of the display view element objects 115 is a smart process object. Generally speaking, a smart process object is defined or configured to include data storage for storing data pertaining to and received from other entities within the process plant 10, as well as inputs and outputs for communicating with other smart process objects and methods that may be executed on the stored and received data, e.g., to detect plant or device conditions. In some arrangements, smart process objects are communicatively connected together to create a process flow module that provides a display view for, and implement a set of rules for a plant entity, such as an area, device, element, module, etc., and the process flow module is executed in the runtime by the process flow runtime environment 132, e.g., by using the execution engine 130. It is noted that the use of the execution engine 130 by the user interface device 122 is not necessary or required, e.g., when a downloaded display view configuration 112 does not include any smart process objects. It is further noted that other methods of integrating the display views and display view elements with runtime control objects in the operating environment 105 other than those discussed herein are additionally or alternatively possible, and may be utilized by the graphical display configuration and usage system 100. For ease of discussion, an instantiated display view that executes or is provided on a user interface device 122 of the operating environment 105 is generally referred to herein as an operator or operations application 135.

FIG. 2B depicts a detailed block diagram of an embodiment of the graphical configuration library 120 included in the graphical display configuration and usage system 100 of FIG. 2A. As illustrated in FIG. 2B, the graphical configuration library 120 stores both display view definitions or configurations 112 as well as display view element definitions or configurations 115. Each definition or configuration 112, 115 may have associated therewith a published version and optionally one or more draft versions (which are also referred to herein interchangeably as "in-progress" or "working" versions) which are stored in the library 120. As shown in FIG. 2B, View1 has two corresponding draft configurations and one corresponding published configuration stored in the graphical configuration database 120. Additionally, the graphical configuration database 120 is shown as storing one draft configuration and two published configurations for View2, one published configuration and no draft configurations for View3, and m draft configurations and one published configuration for ViewN. Generally speaking, only published configurations or definitions are allowed or permitted to be downloaded from the graphical configuration library 120 or elsewhere within the configuration environment 102 into the operating environment 105. Draft configurations or definitions may be maintained, stored, and edited solely within the configuration environment 102, in some embodiments. If draft configurations or definitions are stored within the configuration environment 102, the drafts are prevented from being downloaded into the operating environment 105. When a configuration engineer is satisfied with a draft display-related configuration or definition 112, 115, the engineer may explicitly publish the display-related configuration or definition 112, 115 (e.g., change its state to "published") so that it is available for download and execution in the runtime process plant 10. In some embodiments, a single user control may implement both the publishing and the subsequent download of the publication. In other embodiments, a publish user control or command and a download user control or command are different and distinct user controls provided by the configuration application 110.

As such, multiple configuration engineers are able to create, modify, and test graphical configurations and definitions (and in some situations, simultaneously) without impacting runtime operations of the subject configurations, e.g., as illustrated by the m draft configurations of ViewN and the published configuration of the ViewN. Additionally, different versions of a same display view may be published and available for runtime operations, for example, when a same display view is configured to have different combinations of operator customizations that are downloaded to different areas of the plant, e.g., as illustrated by the two publications of View2. (Of course, the graphical display configuration system 100 allows configuration engineers to re-name different publications of View2 as separate views instead of different publications of the same view, if so desired.) In some embodiments, at least some of the published display views and published display view elements are available out-of-the-box, that is, at least some published display views and published display view elements are provided as defaults in the library 120. Such default views and elements may be edited or modified by configuration engineers using the graphical display configuration application 110, and the modified views or elements may be published as additional or alternative published versions of the default objects 112, 115.

A particular display view configuration may be defined, e.g., by configuration engineers or users via the graphical display configuration application 110, to include (e.g., refer to, point to, or reference) one or more display view element configurations, among other components. Similarly, in some instances, a particular display view element configuration may be defined to include (e.g., refer to, point to, or reference) one or more other display view elements. Significantly, various display-related configurations or definitions (whether of display views and/or of display view elements) may respectively define a set of operator-selectable customizations that are made available for the operator to modify the appearance of the corresponding display view or display view element during runtime as the operator desires, without having to create and/or download a revised configuration, and without the display view, the display view element, or the user interface device on which the display view is executing having to obtain additional configuration data indicative of the modification from another computing device (e.g., from a computing device or database included in the configuration environment 102, or from a computing device or database included in the operating environment 102 that locally stores configuration data or copies thereof). Additionally, in some embodiments, the particular display view configuration may also include one or more global variables or scripts in addition to the other display view elements referenced therein.

Figure 2C:
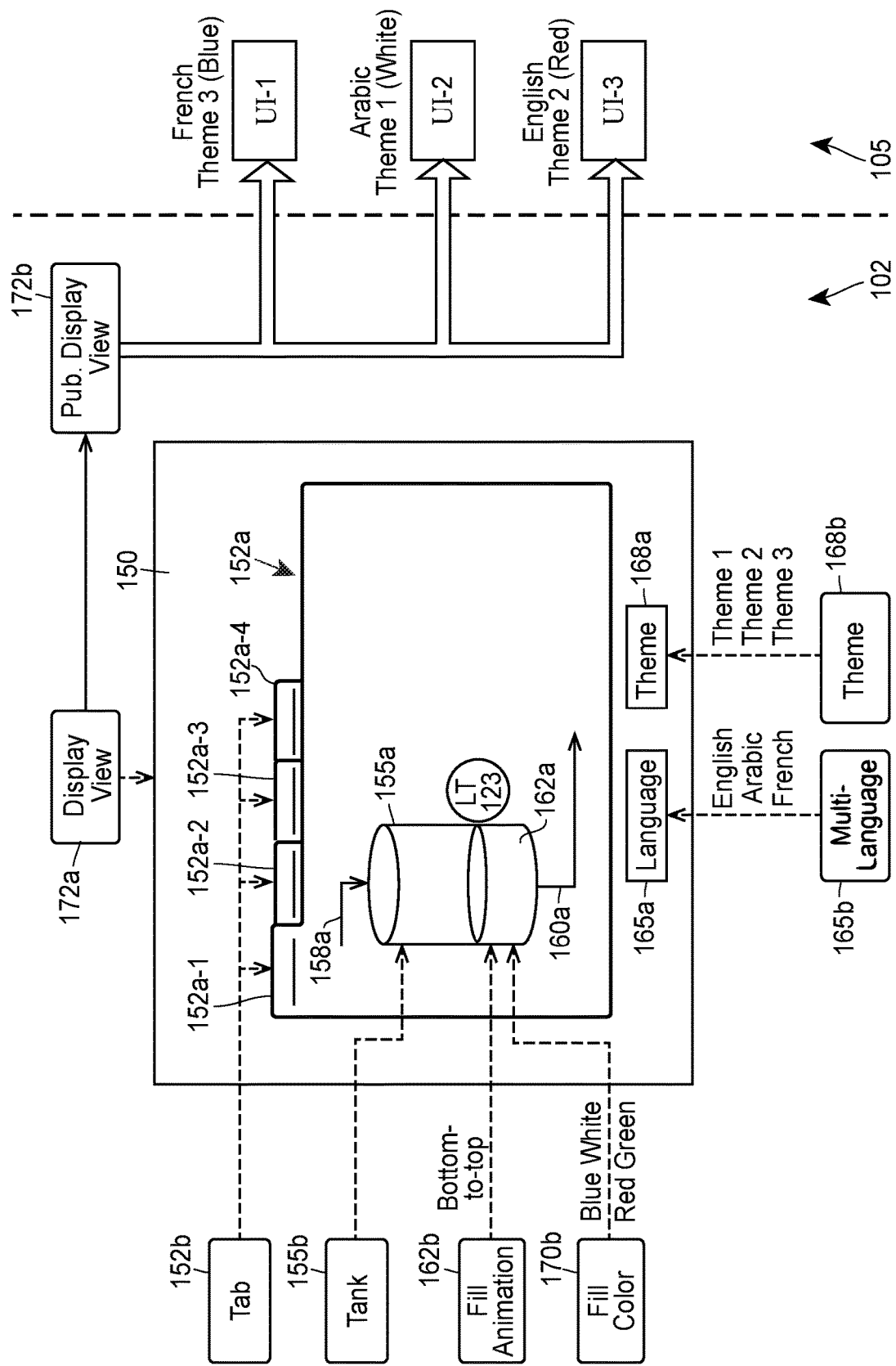
FIG. 2C depicts a block diagram of an example snapshot in time of an in-progress configuring of a display view using the graphical configuration and usage system of FIG. 2A.

To illustrate, FIG. 2C depicts a snap shot of an example display view 150 that is being configured by a user on a canvas provided by the graphical display configuration application 110. At this point during its configuration, the display view 150 has been defined as including several display view elements 152a-168a. In particular, the display view 150 includes a tabbed display element 152a including four tabs 152a-1, 152a-2, 152a-3, and 152a-4, and the tab 152a-1 includes a graphic of a tank 155a including an input flow connection 158a and an output flow connection 160a. Additionally, the tank graphic 155a includes a fill animation 162a via which the liquid level in the tank is represented. The presentation of the display view 150 may be at least partially influenced by one or more user controls included thereon, e.g., a language user control 165a and a theme user control 168a, which are able to be manipulated by an operator for customization at his or her workstation or user interface 8. Additionally or alternatively, one or more similar user controls 165a, 168a may be provided at the workstation or user interface 8 via the operator application 135 executing the display view 150 at the workstation 8 (not shown in FIG. 2C).

The configuration of the example display view 150 is captured or defined in a corresponding display view object 172a which, in FIG. 2C, is a draft, working, or in-progress configuration object 172a (or otherwise not published). Similarly, the configuration of each of the display view element 152a-168a is captured or defined in one or more respective display view element objects 152b-170b (each of which, at the point in time illustrated by FIG. 2C, may or may not be respectively published, either individually, or as a whole with the display view 150). For example, the tabs 152a-1, 152a-2, 152a-3, and 152a-4 are defined by a graphical tab display element 152a, which itself is defined by an instance of the tab object 152b, where each tab object instance has been specifically configured to, for example, display a different text string on its respective tabs 152a-1, 152a-2, 152a-3, and 152a-4 and to include other display characteristics and properties thereon (not shown). In some embodiments, each tab 152a-1, 152a-2, 152a-3, and 152a-4 may be respectively configured to change its appearance (e.g., indicators, background color, text color, animations, etc.) responsive to live data, and thereby may be linked to one or more control elements within the operating environment 105 of the process plant 10. The tank graphic 155a is defined by an instance of the tank object 155b, and the tank object instance has been specifically configured to be associated with a specific control tag LT123. Additionally, the fill animation 162a has been defined by an instance of the fill animation object 162b which specifies that the fill animation is a bottom-to-top fill. Further, the color of the fill animation 162a is defined by an instance of a fill color object 170b to be operator-selectable between the colors blue, red, white, and green. For example, the fill color may be individually selectable, or may be selectable by virtue of the operator selecting a particular theme which defines the fill color.

Moreover, as demonstrated in FIG. 2C, configurations of graphical object instances may be defined using other graphical objects and/or object instances. For example, the instance of the tab object 152b that defines the tab 152a-1 is defined to include the instance of the tank graphic object 155b that defines the tank graphic 155a (including, inter alia, the specification therein of the control tag LT123) thereon. Similarly, the instance of the tank graphic object 155b that defines the tank graphic 155a is itself defined to include the instance of the fill animation object 162b for the fill animation 162a, where the instance of the fill animation object 162b has been particularly configured in this example to be a bottom-to-top fill animation. Still, the instance of the fill animation object 162b defining the fill animation 162a is itself defined to include an instance of the fill color object 170b, which defines therein a choice of operator-selectable fill colors (e.g., blue, red, white, and green) and additionally defines the mutually exclusive selection and application thereof.

Generally speaking, a first graphical element object may be defined or configured to refer to (e.g., point to, reference, etc.) a second graphical element object, where the configuration of the second graphical element object defines the appearances and/or behaviors of the first graphical element object. In some embodiments, the configuration or the definition of the first graphical element object may additionally include one or more object property values and/or scripts, if desired. The first graphical element object and the second graphical element object are independent and separate objects. That is, the first graphical element object and the second graphical element object are not included in the same object class, are not derived from each other, are not related by parent/child object relationships, etc. Indeed, the second graphical element object may be referenced by another graphical element object and appropriately configured to thereby define the appearances and/or behaviors of the another graphical element object.

In some scenarios, the second graphical element object itself may reference a third graphical element object, where the configuration of the third graphical element object defines the appearances and/or behaviors of the second graphical element object. If desired, the configuration of the second graphical element object may additionally include one or more object property values and/or scripts.

At any rate, turning back to FIG. 2C, the instance of the display view object 172a defining the view 150 may be configured to display one or more user controls 165a, 168a thereon. (As noted above, in some embodiments, one or more of the user controls 165a, 168a may be provided by the operator application 135 that executes the configured display view object 172a at the user interface device 8 within the operating environment 105, which is not depicted in FIG. 2C.) At any rate, whether provided by the display view object 172a and/or by the operator application 135, each of the user controls 165a, 168a may be defined, at least in part, by its respective object 165b, 168b. In particular, as illustrated in FIG. 2C, the language user control 165a is defined by an instance of the multi-language object 165b which, in this example, has been configured to enable text to be represented in either English, Arabic, or French. As such, during runtime, an operator may manipulate the language user control 165a to selectively change the language that appears in the display view 150 to/from English, Arabic, or French. Similarly, the themes user control 168a is defined by an instance of the themes object 168b, where the instance of the themes 168b, in this example, has been defined to allow the operator, during runtime, to selectively change the theme of the display view 150 among Theme1, Theme2, and Theme3. As such, during runtime, an operator may manipulate the themes user control 168a on the operator application 135 to change the theme that appears in the display view 150 among Theme1, Theme2, and Theme3. Each of the languages and themes may be defined elsewhere in the graphical configuration database 120, e.g., in the manners described elsewhere in this disclosure.

Further, the display view 150 may be able to be included in various other display view elements 115. For example, a particular Layout1 (e.g., which may be configured as a particular instance of a layout object) may be defined to present the display view 150 in a first area, e.g., by linking the configuration 172a of the display view 150 to the graphical object defining the first area of Layout1. Another particular Layout2 (e.g., which may be configured as another particular instance of the layout object) may be defined to present the display view 150 in a second area, e.g., by linking the display view configuration 170 to the graphical object defining the second area of Layout2. In an additional or alternative implementation, the instance of the display view object 172a may reference one or several layouts (e.g., which may be configured as particular instances of layout objects) that include the display view 150. Each of the layouts that include the display view 150 may be particularly configured to be or to not be presented to the operator when presenting the display view 150 while executing in the runtime environment. In other words, while executing in the runtime environment, the operator application 135 may present the display view 150 according to one of the layouts based on the configuration of the display view object 172a. Additional discussion of layouts that are able to be provided by the graphical display configuration system 100 is provided elsewhere in this disclosure. Similarly, the display view 150 may be linked or otherwise associated with various display hierarchies, and additional discussion of display hierarchies that are provided by the graphical display configuration system 100 is also provided elsewhere in this disclosure.

Returning to FIG. 2C, when the configuration engineer is satisfied with the display view object 172a that defines the content, appearances, and behaviors of the display view 150 in the runtime environment 105, the configuration engineer may publish the display view object as represented in FIG. 2C by the reference 172b.

In an embodiment in which display view elements objects are able to be individually published, upon publication of the display view object 172b, any display view element objects 152b-170b that are not already in a published state may be automatically published, and/or the user may be prompted to manually publish display view element objects that are still in a draft or in-progress state. That is, in such an embodiment, in order for a display view object 172a to be published, any display element objects included therein or linked thereto must also be in a published state.

In another embodiment in which display view element objects are not individually publishable, upon publication of the display view object 172b, the published configuration 172b of the display view 150 is stored in the graphical configuration database 120, thereby making the published configuration 172b available for download into the operating environment 105 of the process plant 10, such as is shown in FIG. 2C. In some embodiments, upon publication of the display view object 172, the published configuration 172b is automatically downloaded into the operating environment 105.

The published configuration of the display view object 172b may be downloaded to one or more user interface devices that are included in the operating environment 105 for execution, as represented in FIG. 2C by user interface devices UI-1, UI-2, UI-3. Each of the user interface devices UI-1, UI-2, UI-3 may take the form of the user interface device 8 or the user interface device 122, for example, and the particular set of user interface devices to which the published display view configuration 172b is to be downloaded (and executed on) may be specified by a user, e.g., via the graphical display configuration application 110 or via another user interface of the configuration environment 120. As such, each downloaded instance of the published display view configuration 172b may execute independently in the runtime environment 105 at its respective host user interface device UI-1, UI-2, UI-3.

Importantly, the published display view configuration 172b, when executing at its host device UI-1, UI-2, UI-3, allows operators or users to customize the appearance and behaviors of a respective executing display view 150 as desired within the runtime environment 105, and independently of the runtime customization of other users. As shown in FIG. 2C, at UI-1, the user of UI-1 has changed the color of the fill animation 162a of the tank graphic 155 on the display view 150 to be blue, has selected that the text displayed on the display view 150 be presented in French, and has selected that the display view 150 be presented using Theme3. At UI-2, the user has changed the color of the fill animation 162a to be white, has selected the text to be presented in Arabic, and has selected Theme1. At UI-3, the user has changed the color of the fill animation 162a to be red, has selected the text to be presented in English, and has selected Theme2. The user selections and customizations implemented at user interface devices UI-1, UI-2, and UI-3 are effected solely using the respective published display view configurations 172b executing respectively at the host devices UI-1, UI-2, and UI-3. That is, to implement the operator-desired changes, none of UI-1, UI-2, or UI-3 needs to obtain additional configuration data from the configuration environment or from any other computing device. Moreover, to implement the operator-desired changes, an updated configuration for the display view 150 is not required to be downloaded and executed. Rather, each operator simply implements desired changes in line with the runtime execution of the display view 150 at his or her respective user interface device UI-1, UI-2, UI-3, e.g., without needing to stop and re-start the display view 150. For example, if the user of UI-1 subsequently wishes to change the displayed theme from Theme3 to Theme2, the user may do so by merely making the selection via the Theme User Control 168a executing at UI-1 (which may, as discussed above be provided by the operator application 135 or by the display view 150), and in response the executing display view 150 will implement the change, e.g., without having to communicate with any other computing device included in the configuration environment 102 and/or with any other computing device that is able to access configuration data 120 or copies thereof.

Of course, the example scenario depicted in FIG. 2C is meant to be illustrative but not limiting, and is only one of many possible usage scenarios of the graphical display configuration and usage system 100. Indeed, as is demonstrated within this disclosure, the graphical display configuration and usage system 100 provides a configuration environment 102 that is flexible, intuitive, and easy to maintain, while simultaneously providing an operating experience that supports independent, on-line operator customization of display views and/or of display elements included thereon. The various features and aspects (either alone, or in combination) of the graphical display configuration and usage system 100 which provide these and other benefits are described in more detail below.

Display Navigational Hierarchy

Figure 3A:
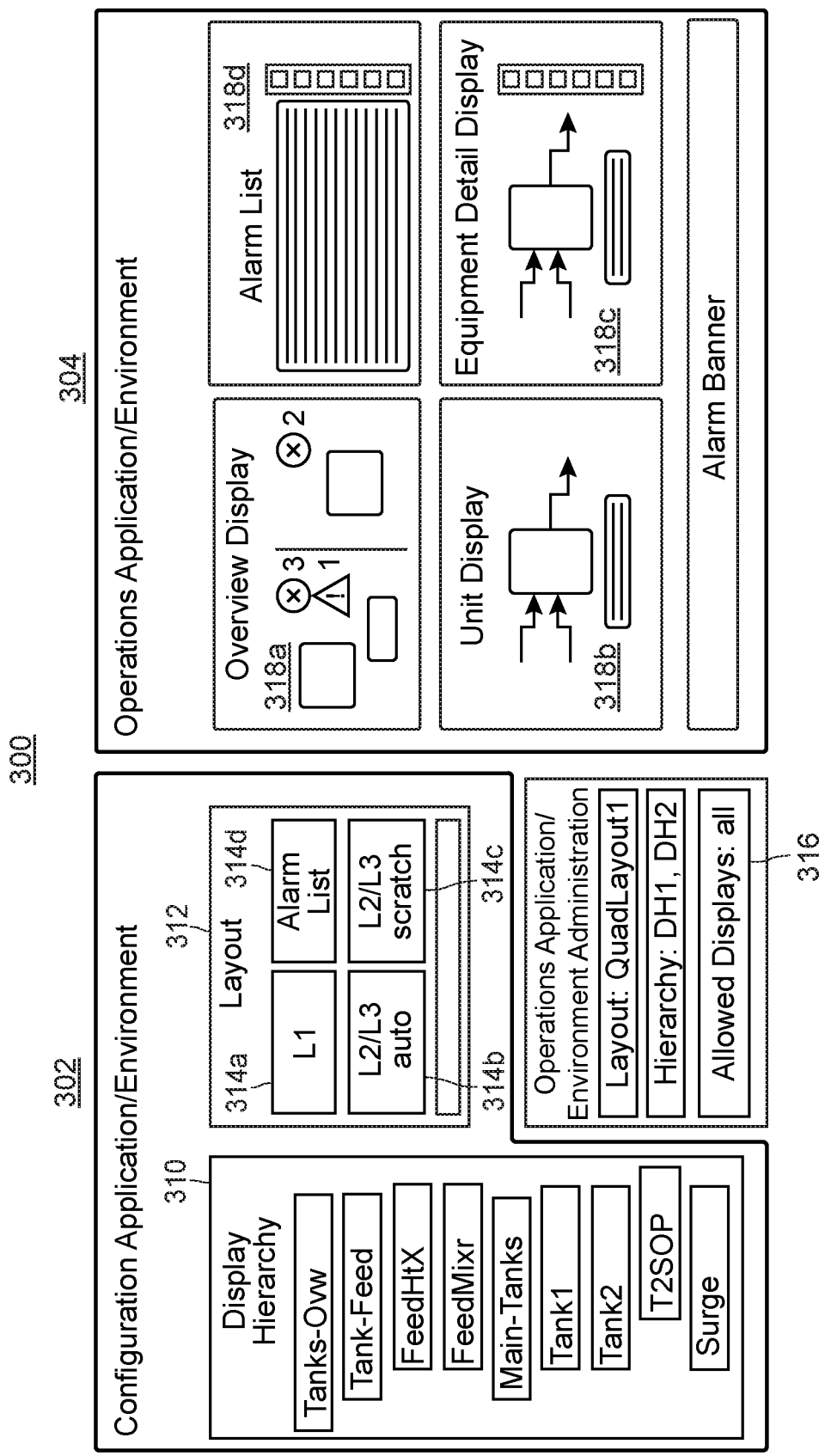
FIG. 3A is an example view of a graphical display configuration application for defining graphics and an example view of an operator application for presenting the graphics according to the definitions from the graphical display configuration application.

Turning now to FIG. 3A, examples of types of display view elements that are provided by the graphical display configuration and usage systems and methods described herein are a hierarchy display view element and a layout display view element. As mentioned above, to generate graphics in a process control system, the graphical display configuration application 110 in the configuration environment 102 includes graphical user controls for defining hierarchies and layouts, thereby allowing a configuration engineer to define the hierarchy and layout graphically. Each display view may be made up of display view elements which define the display view. For example, a "Main-Tanks" display view may include several display view elements each representing a different tank. A display view element in one display view may also be the subject of another display view at a higher level of detail having its own display view elements. In this manner, a plant operator may navigate from a display view depicting a general overview of the process plant at the lowest level of detail to a display view depicting a single alarm or device within the process plant at one of the highest levels of detail.

In some embodiments, a display view depicts a section of a process plant and the display view elements include graphical representations of process plant entities, such as tanks, mixers, valves, pumps, and/or any other suitable equipment within a process plant. The display view elements may also include graphical representations of process plant connection entities that connect one piece of equipment to another, such as pipes, electrical wires, conveyor belts, etc.

In some embodiments, the configuration engineer may define the alarms, trends, and/or process parameter values within a display view at a particular level of detail. In other embodiments, the configuration engineer may define the number of alarms, trends, and/or process parameter values within the display view at a particular level of detail. The graphical display configuration application 110 or the operator or operations application 135 executing on the operator user interface device 122 may then automatically determine which alarms, trends, and/or process parameter values to include on the display view based on priority levels for the respective alarms, trends, and/or process parameter values. For example, the configuration engineer may indicate that five process parameter values will be presented at particular locations within the display view. Each of the process parameter values corresponding to the display view may be ranked according to priority level and the top five ranking process parameter values may be presented in the display view. The priority levels may be determined by the configuration engineer, the operator, or may be automatically determined based on a set of rules, such as whether a particular process parameter value triggers an alarm.

To create a hierarchy of display views for navigating from a display view depicting a general overview of the process plant to display views depicting sections of the process plant at higher levels of detail, the graphical display configuration application 110 includes graphical user controls for defining relationships or links between display views. The graphical display configuration application 110 may present a user interface or a portion thereof for creating the hierarchy. The hierarchy UI may include indications of each of the display views defined in the configuration environment. The configuration engineer may then drag and drop display views (or may use any other suitable graphical user control) into a hierarchy pane to define the relationships or links between the display views. For example, by dragging and dropping an indication of a "Tank 1" display view (e.g., the name "Tank 1," an icon, etc.) onto an indication of a "Main-Tanks" display view, the graphical display configuration application 110 may determine that Tank 1 is a subview at a higher level of detail than the "Main-Tanks" display view. In another example, by dragging and dropping an indication of a "Tank-Feed" display view above or below the indication of the "Main-Tanks" display view within the hierarchy pane, the graphical display configuration application 110 may determine that the "Tank-Feed" and "Main-Tanks" display views are at the same level of detail within the hierarchy.

Display view hierarchies may also be created for trend display views representing historized process parameter values. For example, a process parameter such a flow rate through a valve may depend on one or several input or output process parameters, such as an inlet pressure at the valve and an outlet pressure at the valve. A Level 1 trend display view may depict flow rates through the valve over time while a Level 2 trend display subview of the Level 1 trend display view may depict inlet and outlet pressures at the valve over time. The configuration engineer may create the trend display view hierarchy in the configuration environment 102, and an operator may maneuver between resulting trend display views and subviews (e.g., via navigation buttons) within the operating environment 105 at increasing or decreasing levels of detail.

In some embodiments, a display view hierarchy may resemble a tree structure where a display view at the lowest level of detail (e.g., Level 1) is the root node of the tree structure. Display views at the second lowest level of detail (e.g., Level 2) may be children nodes with respect to the root node and may each have their own children nodes at the third lowest level of detail (e.g., Level 3) which may be grandchildren nodes with respect to the root node. The configuration engineer may create several display view hierarchies which may each correspond to different areas within a process plant or different process plants. In this manner, each operator may view the display view hierarchy representing the area for which she is responsible.

In addition to defining display view hierarchies, the graphical display configuration application 110 includes graphical user controls for defining a layout. As used herein, a "layout" may indicate the manner in which to divide a display screen area of an operator workstation to present several display views on a display screen or a plurality of display screens for the operator workstation. For example, an operator workstation may include multiple monitors or display screens and the layout may cause the operator workstation to present a different display view on each of the display screens, so that the operator may watch several display views at a time. In another example, an operator workstation may include a single monitor or display screen and the layout may cause the operator workstation to divide the display screen into several regions (e.g., frames, sub-areas, or portions) and present a different display view on each region of the display screen. The graphical display configuration application 110 may include graphical user controls for selecting the number of display screens and display regions within each display screen for a layout. For example, the configuration engineer may generate a first layout having two display screens, where each display screen is divided into two display regions. Then the configuration engineer may define a display view type for each of the divided display regions, such as watch area, alarm list, historized parameters, a faceplate, hierarchy level (e.g., Level 1, Level 2, Level 3), etc.

Furthermore, the layout may include relationships or links between the display regions within the layout. For example, a first display region within the layout may present hierarchy Level 1 type display views and a second display region within the layout may present hierarchy Level 2 type display views. The second display region may be configured to present hierarchy Level 2 display views when the operator navigates from hierarchy Level 1 in the first display region. The display view for the second display region depends on the activity of the operator with respect to the first display region and the first display region continues to present hierarchy Level 1 type display views. In another example, display regions within the layout depicting alarm list or historized parameter display views may depend on display regions within the layout depicting control modules, so that the alarm list or historized parameter display views include alarms or parameters being displayed within the control modules.

FIG. 3A illustrates, an example side-by-side view 300 of a graphical display configuration application UI 302 (which may, for example, be an instance of the graphical display configuration application 110) and an operator application UI 304 (which may, for example, be an instance of the operator application 135) depicting the display view elements during runtime as defined by the graphical display configuration application UI 302. More specifically, the graphical display configuration application UI 302 includes a hierarchy pane 310 indicating the hierarchy of a set of display views. For example, the "Tanks-Ovw" display view may be at Level 1 of the display view hierarchy and the "Tank-Feed" and "Main-Tanks" display views may be at Level 2. The "FeedHt X" and "FeedMixr" display views may be subviews of the "Tank-Feed" display view and the "Tank1," "Tank2," and "Surge" display views may be subviews of the "Main-Tanks" display view at Level 3. Additionally, the "T2SOP" display view may be a subview of the "Tank 2" display view at Level 4. As mentioned above, a configuration engineer may define the display view hierarchy by dragging and dropping indications of the display views into a hierarchy pane 310 presented by the graphical display configuration application 110 or by using any other suitable graphical user controls. Indications of new display views may also be defined in the display view hierarchy before the corresponding display views are created. The configuration engineer may define where the new display view is located within the display view hierarchy and then create the new display view.

In addition to depicting the hierarchy pane 310, the graphical display configuration application UI 302 depicts a layout 312 which divides a display into four display screens and four display regions 314a-d (also referred to interchangeably herein as "display sub-areas" or "display portions"), and each display region 314a-d has a corresponding display view type. For example, the upper left corner display region 314a is defined to present hierarchy Level 1 display views. The lower left and lower right corner display regions 314b-c are defined to present hierarchy Level 2 and Level 3 display views and the upper right corner display region 314d is defined to present alarm list display views. The layout 312 also defines relationships or links between the display regions. For example, the lower left corner display region 314b automatically presents hierarchy Level 2 display views in response to an operator navigating from a hierarchy Level 1 display view to a hierarchy Level 2 display view in the upper left corner display region 314a. In another example, the upper right corner display region 314d may automatically display alarm lists of alarms included in one or more of the display views in the other display regions 314a-c.

The operator application UI 304 includes the layout 312 defined by the graphical display configuration application 110 which divides a display of an operator workstation into four display screens and four display regions 318a-d. The upper left corner display region 318a presents hierarchy Level 1 display views. The lower left and lower right corner display regions 318b-c present hierarchy Level 2 and Level 3 display views and the upper right corner display region 318d presents alarm list display views. The operator application UI 304 may present display views according to the hierarchy, layout, and/or other display view elements defined by the graphical display configuration application 110.

The graphical display configuration application UI 302 also includes an administration section 316 (which may, for example, relate to the administration of the operations application/environment 304) for assigning hierarchies, layouts, and/or themes to a particular operator workstation or set of operator workstations. In this manner, operator workstations for operators who monitor one section of the process plant may present hierarchies related to that section and may be restricted from accessing hierarchies related to other sections of the process plant. In some embodiments, a configuration engineer may assign all hierarchies and layouts to each operator workstation via the administration section 316 and the operators may select the layout and hierarchy to present on their respective operator workstations.

Figure 3B:
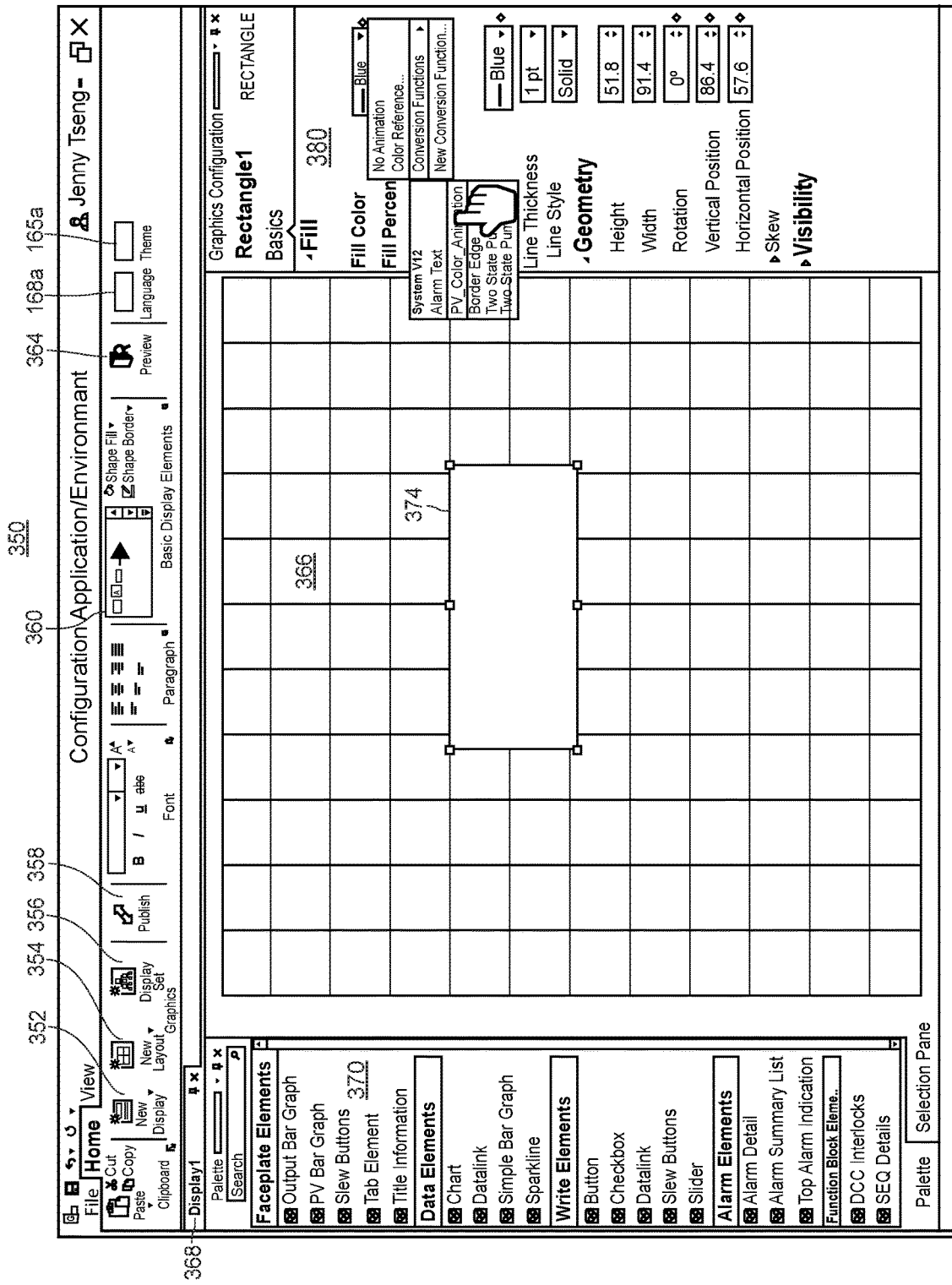
FIG. 3B is an example detailed view of a graphical display configuration application for defining graphics.

FIG. 3B illustrates a home tab 350 of the graphical display configuration application 110 for generating display views that are to be executed on an operator workstation. The home tab 350 includes a new display button 352 for creating a display view, a new layout button 354 for creating a layout, and a new display hierarchy button 356 for creating a hierarchy of display views. The home tab 350 also includes a configuration canvas 366 for configuring display view elements within a display view. The display view elements may be viewed in a configure mode upon selection of a configure button (not shown) and/or a preview mode upon selection of a preview button 364. In an alternate embodiment, the draft or working configuration of the display view elements may be presented (e.g., by default, or continuously presented) on the canvas provided by the configuration application 110, and only a preview button 364 may be displayed (e.g., as is illustrated by FIG. 3B), an activation of which causes a preview of the display view to be displayed in another area or window of the user interface provided by the configuration application 110. The preview mode or the separate display of the preview presents a preview of the display view as it would appear during runtime, so that a configuration engineer may see how the display view and display view elements will look to the operator. For example, the display view elements may be presented with themes, colors, etc. selected in the configuration mode. The configuration engineer may toggle graphical user controls, such as navigation bars, tab bars, etc. on the display view in the preview mode to see how the display view changes in response to user interactions.

To create a display view, the home tab 350 includes graphical user controls for selecting display view elements, such as a basic display elements button 360 which includes shapes such as rectangles, squares, circles, etc., arrows, connectors, text boxes, charts, or any other suitable basic display elements. A display view element selection pane or palette 370 may also be included for selecting display view elements such as faceplate elements, tab elements, bar graph elements, data elements, datalink elements, write elements, buttons, sliders, alarm elements, alarm detail elements, function block elements, navigation bar elements, GEM elements (e.g., such as described in co-owned U.S. patent application Ser. No. 15/692,450 filed on Aug. 31, 2017 and entitled "Derived and Linked Definitions with Override," the entire disclosure of which is incorporated by reference herein), or any other suitable display view elements. The configuration engineer may select display view elements by dragging and dropping the display view elements into the configuration canvas 366 or by using any other suitable graphical user controls. For example, in FIG. 3B the configuration engineer may select the new display button 352 to create a display view for Display1 (ref. no. 368) and may drag and drop a rectangle 374 from the basic display elements button 360 into the configuration canvas 366.

When the rectangle 374 is selected, the properties of the rectangle 374 are presented in an editing pane 380. The editing pane 380 may indicate several properties of the rectangle, such as the rectangle name (Rectangle 1), fill color (white), fill percentage (100%), line color (black), line thickness (1 pt.), line style (solid), etc. Each of the properties may be adjusted in the editing pane 380 via graphical user controls such as drop-down menus or free-form text fields. For example, the line thickness property may include a drop-down menu for selecting one of several line thickness values, such as 0.5 pt., 1 pt., 1.5 pt., etc. The fill color property may include a color palette for selecting one of several colors or a free-form text field for entering RGB color values. In some embodiments, the properties may also be adjusted via graphical user controls at the rectangle 374, such as via a pop-up menu in response to right clicking or double clicking on the rectangle 374. The properties included in the editing pane 380 are merely a few example properties for the rectangle 374. Additional or alternative adjustable properties may also be presented.

Furthermore, relationships or links between display view elements may be established by for example, connecting display view elements via lines or other connectors. Relationships or links may also be established by referencing other display view elements in the properties of a display view element. For example, a first display view element may represent a tank in the process plant. A second display view element may represent a process parameter value for the tank such as a fill percentage. In some scenarios, the configuration engineer may reference the first display view element in the properties of the second display view element so that the first and second display view elements are associated and included together in one or several display views. In some embodiments, each of the linked display view elements associated with a process plant entity or process control element may reference a control tag that refers to control modules, nodes, devices (e.g., field devices), and/or signals that are received and/or transmitted by devices, control modules, or nodes corresponding to the process plant entity.

In any event, the home tab 350 also includes a publish button 358 to publish a graphic (a display view, layout, or display view hierarchy) to the graphical configuration database 120. The published graphics may then be provided to a set of operator workstations and presented to the corresponding operators during runtime.

The graphical display configuration and usage systems and methods described herein provide various features and aspects in the configuration environment 102 of the process plant 10 which may be utilized by the configuration engineer or user while creating, designing, developing, or generating display views that are to execute in the operating environment 105 of the process plant 10. Moreover, by using these various features and aspects, the configuration engineer may significantly reduce the amount of time and resources it takes for configuring, defining, developing, and/or editing display views.

Figure 4:
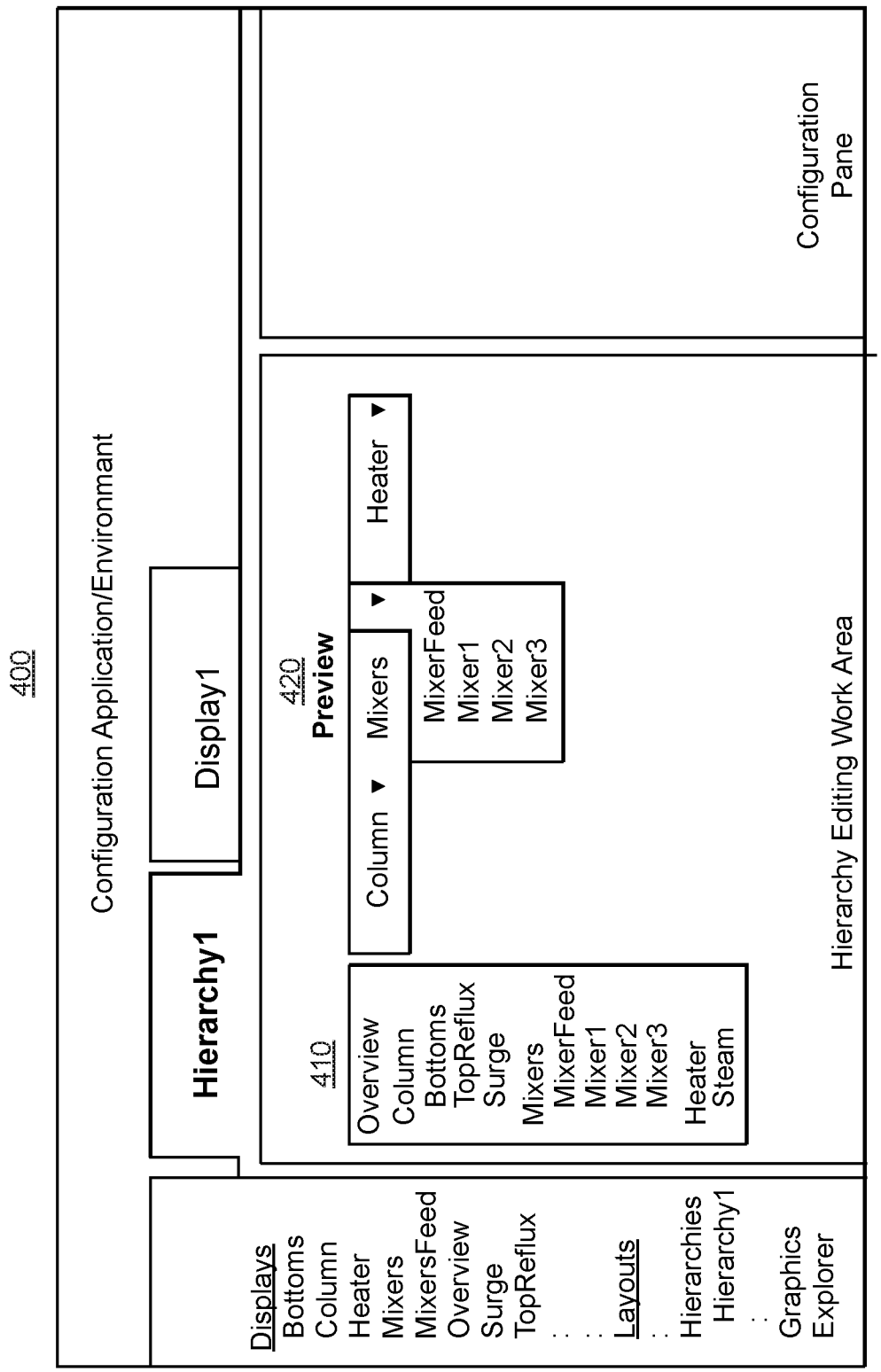
FIG. 4 illustrates an example of configuring and previewing a hierarchy of display views, which may be provided by a graphical display configuration application.

One example of such a feature is that of the previewing of operator display views and/or portions thereof. As mentioned above, the graphical display configuration application 110 presents a preview of the in-progress graphics during the configuration work flow, e.g., continuously on the canvas, or in a preview mode. FIG. 4 illustrates a preview 400 of an example display view hierarchy, which may be utilized by the configuration engineer during the creation and/or edit of the display view hierarchy configuration within the configuration environment 102. The configuration engineer may select a particular hierarchy from several hierarchies to preview, such as Hierarchy 1. The preview 400 includes a hierarchy pane 410 for viewing the hierarchy of display views. An interactive preview portion 420 is also included for selecting navigation buttons from a navigation bar to verify that the navigation bar presents the display views according to the hierarchy. The hierarchy pane 410 indicates that an overview display view is at the lowest level of detail (Level 1) and a column display view, mixers display view, and heater display view are at Level 2. As indicated by the hierarchy pane 410, the column display view includes three subviews: bottoms, top reflux, and surge. The mixers display view includes four subviews: mixer feed, mixer1, mixer2, and mixer3, and the heater display view includes one subview: steam.

The resulting navigation bar presented in the interactive preview 420 includes three navigation buttons corresponding to the three Level 2 display views. Upon selection of the mixers navigation button, a drop-down menu is presented and includes each of subviews of the mixers display view. During runtime, an operator may view a display view by selecting the display view from one of the drop-down menus in the navigation bar.

If the configuration engineer is satisfied with the interactive preview 420, she may select the publish button 358 as shown in FIG. 3B to publish the display view hierarchy and corresponding navigation bar. On the other hand, the navigation bar may be edited in the configuration mode to include one or more overview navigation button or to configure the navigation buttons in any other suitable manner. The configuration engineer may also adjust the display view hierarchy in the configuration mode by adjusting the hierarchy levels of the display views, adding or removing display views from the hierarchy, adding or removing subviews from a display view, or in any other suitable manner as described above with reference to FIG. 3A.

When the graphical display configuration application 110 publishes the graphic display view hierarchy, the published graphics may be saved within the configuration environment 102 (e.g., within the graphical configuration library 120, or other suitable memory) and/or may be downloaded and/or provided for presentation on respective display screens of one or more user interface (UI) devices 122 within the operating environment 105 of the process plant 10.

Another example feature which may be utilized by the configuration engineer or user while creating, designing, developing, or generating display views that are to execute in the operating environment 105 of the process plant 10 is a graphical element preview feature, which is typically (but not necessarily) used to preview, in the configuration environment 102, specific graphics that configuration engineers are developing for use on various display views, without requiring the compilation, download, and execution of the graphics into an operations environment 105. The graphical element preview is included in the configuration environment 102 and, as previously discussed, may be continually displayed/updated during the configuration workflow, or may be displayed per explicit user command (such as via a selection of the preview button 364 as shown in FIG. 3B), and may be used while a configuration engineer is defining or configuring various graphical elements on a display view. That is, a configuration engineer may preview graphical elements "in-line" with his or her configuration activities, e.g., without needing to suspend their configuration activities to evaluate how a draft graphic may appear and/or behave in operation, in a manner similar to that described above for previewing display view hierarchies in the configuration environment 102. Generally speaking, the graphical element preview feature depicts, via the user interface of the graphical display configuration application 110, how various graphical display view elements would look and behave in the operating environment 105 without requiring the graphical elements to be downloaded and executed within the operating environment 105. As such, by using the graphical element preview feature, the configuration engineer is no longer required to publish, download, and/or run interim drafts of graphical display view elements during configuration activities in order to confirm the graphical elements' operating environment appearances and behaviors. Rather, the configuration engineer is able to view the runtime appearances and behaviors of various graphical display view elements entirely within the configuration environment 102 as the display view is being created and/or edited, e.g., the configuration engineers are able to view the runtime appearances and behaviors of draft graphical elements on the editing canvas of the configuration environment 102 in-line with their configuration activities. As such, the amount of time that a configuration engineer must spend in creating or editing a display view is significantly decreased, and the engineer may work with confidence that the graphical elements included in a runtime display view will operate in the operating environment 105 as configured in the configuration environment 102.

Figure 5A:
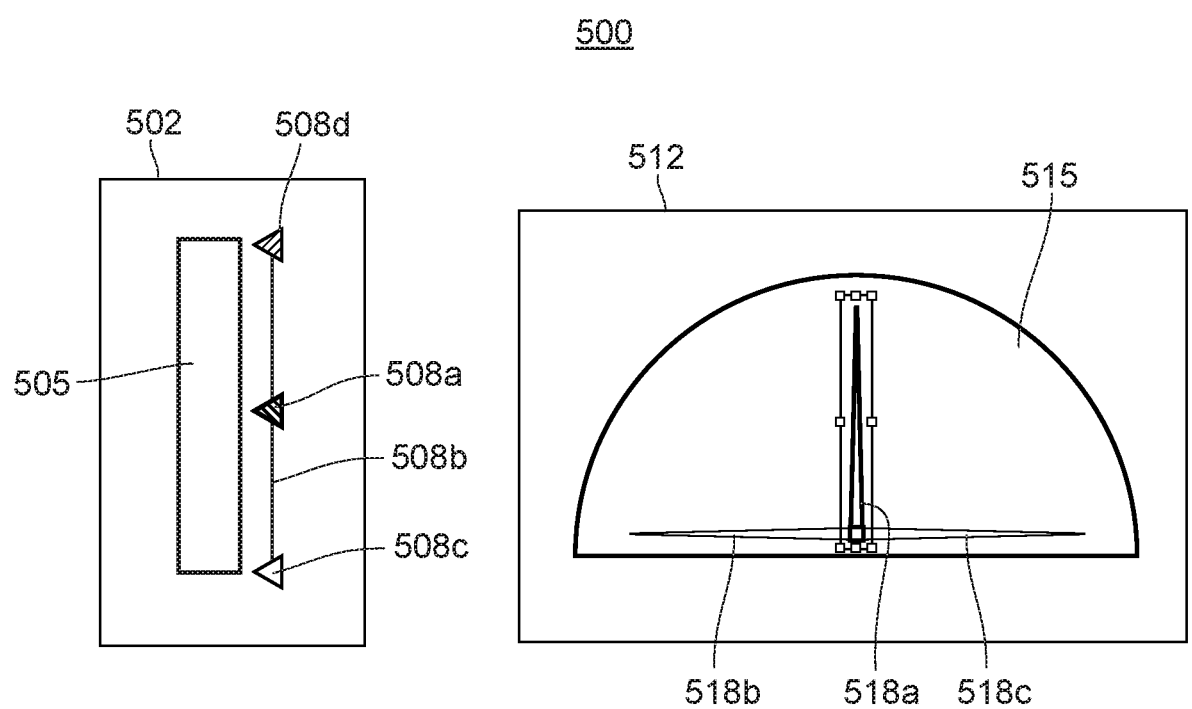
FIGS. 5A-5B illustrate an example of previewing graphical elements while configuring graphical display view and display view elements using a graphical display configuration application.
Figure 5B:
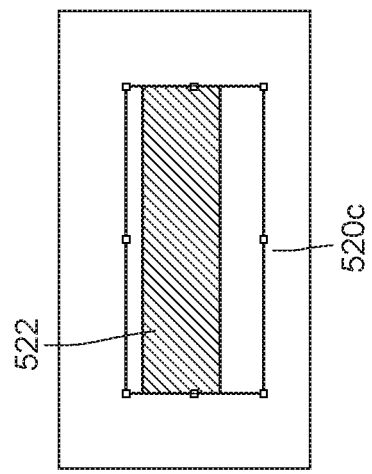
Figure 5B:
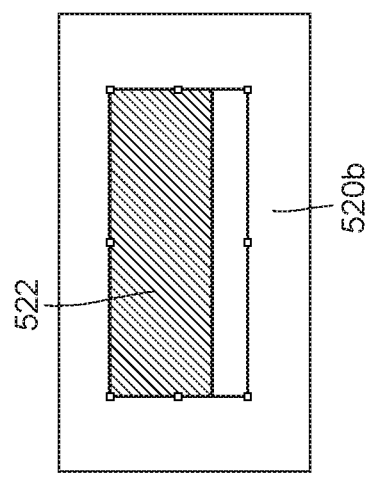
Figure 5B:
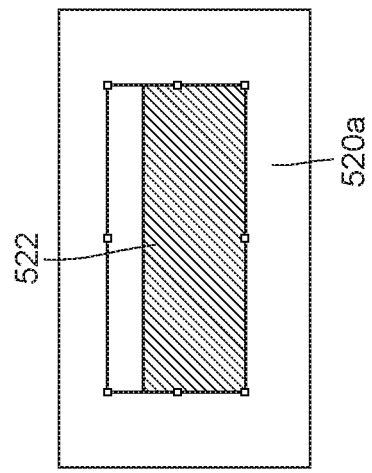

FIGS. 5A and 5B illustrate examples of the graphical element preview feature that is provided by the graphical display configuration application 110 in the configuration environment 102, e.g., continually during the configuration workflow and/or on demand, such as in manners previously discussed. In FIGS. 5A and 5B, respective ranges of motion (e.g., which may be indicated by respective limits, boundaries, or stops) of various graphics are depicted in a graphical manner on the configuration canvas. The configuration engineer is able to graphically define limits or stops for respective movement of a graphical element on the configuration canvas and preview said limits/stops without requiring user calculations to determine numerical limits/stops, and/or without performing an edit-publish-run cycle for the graphical element.

For example, FIG. 5A depicts an example display view graphical element of an animated bar graphic 502 which may be included on various different display views. The animated bar graphic 502 includes a bar shape 505 as well as a corresponding animation portion 508a-508d that enables a user to graphically and easily define (e.g., by manipulating user interface graphical handles 508a, 508c, 508d) and view a respective range of motion (e.g., maximum and minimum positions) of the triangle shape 508 with respect to the bar shape 505. In the bar graphic 502, the triangle 508a indicates or defines a position animation corresponding to the top horizontal edge of the bar 505 along a vertical axis 508b. That is, triangle 508a indicates that the top horizontal edge of the bar 505 may move along the vertical axis 508b. In some implementations, the triangle 508a may serve as a user interface handle via which the engineer is able manipulate to graphically define the desired range of motion of the animation 508. Further, within the animation portion 508, the triangle 508c indicates an initial or minimum start position of the top horizontal edge 508a of the bar 505 and the triangle 508d indicates a maximum stop position of the top horizontal edge 508a of the bar 505. In an embodiment, the configuration engineer may move the handle triangle 508a between desired limit/stop positions 508c, 508d to thereby graphically define or configure the desired range of motion of the bar 505. The triangles 508a, 508c, and 508d may be visually distinguished in any suitable manner. For example, the triangle 508a may illustrated in a first color (e.g., blue) to signify that it corresponds to the desired animation, while the triangles 508c and 508d may be illustrated in a second color (e.g., gray) to signify that they correspond to stops or limits. Additionally, in some implementations, a green dot may be placed on the triangle 508c to indicate that the triangle 508c represents a start position, and a red dot may be placed on the triangle 508d to indicate that the triangle 508d represents a stop position. Of course, the particular implementation illustrated in bar graphic 502 is only one of many possible implementations. For example, the animation indicators 508a, 508c, 508d may utilize shapes other than triangles. Additionally or alternatively, the types, handles, and/or directions of animations 508a, 508b may be indicated by other shapes, colors, or other differentiated visualizations, and/or the start positions/end positions 508c, 508d may be indicated by still other desired shapes, colors, and/or other differentiated visualizations. In some implementations, the animated bar graphic 502 may be included in the configuration library 120 out-of-the-box, so that configuration engineers merely drag, drop, and position the various parts 505, 508a-508d of the bar graphic 502 to thereby automatically configure the graphic 502, its animation(s) 508a, 508b, and the limits or range of motion 508c, 508d of its animation(s) as desired. The revised animated bar graphic 502 may then be stored (and at some point, published) as a separate display view element object, or may be stored (and at some point, published) as a version of the out-of-the-box object definition.

FIG. 5A also depicts an example display view graphical element of an animated gauge graphic 512. The animated gauge graphic 512 includes a half-circle shape 515 and an animated needle 518a which may rotate across the shape 515. The range of animation of the needle 518a is indicated by the stops 518b, 518c, which respectively indicate a start position 518b of the needle 515a (which may, for example, be indicated by the start position 518b having a green color) and a stop position 518c of the needle 515a (which may, for example, be indicated by the stop position having a red color). In an embodiment, the needle 518a may serve as the user interface graphical handle which a configuration engineer may manipulate/move to thereby graphically define the range of motion 518b, 518c of the needle 515a during runtime operations. The gauge graphic 512 may be included in the configuration library 120 out-of-the-box, so that configuration engineers may merely drag, drop, and position the various portions of 515, 518a-518c of the graphic 512 to thereby automatically configure the graphic 512, its animation 518a, and the limits 518b, 518c of the range of motion of the animation needle 518a. The revised animated gauge graphic 512 may then be stored (and at some point, published) as a separate display view element object, or may be stored (and at some point, published) as a version of the out-of-the-box object definition.

FIG. 5B depicts another example display view graphical display view element, e.g., that of an animated fill percent graphic 520. Generally, the animated fill percent graphic 520 may be utilized to depict the fill level of a corresponding control element in the process plant, such as a tank or a vessel (which itself may be a different graphical element). By dragging, dropping, and/or positioning the animation fill indicator 522 and/or its edges, the configuration engineer may graphically configure various different fill directions and stop positions, e.g., low to high as shown by reference 520a, high to low as shown by reference 520b, or filling between two designated levels as shown by reference 520c. For instance, with simultaneous reference to FIG. 2C, the fill percent graphic 520a may correspond to the bottom-to-top fill animation 162a included in the tank graphic 155a.

Of course, the graphical display view elements 502, 512, 522 are only three examples of many graphical display view elements that are able to be previewed in the configuration environment 102. Generally speaking, any graphical display view element having configurable animation properties may be previewed in the configuration environment 102 without having to be downloaded and executed in the operating environment 105. Further, the configurable animation properties of a graphical display view element may be at least partially (if not totally) graphically defined by the configuration engineer by manipulating and/or moving one or more handles of the graphical display view element.

Figure 5C:
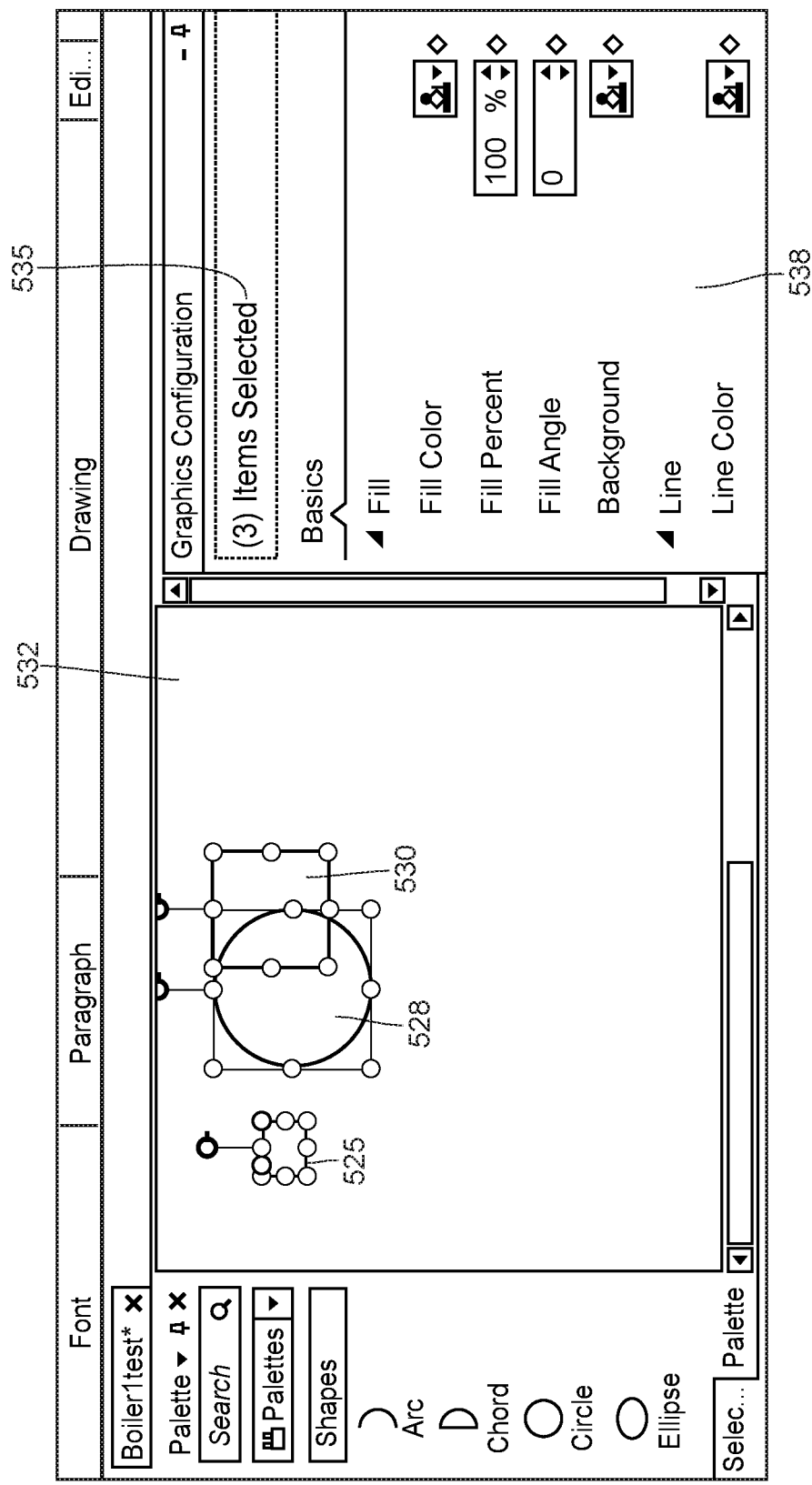
FIG. 5C illustrates an example of bulk-editing while configuring graphical display view and display view elements using a graphical display configuration application.

FIG. 5C illustrates another feature provided by the graphical display configuration application 110 that allows bulk-edits to be simultaneously applied to multiple graphical display view elements which are displayed on the configuration display canvas. As shown in FIG. 5C, the configuration engineer has selected three different graphical elements 525, 528, 530, e.g., as is depicted visually by the highlighted shapes on an editing canvas 532 provided by the graphical display configuration application 110, and as is textually indicated 535 on the corresponding editing pane 538 of the configuration user interface. The editing pane 538 also includes various selectable and/or configurable properties which may be applied to the selected elements 525, 528, 530 in a bulk-manner. That is, a single user selection and/or configuration of one of such properties causes the selected/configured property to be applied to all selected elements 525, 528, 530. Such bulk-editable properties may include, for example, fill properties (e.g., color, percent, angle, background, etc.), line properties (e.g., width, solid, dashed, bold, etc.), geometry (e.g., width, height, rotation angle, center point, etc.), references to one or more standards or other values that are to be linked to the selected graphical elements, changes to an animation, changes to a script, and the like. Furthermore, bulk-selecting and/or bulk-configuring a particular property of multiple graphical display view elements may be automatically previewed on the configuration canvas 532. For example, a configuration engineer may open a color palette to select a fill color that is to be applied to the elements 525, 528, 530, and while the engineer rolls the cursor over the palette prior to selection, the fill color of each of the selected graphics 525, 528, 530 may automatically change to reflect the particular colors of the palette over which the cursor is being rolled. In another example, a configuration engineer may graphically rotate a selected group of shapes by selecting and moving a respective handle of one of the selected shapes. As the engineer changes the angle of rotation, not only do the selected shapes all rotate accordingly on the configuration canvas, but the respective rotation angle values displayed in the editing pane 538 also automatically change to numerically reflect the corresponding rotation angles previewed on the display canvas. Generally speaking, any property which may be selected and/or configured for a single graphical display view element may be able to be bulk-applied to a selected group of graphical display view elements. Additionally, the selection and/or configuration may be graphically implemented without requiring the user to enter any numerical boundaries or definitions, e.g., by grabbing and manipulating a handle of one of the selected elements.

Figure 5D:
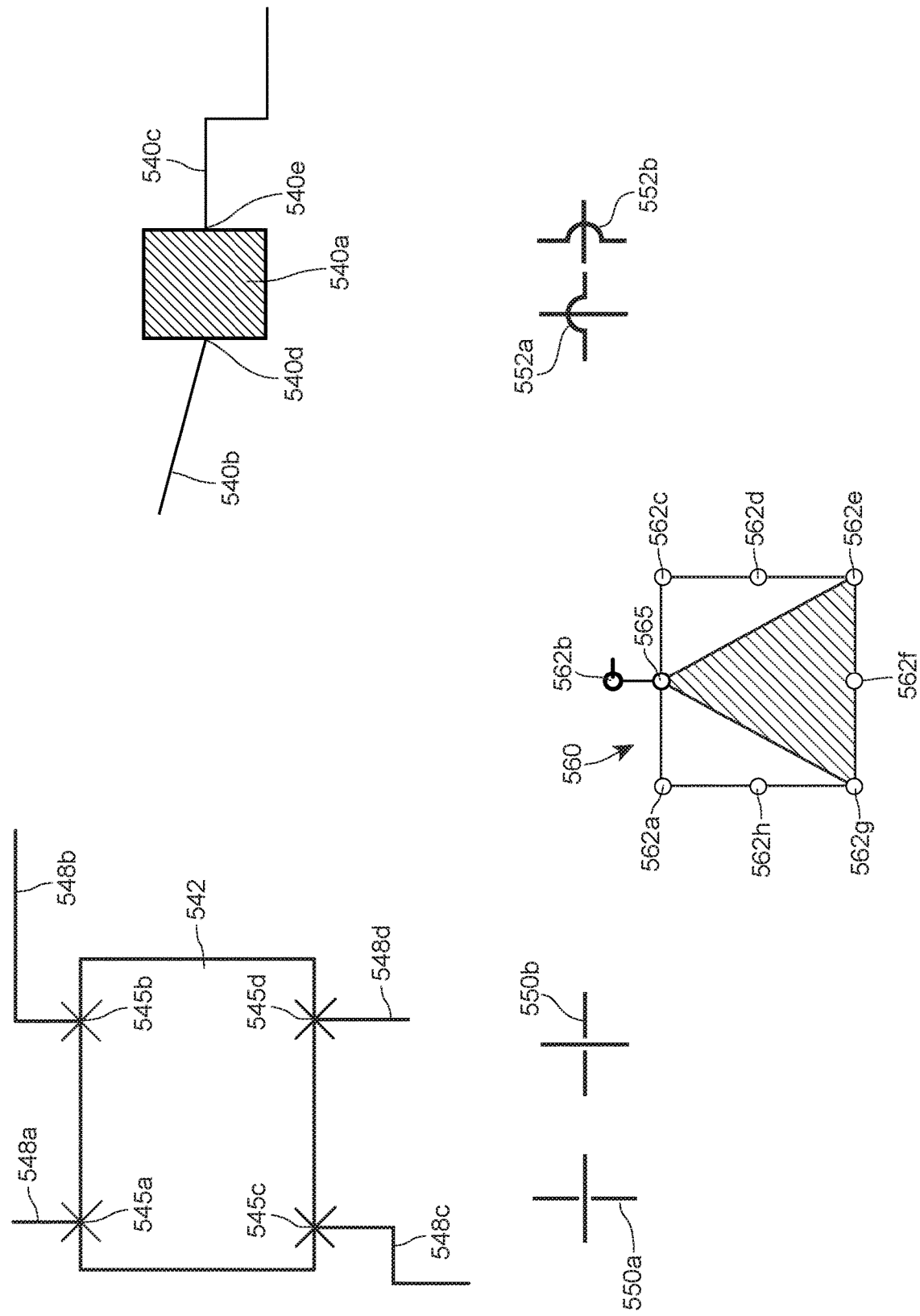
FIG. 5D illustrates examples of additional features which may be provided by a graphical display configuration application and utilized while configuring graphical display view and display view elements.

FIG. 5D illustrates other features that may be provided by the graphical display configuration application 110, and which may be utilized by the configuration engineer while creating, designing, developing, or generating display views that are to execute in the operating environment 105 of the process plant 10. One such feature 540a-540e may allow lines to remain attached to the shape(s) or graphic(s) to which they are connected, e.g., when the user moves the shape(s) or graphic(s) to different locations on the configuration canvas. To illustrate, the shape 540a is being configured within the configuration environment 102 to have a connecting straight line 540b and a connecting elbow line 540c. As the engineer moves the shape 540a around the canvas, the lines 540b, 540c remain connected to the shape 540a, e.g., via respective points of connections 540d, 540e. Additionally, an engineer may define desired points of connection for a given shape or graphic, as illustrated by the shape 542 on which the configuration engineer has defined four desired points of connection 545a-545d. For example, the shape 542 may represent a tank, the points of connection 545a-545d may represent locations at which different pipes are attached to the tank, and lines 548a-548d that are respectively attached to the points of connection 545a-545d may represent the different pipes that are attached to the tank. As the configuration engineer moves the shape 542 around the canvas, the lines 548a-548d remain attached to their respective points of connection 545a-545d. As a display view may include numerous different shapes (e.g., hundreds of different shapes), a configuration engineer may lock a position of a particular shape (not shown) so that the locked shape is not able to be accidentally moved while re-positioning another shape, and the configuration engineer may unlock a locked shape if he or she desires to move it to a different location. Further, a configuration engineer may select a particular shape or area on the configuration canvas to be hidden and/or grayed-out (not shown), so that the configuration engineer is more easily able to focus on configuring other shapes and/or areas. The hiding/graying out of selected shapes and/or areas is a feature that is provided only in editing mode of the configuration environment 102 as a convenience to the configuration engineer, and is not reflected as a configured property of the display view. Of course, the configuration engineer may show or reverse grayed-out shapes when desired.

Another feature that may be provided by the graphical display configuration application 110 is the Crossover Configuration feature which enables the configuration of crossovers of lines and a corresponding crossover style or effect. Operator display views may depict process pipes for various kinds of flows (e.g., process streams, electrical supply, air supply, etc.) using lines. A single display may include multiple different lines (e.g., 10-20 different lines, or more) and it may be unavoidable that some of the lines may cross on the display view. A line drawing convention is usually adopted to remove ambiguity about whether or not crossing lines indicate that pipes are physically joined at the intersection. Commonly-used conventions to indicate that crossing lines do not represent physically-joined pipes include, for example, a line break or gap at a crossover as shown by reference 550a, 550b, or a semi-circle at a crossover as shown by references 552a, 552b. In current graphical configuration systems, typically any properties of a line, e.g., animating the line 550a or 550b, must be duplicated and repeated for each line segment on either side of a crossover, which creates extra configuration and testing effort for the configuration engineer. Moreover, in current graphical configuration systems, the graphics engineer must manually draw the crossover 550, 552. This results in a significant effort and time to size, position, and apply various properties to lines, as well as increases the chance of configuration errors, such as the engineer forgetting to animate a line segment.

However, with the Crossover Configuration feature provided by the graphical display configuration application 110, the engineer is able to configure when a line should indicate a crossover, and the desired crossover style or effect that is to be shown on the display view (e.g., line break or gap, semi-circle, or other suitable crossover style or effect). As such, any properties that are applied/configured to a line that includes one or more crossovers are automatically applied/configured to all segments of the line. Consequently, line properties need only be configured once for a particular line and the chance of configuration errors is significantly decreased. Further, instead of manually drawing each crossover, a configuration engineer may choose a selected crossover style or effect to automatically apply a single line, to a group of lines, or to all lines included in the display view.

In some embodiments, a crossover effect may automatically adjust to accommodate the thickness of the line to which it is applied. A crossover effect may automatically adjust when a configuration engineer changes the orientation, location, length, and/or other properties of a line in which the crossover effect is included. Additionally, a crossover effect is not damaged by stacking order of display view elements on the display view. That is, Send Back/Bring Forward commands that are applied to a line that includes crossover effects do not change its configured crossover effects, even when the line is stacked behind another line that does not include crossover effects. Further, crossover effects are not limited to being applied to only right-angled crossovers such as illustrated by the references 550, 552 of FIG. 5D, and may be applied to any angle of line crossover.

FIG. 5D depicts another feature that may be provided by the graphical display configuration application 110, and which may be utilized by the configuration engineer user while creating, designing, developing, or generating display views that are to execute in the operating environment 105 of the process plant 10, e.g., the On Canvas Graphical Editing feature, as demonstrated by the example graphic 560. The On Canvas Graphical Editing feature allows properties that are commonly changed for process control configuration purposes to be graphically edited on the canvas of the graphical display configuration application 110 via respective handles. In particular, in addition to handles that are provided to configuration engineers via which the engineers are able to change the length, width, height, and rotation of various shapes (e.g., as indicated by references 562a-562h), one or more additional handles 565 are provided, e.g., out-of-the-box, to enable configuration engineers to easily change one or more commonly-changed properties of a particular shape for process control configurations. For example, for the triangle shape 560, the handle 565 is provided out-of-the-box and allows a configuration engineer to easily change the triangle's skew. Similar handles may be provided for other shapes. For example, for a rounded rectangle shape (not shown), respective handles for skew, size, and/or types of corners may be provided, e.g., out-ofthe-box. The configuration engineer may manipulate the provided handles to graphically edit the shape on the configuration canvas as desired. Further, numerical representations of the manipulations may automatically be captured by the graphical display configuration 120 when a handle is manipulated to a desired position and saved by the configuration engineer.

Figure 5E:
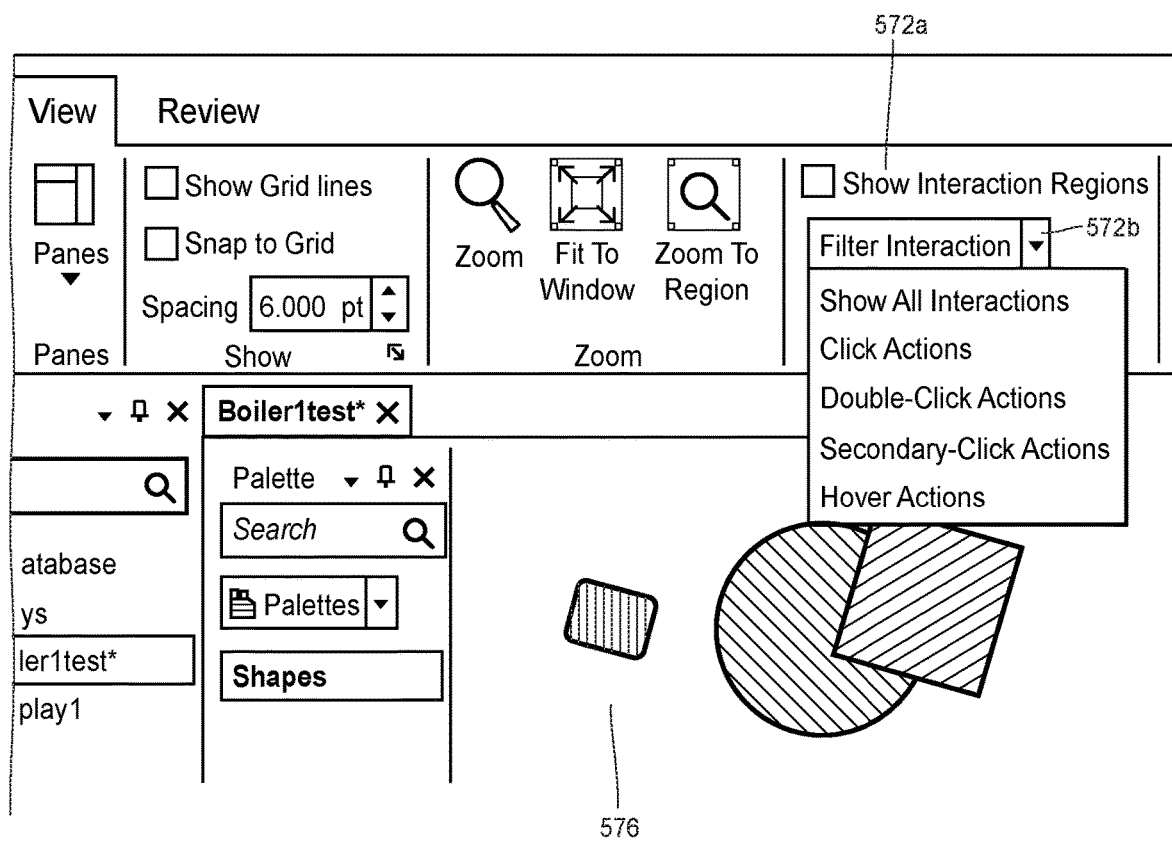

FIGS. 5E and 5F illustrate an embodiment of yet another feature, e.g., the Show Interactions feature, that may be provided by the graphical display configuration application 110, and which may be utilized by the configuration engineer user while creating, designing, developing, or generating display views that are to execute in the operating environment 105 of the process plant 10. Referring first to FIG. 5E, the Show Interactions feature provides one or more user controls 572a, 572b that enable a configuration engineer to easily find all shapes and/or graphics that have been configured with operator interactions. Operator interactions include user controls that are configured into a particular shape or graphic via which an operator may activate, within the operating environment 105, to produce some kind of a response. Examples of operator interactions include click actions, double-click actions, secondary-click actions, hover actions, and the like. As such, when the configuration engineer activates the Show Interaction Regions user control 572a, one or more interaction hotspots or areas that include operator interactions configured therein may be indicated 574a, 574b, 574c on the configuration canvas 576, as depicted in FIG. 5F. A second user control 572b (e.g., as depicted in FIG. 5E) allows a configuration engineer to filter based upon type of operator interaction, if desired. In FIG. 5F, the interaction hotspots or areas 574a, 574b, 574c are indicated by a greyed outline around the graphical elements that are configured to include one or more operator interactions, but any other suitable visualization may be utilized to indicate interaction hotspots/areas. Additionally, corresponding textual descriptions of the indicated operator interactions may be presented in a separate area 578 of the user interface provided by the graphical display configuration application 110. Indications of interaction hotspots/areas may be turned on and off (either individually or as a group), to thereby help the configuration engineer to see overlaps as well as provide a summary of which graphical display view elements of the display view have configured interactions. The Show Interactions feature may be implemented as a particular view of the target display view, in an embodiment, and may be enabled or disabled as desired to reduce clutter appearing on the editing canvas during configuration.

Figure 5G:
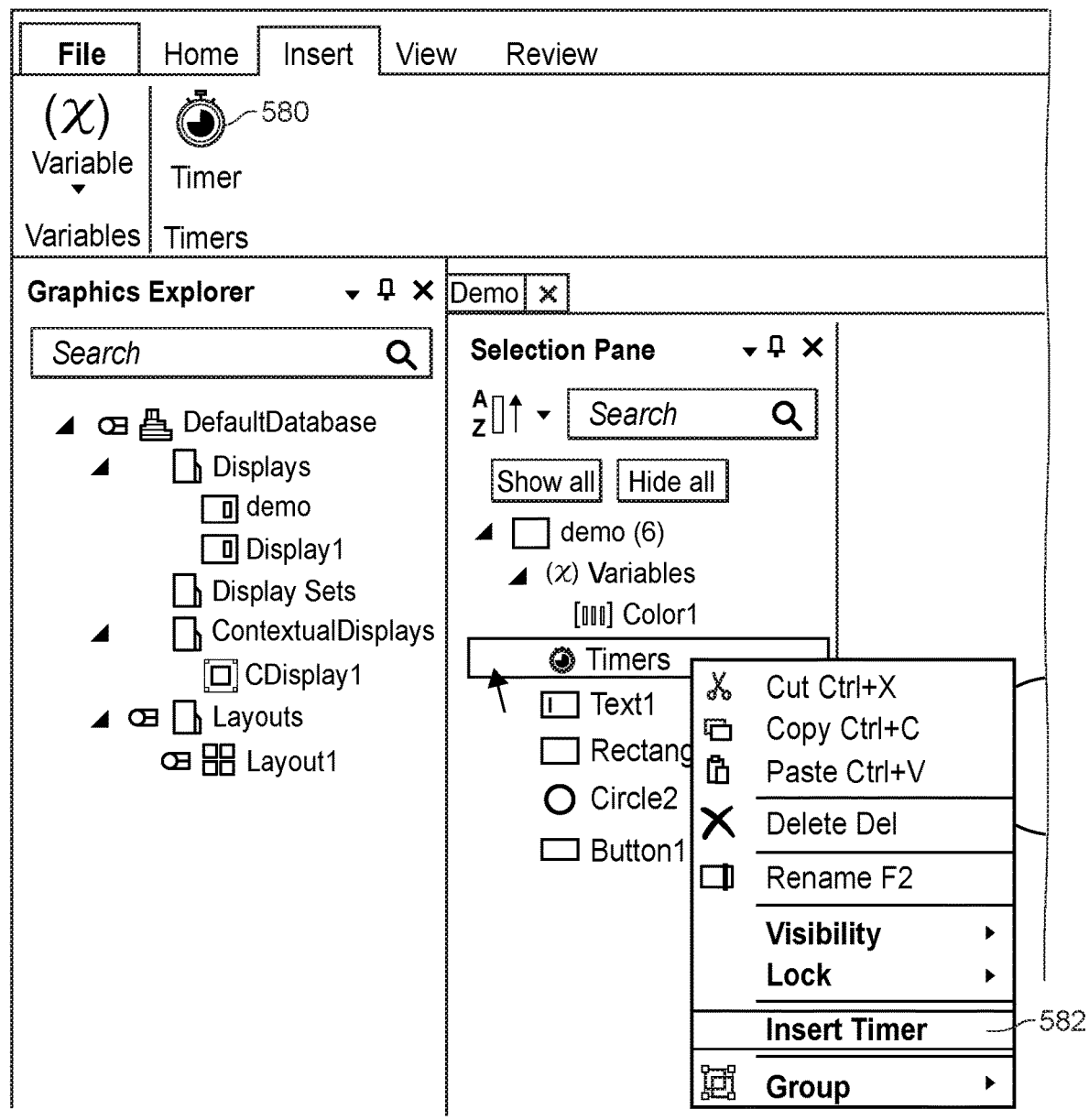
FIG. 5G illustrates an example of configuring timers into graphical display view and display view elements while using a graphical display configuration application.

FIG. 5G illustrates an embodiment of yet another feature, e.g., the Timer feature 580, that may be provided by the graphical display configuration application 110, and which may be utilized by the configuration engineer user while creating, designing, developing, or generating display views that are to execute in the operating environment 105 of the process plant 10. Generally speaking, the Timer feature 580 provides the ability of a configuration engineer to insert timers inside of display views, contextual displays, GEM classes, groups, layouts, and/or other types of display view elements. For example, as shown in FIG. 5G, via a user selection 582, a configuration engineer may configure a timer to be associated with another graphical display view element, or with the graphical display view itself. A timer may be implemented as an object that may be included in or otherwise linked to one or more other graphical display view elements. Generally speaking, to configure a timer, a configuration engineer may specify information that identifies and/or describes the timer (e.g., title, description, tag, etc.), and may specify one or more properties of the timer such as action, duration, and/or whether or not the timer is active. In an illustrative example, a timer is configured to be associated with a particular graphical display view element, and when the particular graphical display view element executes in the operating environment 105, the timer runs continuously and executes its configured action corresponding to the graphical display view element according to its configured duration, e.g., the timer executes its configured action once every configured duration. For example, a layout may be configured to include a timer that closes a particular window included in the layout if a particular control measurement has not been received at the particular window by the time the timer expires. In another example, an alarm may be configured with a first timer that initiates a defined visualization if no operator response is received within the duration of the first timer, and the alarm may be configured with a second timer that initiates an escalation procedure if no operator response is received within the duration of the second timer. In embodiments in which a timer is configured to include an "active" property, which may be a Boolean property, the timer executes its action(s) when the "active" property is set to True, and does not execute its action(s) when the "active" property is set to False. The "active" property may be implemented as an animation of the timer, as a reference within the timer to a variable, custom property, or standard, or otherwise as desired.

Figure 6A:
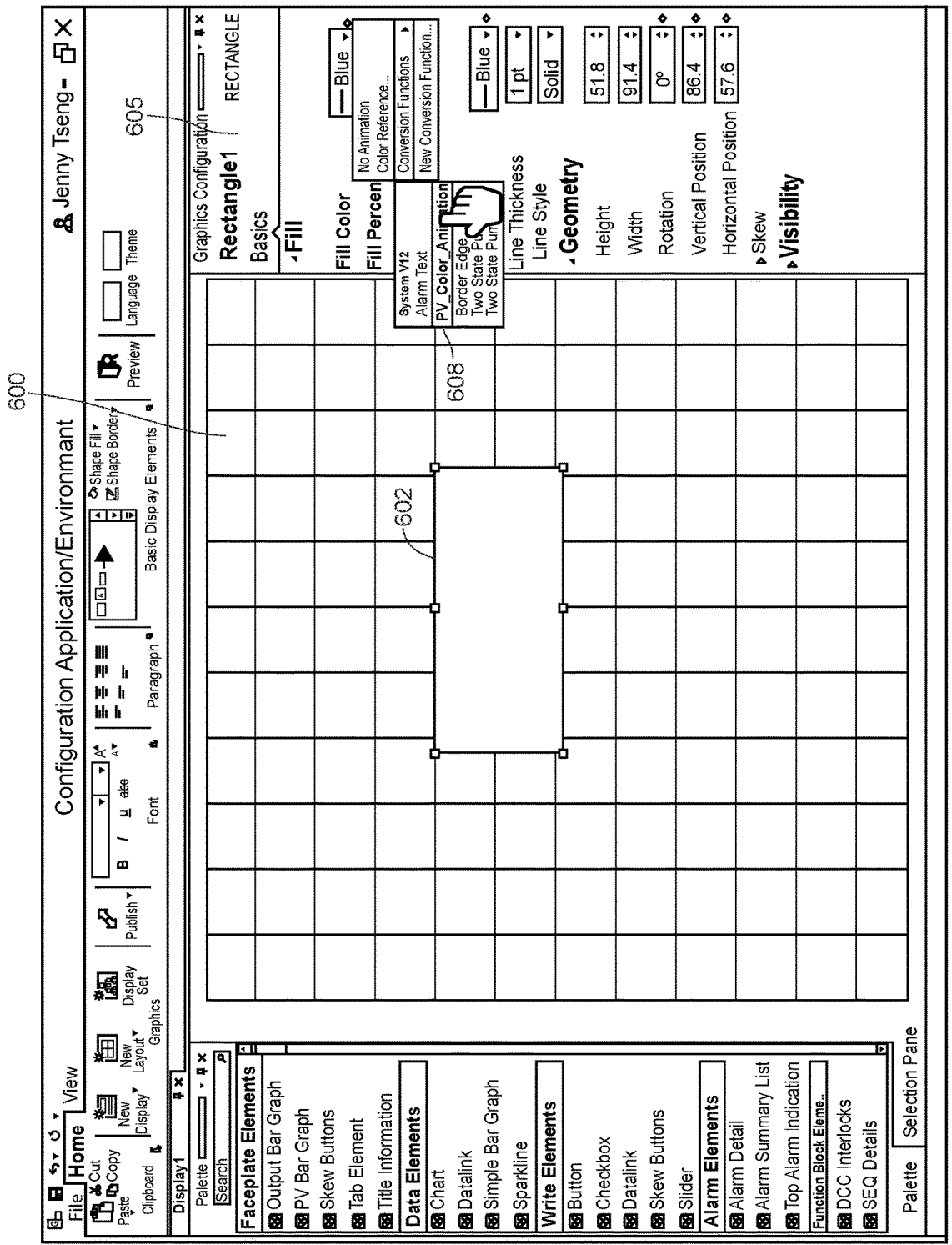
FIGS. 6A-6B illustrate an embodiment of animation conversion function display view elements which may be provided by a graphical display configuration application.
Figure 6B:
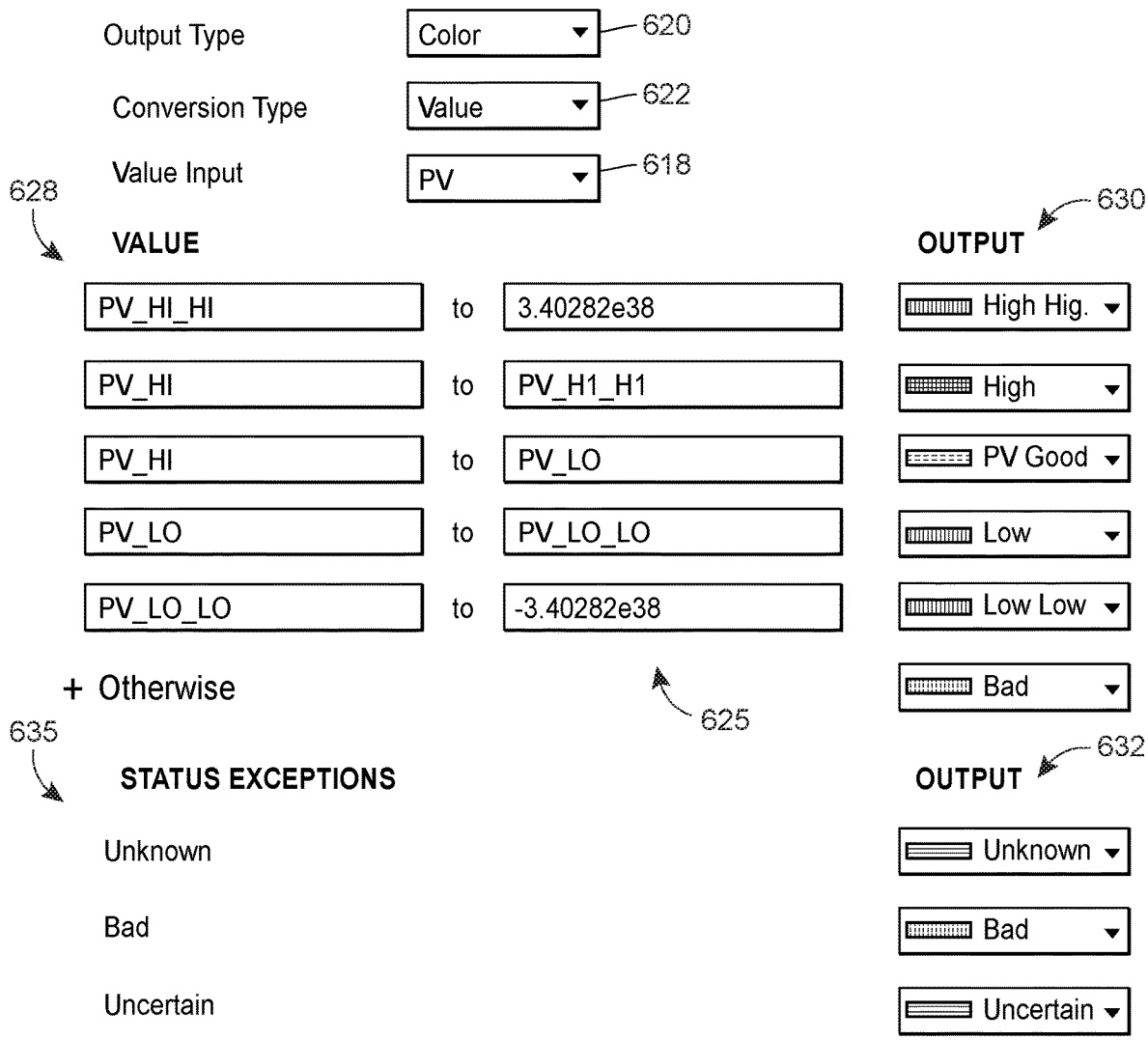

Turning now to FIGS. 6A and 6B, an example of a type of display view element that is provided by the graphical display configuration and usage systems and methods described herein is an Animation Conversion display view element, also interchangeably referred to herein as a Library Animation display view element. As is commonly known, an animation is a dynamic action or change that is triggered to be implemented on or applied to a portion of a graphic included on a display view when one or more conditions occur. For example, a field of a graphic may be configured with an animation in the configuration environment 102 so that, in the operating environment 105, if a particular alarm becomes active, then a portion of the text included in the field is made visible on the graphic. In another example, a particular display view may be configured with an animation in the configuration environment 102 so that, in the operating environment 105, when a value of a particular process variable (PV) exceeds a threshold, an indication for the operator to take some sort of action may appear on the display view, e.g., a flashing display, change of color, etc. Often in process control systems, the triggering conditions for an animation is a combination of multiple conditions, and/or the animation may include a combination of colors and/or other properties which may be applied to one or more graphical display view elements.

In currently known process control configuration systems, logic defining the particular combination of the conditions that trigger a particular animation on a particular graphic must be configured individually (e.g., by using a script) for each instance of the graphic object and for each graphics object property (e.g., the animation must be applied separately to each property of each instance of a graphic object). As the logic defining the triggering conditions often involves complex logical or mathematical expressions, configuration engineers are required to understand and manipulate associated, complex syntaxes to be able to configure various graphics and/or graphical properties with animations. Moreover, as the triggering condition logic is not reusable, significant development and testing effort must be performed every time the logic is used, e.g., for each instance of a graphic object, for each graphical property of a graphic object, etc. As such, with currently known configuration systems, the configuration engineer is personally responsible for maintaining animation consistency across the graphics, which often may result in errors both during graphics development and graphics maintenance (e.g., when minor graphical configuration changes need to be applied) as the triggering condition logic cannot be consistently and/or globally implemented using known process control configuration systems.

On the other hand, the Animation Conversion Function display view elements of the present disclosure address these and other drawbacks. In particular, an Animation Conversion Function display view element may be implemented in the configuration environment 102 as a particular type of object (e.g., an Animation Conversion Function object) in which the triggering condition logic of an animation is or has been defined or specified. In an embodiment, the triggering condition logic of an Animation Conversion Function object is implemented as a function that has one or more inputs and an output, where the one or more inputs correspond to various conditions, the function defines the logic that is applied to the one or more inputs, and the output indicates a type of animation and/or whether or not the animation is to be applied to its host view or element based on the results of the function operating on the inputs. The function logic may take the form of one or more calculations that are performed on input values, a script, a table, and/or any other suitable implementation(s). Generally speaking, though, during the configuration of a graphical display or element, when referencing a defined Animation Conversion Function, a configuration engineer need only specify the name of the defined Animation Conversion Function and provide desired values of various conditions that will trigger the application of the animation or change to the host view or element during runtime, without needing to have knowledge of what the triggering condition logic is and/or how the trigger condition logic is implemented. Accordingly, during runtime in the operating environment 105, an Animation Conversion Function animates its host graphical display view or element based upon values of triggering conditions which have been specified by the configuration engineer.

Each Animation Conversion Function object may be uniquely identified by a name or other suitable identifier, and Animation Conversion Function objects may be stored in the graphical configuration library 120 and published so that they may be easily referenced by any other display view element object, any display view object, and/or any event. Indeed, in an embodiment, Animation Conversion Functions may be nested, so that one Animation Conversion Function references another Animation Conversion Function. At any rate, when configuring display views and display view elements, configuration engineers may simply reference a desired Animation Conversion Function object (e.g., via its name or other suitable identifier) within or with respect to a display view or display view element. In an embodiment, when a configuration engineer references a particular Animation Conversion Function to a graphical display view or element in the configuration environment 102, various fields corresponding to the referenced Animation Conversion Function are automatically presented to the configuration engineer so that the configuration engineer is able to specify desired triggering values. Such value-receiving fields may be labeled with aliases or names that are meaningful to the configuration engineer, for example. Accordingly, with Animation Conversion Functions, configuration engineers are shielded from needing to understand mathematical and/or programming syntaxes when referencing animations, and need only to provide a name and triggering values, in most embodiments.

Moreover, as Animation Conversion Functions are able to be defined as objects and stored in the graphical configuration library 120, the respective triggering condition logic included in each Animation Conversion Function need only be created and tested once, thus significantly reducing the time needed to create and test the display views in which the animation is included. Similarly, if a change to the triggering condition logic is needed, the change needs only to be tested once.

A snapshot of an example workflow for configuring a graphical display view element with an Animation Conversion Function in the configuration environment 102 is shown in FIG. 6A. In FIG. 6A, the user interface of the graphical display configuration application 110 provides a configuration editing canvas 600 on which a configuration engineer has positioned a rectangle shape 602. In an editing pane 605, the configuration engineer selects a particular Animation Conversion Function 608, e.g., in this example, the "PV_Color_Animation," from a set of named Animation Conversion Functions (each of which corresponds to a respective, defined Animation Conversion Function object stored in the graphical configuration library 120) that the configuration engineer desires to be applied to the rectangle shape 602, to thereby cause the instance of the display element object defining the rectangle 602 to be configured with the PV_Color_Animation. Subsequent to the selection of PV_Color_Animation 608 by the configuration engineer, one or more input fields respectively corresponding to various conditions or inputs to PV_Color_Animation may be presented in the editing pane 605 (not shown) so that the configuration engineer is able to define the various triggering condition values that will cause the PV_Color_Animation to be applied to the rectangle shape 602 during runtime. For example, input fields corresponding to a particular input (e.g., a process variable PV), a lower boundary value of the input (e.g., PV_LO), an upper boundary value of the input (e.g., PV_HI), etc. may be presented in the editing pane 605 so that the configuration engineer is able to enter desired values. (Of course, some Animation Conversion Functions may not include any user-configurable trigger condition values.) Thus, during runtime in the operating environment 105, the instantiated rectangle 602 may be animated with a color fill as defined by the PV_Color_Animation function based on the PV values provided by the configuration engineer.

In an embodiment, the graphical configuration library 120 may include a set of selectable, pre-defined Animation Conversion Functions out-of-the-box, each of which may abstract its implementation from the configuration engineer. Of course, the configuration engineer may be able to edit an out-of-the-box Animation Conversion Function as desired, and subsequently store/publish the edited Animation Conversion Function as another version of the out-of-the-box Animation Conversion Function, and/or as a new Animation Conversion Function. Additionally, the graphical display configuration application 110 provides the configuration engineer with the ability to define new or custom Animation Conversion Functions from scratch, if desired.

To illustrate definitions of Animation Conversion Functions, FIG. 6B depicts a definition 615 of an instance of the PV_Color_Animation conversion function of FIG. 6A as stored in the library 120. As indicated by reference 618, the value input field indicates which input to the PV_Color_Animation conversion function of FIG. 6A is to be utilized by the conversion function, in this case, "PV." As indicated by reference 620, the type of the conversion function's output is "Color." Additionally, as indicated by reference 622, the conversion type of the PV_Color_Animation conversion function is defined as "Value." In this instance of the PV_Color_Animation Function, the configuration engineer has specified triggering values 625 of various conditions, which are indicated by their user-friendly aliases 628. Additionally, the PV_Color_Animation definition 615 defines respective outputs 630 (of the type "Color" 620) that are to be applied to a host element when the respective condition values 625 occur. Respective outputs 632 that are to be applied to the host element when exceptions 635 to the function (e.g., unknown, bad, or uncertain conditions) occur are also provided in the definition 615. Of course, other types of function inputs, outputs, and conversions are additionally or alternatively possible. For example, a set of inputs may include different types of variables associated with the process plant 10 (e.g., process variables, control variables, disturbance variables, output variables, etc.), e.g., variables whose values may dynamically change while the process is executing. Further, inputs may be of any type, e.g., Boolean, number, string, color, font, image, measurement, etc. A set of output types may include, for example, colors, numbers, images, dynamic visualizations, etc., each of which may also include indications of size, position, and the like. A set of conversion types may include, for example, values, scripts, and/or functions that specify or define different visualizations and/or behaviors.

Further, when a configuration engineer is creating or defining a new Animation Conversion Function using the graphical display configuration application 110, the configuration engineer may configure/define any of the fields 618-635 of the new Animation Conversion Function as desired, and include more, less, and/or different fields as desired. For example, a configuration engineer may create/define a new Animation Conversion Function to produce a particular set of output actions and/or visual effects given a particular set of inputs combined using a particular logic. Further, when creating a new Animation Conversion Function, configuration the engineer may define the logic of the new function (e.g., by using a script or other suitable logic representation), and the defined logic may be stored with the definition 615. Typically, though, logic definitions of Conversion Animation Functions are made available (e.g., for viewing and/or edit) to configuration engineers who define or edit Conversion Animation Functions, and are not provided (e.g., for viewing and/or edit) to configuration engineers who reference defined Conversion Animation Functions in display views and/or in display view elements.

Another type of display view element that is provided by the graphical display configuration and usage systems and methods described herein is an Embedded Link display view element which may be utilized or embedded in a text box of a display view. In currently known process control graphical configuration systems, text boxes (e.g., which define text strings) and data links/hyperlinks (e.g., which define a location within the process control system at which particular data can be obtained) are implemented as different display view element objects. As such, it is difficult for configuration engineers to spatially arrange and format a text box and a separate datalink/hyperlink element so that the text and the data that is obtained via the link appear in-line on a runtime display view. For example, if the text around the obtained data is edited so that the text length increases or decreases, the data must be separately repositioned. Additionally, the text itself must be specifically positioned during configuration to accommodate any potential changes in the obtained data values which are presented in a runtime width.

The Embedded Link graphical display view element addresses these and other drawbacks. Generally speaking, the Embedded Link graphical display view element is implemented as an independent display view element object which may be placed into a text box object and is subservient to the text box object. As such, a text box including an embedded datalink/hyperlink may be manipulated and formatted in the configuration environment 102 as an integral unit which may be integrally sized, moved to different locations on the display view, etc. When a text box object that includes an embedded link is instantiated in the runtime of the process plant 10, a data value obtained via the link and the static text may automatically remain properly aligned (and may automatically wrap, if wrapping is enabled) so that the text strings and the obtained data have a seamless appearance on the display view. As such, in-line alignment and appearances of obtained data and text strings is handled by the Embedded Link objects, and do not require customized configuration engineering.

Figure 7:
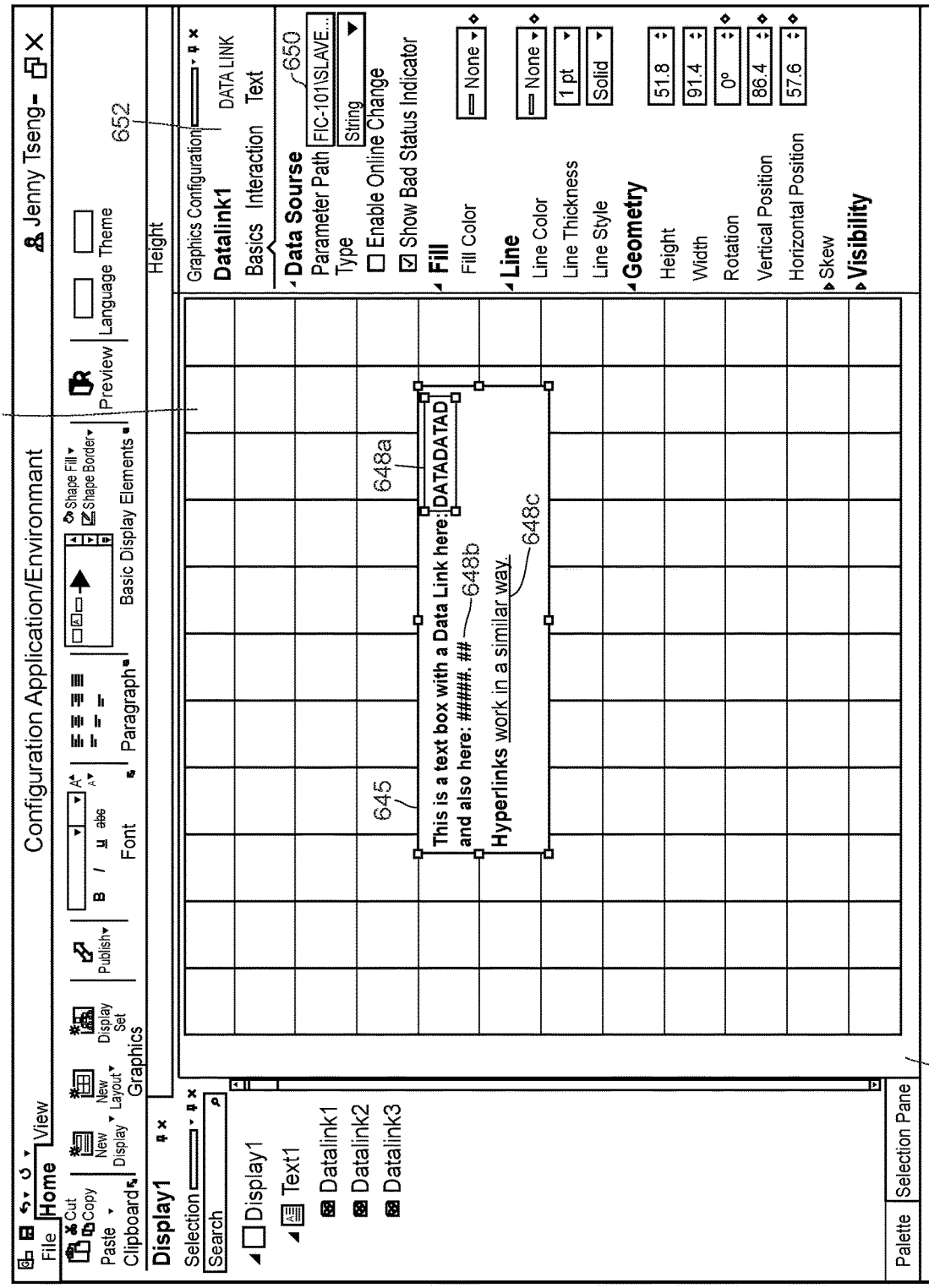
FIG. 7 illustrates an example of configuring embedded link display view elements which may be provided by a graphical display configuration application.

To illustrate, FIG. 7 depicts a snapshot of an example workflow at a user interface of the graphical display configuration application 110 in which a display view 640 is being configured on a configuration canvas 642. The display view 640 includes a text box 645 that includes text strings and three embedded links, e.g., Datalink1 (reference 648*a*), Datalink2 (reference 648*b*), and a hyperlink (reference 648*c*). The configuration engineer is in the process of configuring Datalink1 (reference 648*a*), and has entered the path 650 to the desired data in an editing pane 652. As demonstrated in FIG. 7, the configuration engineer may graphically configure properties of Datalink1 (reference 648*a*) directly on the canvas 642, e.g., by changing the font, line, fill, geometry, and/or other parameters. The resulting numerical representations of the property values may be automatically reflected in the corresponding fields shown in the editing pane 652. Alternatively, the configuration engineer may enter desired property values in the fields of the editing pane 652, and the visualization of the entered properties may automatically be reflected in the appearance of Datalink1 (reference 648*a*) on the configuration canvas 642. Thus, a preview of how the obtained data will look like with the accompanying text strings is automatically provided on the configuration canvas 652, without the user needing to download and instantiate the text box 645 or the links 648 into the operating environment 105.

Each of the embedded link 648*a*-648*c* may be configured with its own respective properties (color, font, point size, etc.) Alternatively, the text box 645 may be configured with a set of properties which may automatically be propagated to one or more of the embedded links 648*a*-648*c*.

Turning now to tabbed display views, tabbed display views of currently known process control configuration systems are typically created using programming scripts. Accordingly, the resulting configurations may be difficult and time consuming for a configuration engineer to develop. Additionally, maintaining, extending, and troubleshooting the configurations may be difficult and may require configuration engineers to have extensive scripting knowledge and training. Additionally, when configuring the tabbed display views, the corresponding display views in each tab may be overlaid on top of each other and the configuration engineer may not be able to view each display view separately by selecting the corresponding tab. As a result, the overlaid display views are cluttered and difficult for the configuration engineer to edit during configuration.

Figure 8:
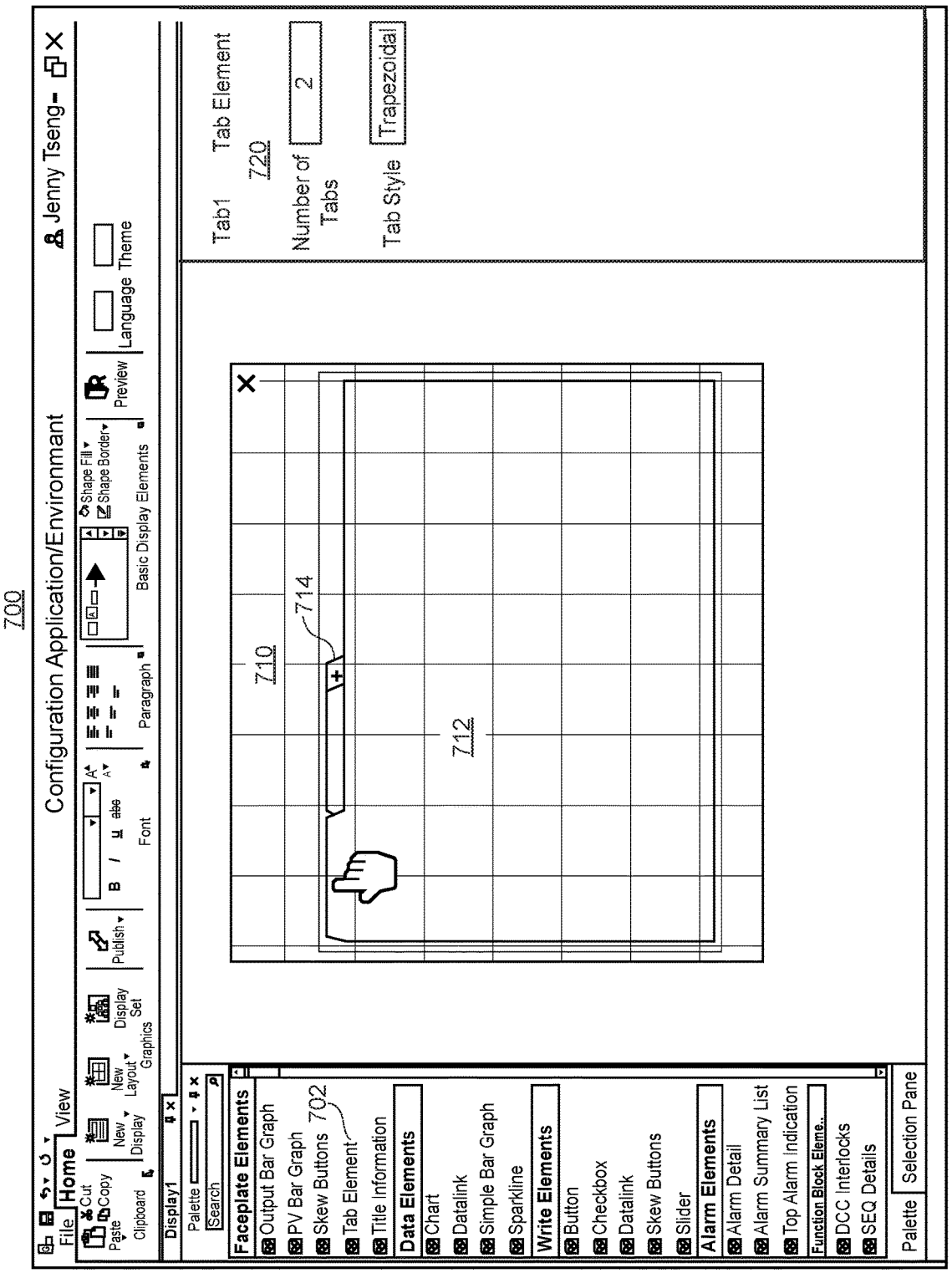
FIG. 8 illustrates an embodiment of a tab display view element which may be provided by a graphical display configuration application.

To address these issues, the graphical display configuration and usage systems and methods described herein and more specifically, the graphical display configuration application 110 includes a tab display view element 702 as shown in the view 700 of the graphical display configuration application 110 in FIG. 8. The tab display view element 702, which may be a display view element object, may be defined graphically using graphical user controls, such as dragging and dropping the tab display view element 702 into the configuration canvas 710 of the graphical display configuration application 110, and defining properties of the tab display view element 702 in the editing pane 720. Moreover, each tab in the tab display view element 702 may be associated with a separate display view in the graphical display configuration application 110. For example, tab1 may be associated with display view1, tab2 may be associated with display view2, etc. For each tab within the tab display view element 702, a display view may be created and stored with reference to the tab. More specifically, the tab display view element 702 may include several tabs which are each stored in the graphical configuration database 120 and/or at the graphical display configuration application 110 with reference to a corresponding display view. When the configuration engineer selects one of the tabs by clicking on the tab for example, the graphical display configuration application 110 presents the corresponding display view (e.g., display view1) 712 on the configuration canvas 710. If a tab does not have an associated display view, the graphical display configuration application 110 may present a blank display view 712 on the configuration canvas 710 for the configuration engineer to create an associated display view using display view elements.

The tab display view element 702 on the configuration canvas 710 of the graphical display configuration application 110 may be utilized in a faceplate, for example. In other scenarios, the configuration engineer may select the tab display view element 702 for use in any suitable display view. As mentioned above, the tab display view element 702 includes several configurable properties in the editing pane 702, such as the number of tabs (e.g., 2), the tab style such as rounded, rectangular, trapezoidal, etc., the height and/or width of each tab, the color of each tab, the line weight of each tab, animations when a tab is selected or unselected, or any other suitable properties. The tab display view element 702 may also include a graphical user control for adding a tab 714 to the tab display view element 702. The configuration engineer may define the number of rows for the tabs or may define the width of each tab, the width of the tab display view element 702, and the number of tabs and the graphical display configuration application 110 may automatically determine the number of rows.

In some embodiments, the configuration engineer may reorder the tabs via the editing pane 720 or user input at the tab display view element, such as clicking and dragging a tab to the end of a row. The configuration engineer may also select the number of rows and the position of tabs within each row via user input at the tab display view element, such as clicking and dragging a tab above or below another tab.

Each tab may also have a label which may include text and/or an icon or image. In some embodiments, the tabs within the tab display view element 702 share a common theme, such as the same height, width, style, color, etc., while the labels may have different text, icons, or images for each tab. The labels may be generated using the editing pane 720 or via user input at each tab, such as double-clicking or right clicking on a tab to insert text or an image. In some embodiments, the text style for each tab may be the same, such as the font type, font size, font color, etc.

The configuration engineer may include any suitable display view elements in the display views that correspond to each of the tabs. This includes a nested tab display view element within the tab display view element 702. Then when the configuration engineer selects a particular tab, the associated display view and display view elements within the associated display view may be presented via the graphical display configuration application 110.

In this manner, the configuration engineer may view how each of the tabs in the tab display view element 702 will look to the operator during runtime. By storing each display view separately in association with a different tab, the display views may be presented to the configuration engineer in an uncluttered, editable manner. Each of the corresponding display views for the respective tabs may also be published and provided to operator workstations. One of the corresponding display views may then be presented in the operating environment 105 during runtime under one of the tabs when the operator selects the tab.

In an example scenario, a tab display view element 702 may be generated to present attributes of a particular control module. A first tab may be labeled "Thresholds" and may include a set of threshold values for various process parameters corresponding to the control module. The threshold values may be static or may be configurable by the operator. A second tab may be labeled "Parameters" and may include a set of process parameters corresponding to the control module. A third tab may be labeled "Alarms/Limits" and may include a set of alarms corresponding to the control module and threshold limits for each of the alarms. The threshold limits may also be static or may be configurable by the operator.

Like the tabbed display views, tooltip display views are typically configured in currently known process control configuration systems using programming scripts and the resulting configurations may be difficult and time consuming for a configuration engineer to develop. A tooltip display view may be a dialog box corresponding to a particular display view element, such as a graphical representation of a process plant entity or control element (e.g., a tank, a mixer, a valve, a pump, etc.). The tooltip display view may appear in response to user input or a trigger at the particular display view element. The trigger may be a mouse hover over the particular display view element, a mouse click on the particular display view element, etc.

Figure 9A:
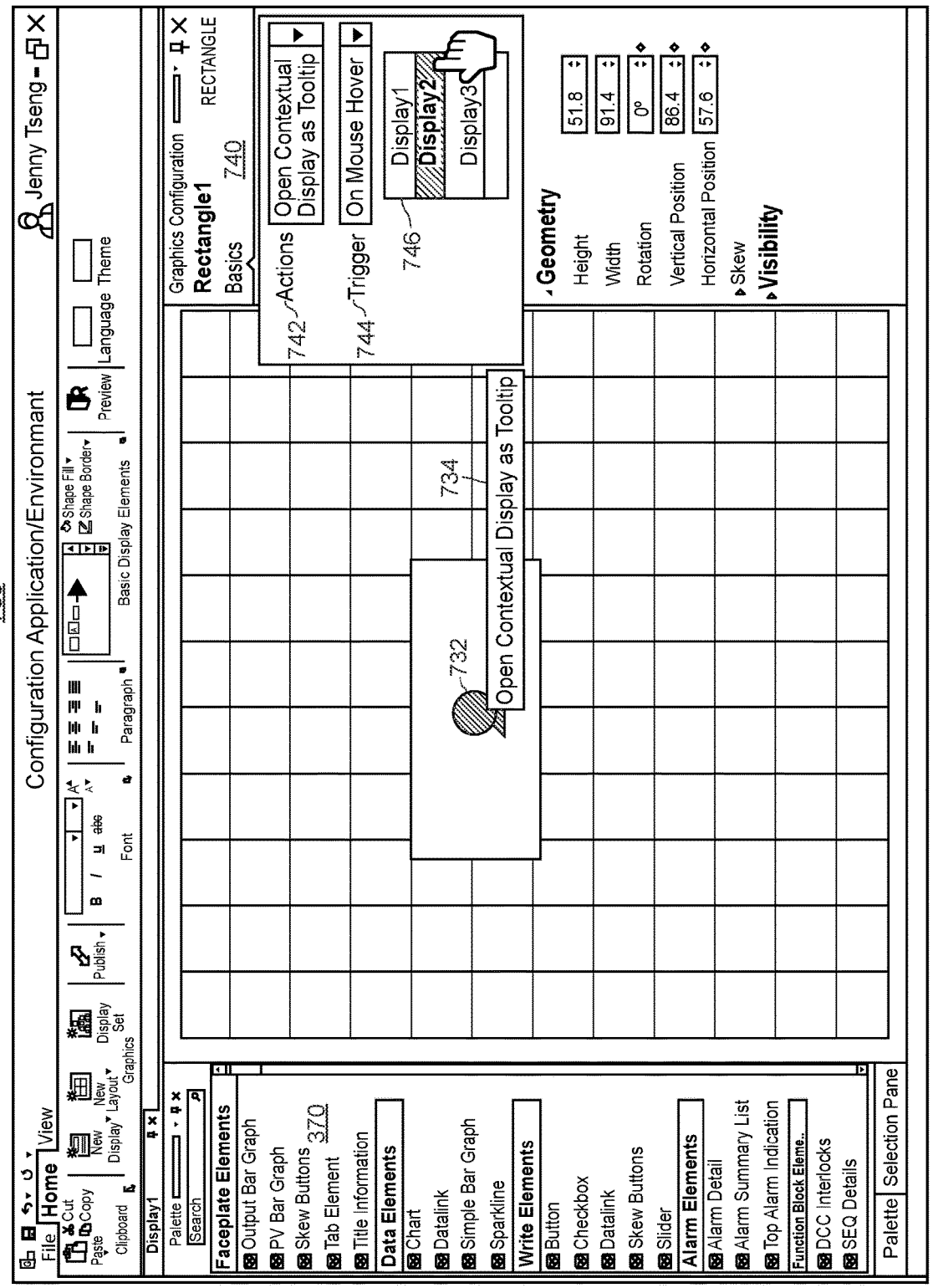
FIG. 9A illustrates an example view of a portion of a graphical display configuration application for generating a contextual display for a display view element in response to user input at the display view element.

To eliminate the need for programming scripts when creating tooltips, the graphical display configuration and usage systems and methods described herein and more specifically, the graphical display configuration application 110 includes a tooltip display view action as a particular type of object which may be selected and configured using graphical user controls. FIG. 9A illustrates an example view 730 of a portion of the graphical display configuration application 110 for generating a contextual display (e.g., a tooltip display) for a display view element in response to user input at the display view element. The configuration engineer may insert a display view element into a display view, such as a graphical representation of a pump 732 by dragging and dropping the pump 732 into the display view, for example. In response to user input at the display view element 732 such as right-clicking on the display view element, left-clicking on the display view element, etc., the graphical display configuration application 110 may present a graphical user control for configuring a tooltip display view 734. In additional or alternative embodiments, the editing pane 740 may include one or several properties for configuring the tooltip display view. These properties may include a type of action 742, such as "Open Contextual Display As Tooltip," a trigger for the action 744, such as in response to a mouse hover over the display view element 732, a mouse click on the display view element 732, a double click on the display view element 732, etc., and the display view 746 to present in response to the trigger. In some embodiments, the tooltip action may be selected from several types of actions 742, such as open faceplate, animate the display view element 732, no action, etc. Additionally, the configuration engineer may configure different actions in response to different triggers at a display view element. For example, the "Open Contextual Display As Tooltip" action may be performed in response to a mouse hover trigger, and an open faceplate action may be performed in response to a mouse click trigger.

The editing pane 740 may include several display views for the configuration engineer to choose from, such as Display1, Display2, Display3, etc., which may be the display views stored at the graphical configuration database 120. Additionally, the configuration engineer may enter the name of the display view 746 to present in response to the trigger and then may configure the display view at a later time.

Figure 9B:
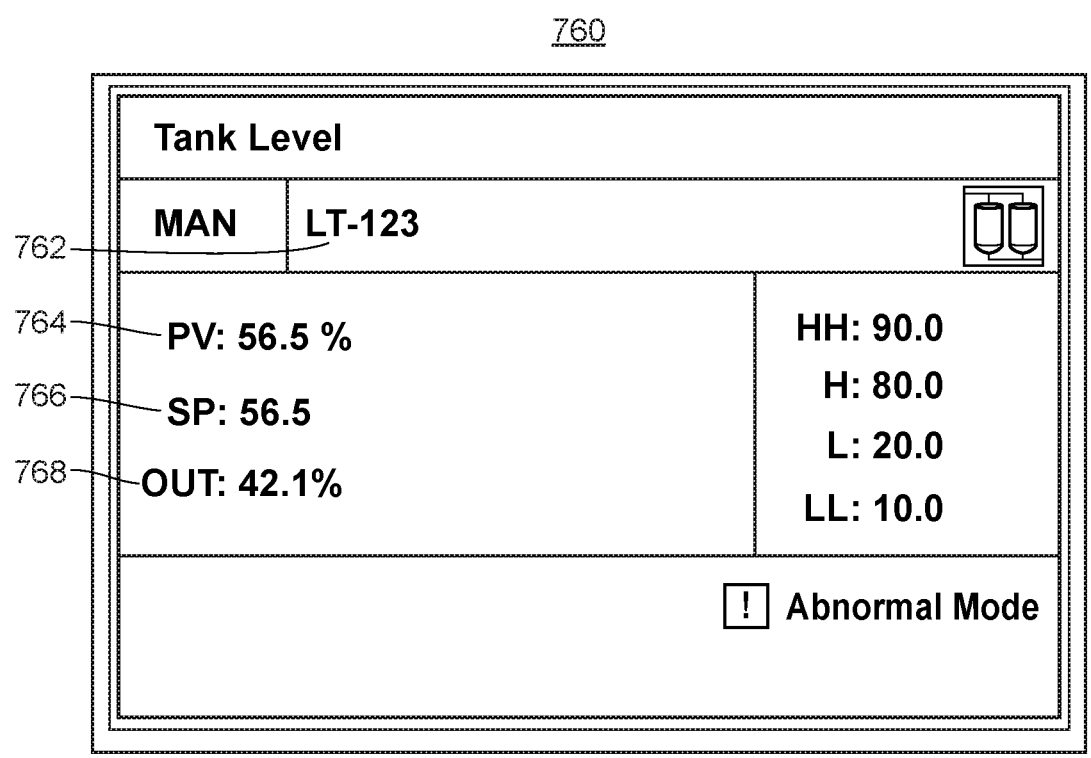
FIG. 9B is an example contextual display view presented in response to user input at the display view element in FIG. 9A.

FIG. 9B illustrates an example display view 760 presented in response to user input at the display view element 732 in FIG. 9A. For example, the display view element 732 may be a graphical representation of a tank (e.g., the tank graphic 155*a* shown in FIG. 2C) and the display view 760 may include properties of the fill level of the tank, which may be static or dynamic. The properties may include a name of the tank level 762 (e.g., "LT-123"), a process parameter value for the tank level 764, such as a percentage of the tank that is filled, a setpoint value for the tank level 766, and an output variable value for the tank level 768, such as a flow rate of a liquid flowing out of the tank. While the name of the tank level 762 is static and remains constant during runtime and the setpoint value for the tank level 766 may also remain constant, the process parameter value for the tank level 764 and the output variable value for the tank level 768 may be dynamic and constantly changing during operation of the process plant. The display view 760 may also include animated content and may include display view elements having their own actions in response to triggers, such as a mouse click or mouse hover.

Referring back to FIG. 9A, the graphical display configuration application 110 defines the display view 760 as the tooltip display view to present in response to a mouse hover over the display view element 732. When the display view element 732 is published and provided to operator workstations, an operator viewing the display view element 732 may hover over the display view element 732 and the display view 760 depicting properties of the pump may be overlaid on the graphical representation of the pump 732. In some embodiments, the tooltip display view may be automatically configured to disappear when the operator is no longer hovering over the display view element 732 or the tooltip display view 760 for a threshold duration (e.g., 500 ms). In additional or alternative embodiments, the tooltip display view may be automatically configured to disappear after a threshold timeout period (e.g., 2 minutes). The operator may then hover over the display view element 732 again to make the tooltip display view 760 reappear.

Figure 10:
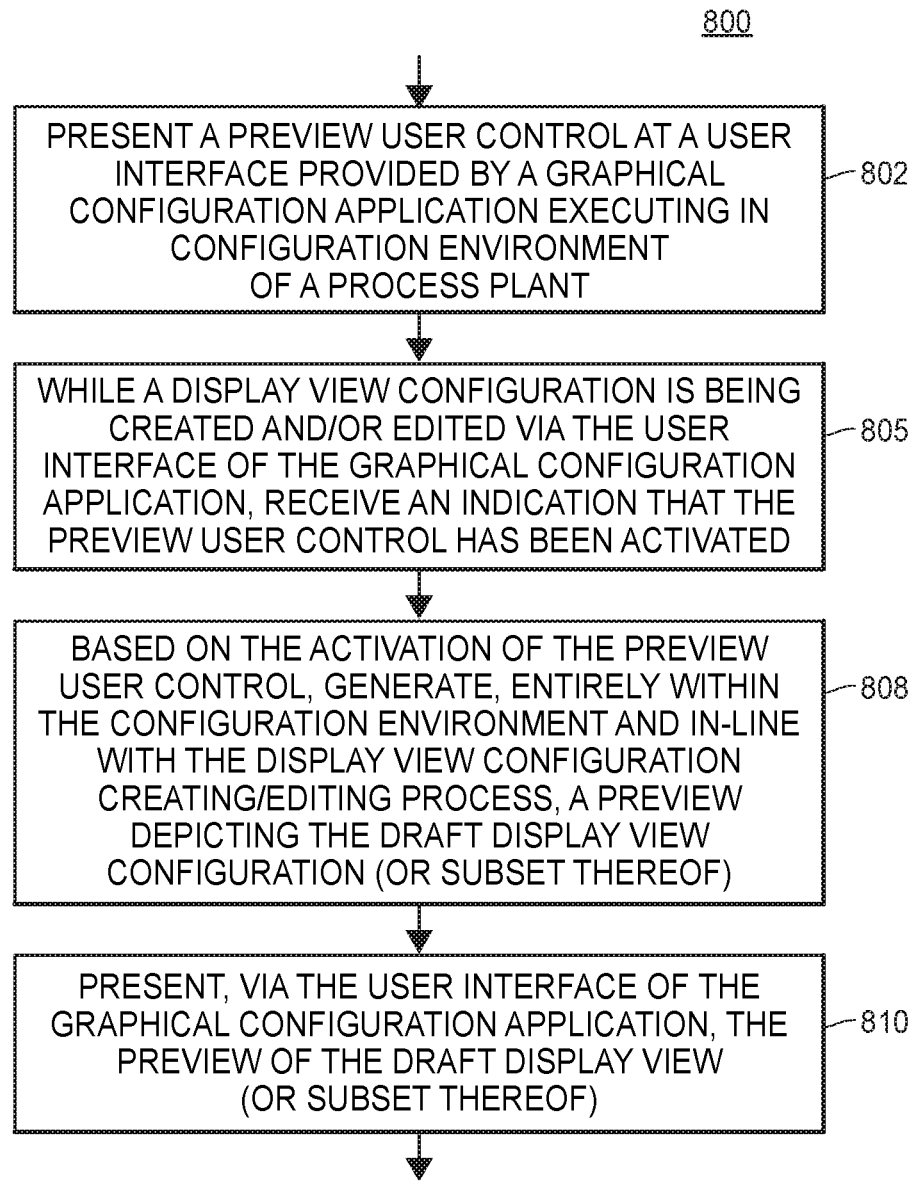
FIG. 10 is a flow diagram of an example method of configuring a display view for execution in an operating environment of a process plant.

FIG. 10 depicts a flow diagram of an example method 800 of configuring a display view for execution in an operating environment of a process plant, which may be performed by one or more various devices disposed in the configuration environment 102 of the process plant 10. For example, in an embodiment, the method 800 is performed by one or more instances of the graphical configuration application 110. For ease of discussion, and not for limitation purposes, the method 800 is discussed below with simultaneous reference to the systems and devices of FIGS. 1A-3B, however, it is understood that the method 800 may be performed by other suitable systems and/or devices.

As depicted in FIG. 10, at a block 802, the method 800 includes presenting a preview user control at a user interface that is provided by a graphical configuration application executing in a configuration environment of the process plant (such as the graphical configuration application 110 executing in the configuration environment 102 of the process plant 10), and on which a draft of a configuration of the display view is presented and/or in the process of being created or edited. For example, the display view configuration is being presented, created, and/or edited may define respective links between one or more graphical elements included on the display view and one or more control elements included in an operating environment of the process plant so that, upon download and execution (e.g., upon publication) of the finalized, approved display view at a user interface device included in the operating environment of the process plant (such as the UI device 8 included in the operating environment 105 of the process plant 10), respective indications of one or more values that are generated by the one or more control elements while executing in the operating environment of the process plant to control the process are presented and updated at the executing display view, in real-time.

The method 800 also includes, at a block 805, receiving an indication of an activation of the preview user control while the draft of the display view configuration is presented, created, and/or edited. At a block 808, based on or responsive to the activation of the preview user control, the method 800 includes generating a preview depicting at least one of a run-time appearance or a run-time behavior of the draft display view configuration, or portion or subset thereof. Importantly, at the block 808, the preview of the draft display view configuration is generated independently of the operating environment of the process plant, for example, the draft display view configuration need not be downloaded into the operating environment (or even downloaded to a simulation environment, for that matter) in order to generate the preview. That is, in-line with the on-canvas editing of the draft display view configuration in the configuration environment 102 (e.g., via the user interface of the graphical configuration application 110), the preview depicting the runtime appearance and/or the runtime behavior of the draft (and perhaps only partially finished) configuration of the display view may be generated entirely within the configuration environment 102 based upon the snapshot or portion of the draft of the display view configuration thus far depicted on the configuration canvas. In some embodiments, a user may indicate a specific graphical display element, portion or area of the draft display view configuration that is to be previewed, and the preview may generated and present a depiction of the runtime appearance and/or behavior of the indicated element, portion, or area. In some embodiments, the generated preview is an interactive preview via which a user may interact (e.g., activate and deactivate various user controls displayed thereon) to ascertain the desired functionality and/or logic of user interactions that are configured into the draft display view configuration.

Additionally, the method 800 includes presenting, at the user interface of the graphical configuration application, the preview of the display view (block 810), e.g., in-line with the on-canvas editing of the draft display view within the configuration environment 102 which, as previously discussed, may be an interactive preview.

It is noted that the method 800 is only one of numerous possible embodiments. For example, in an embodiment, the blocks 802 and 805 and a portion of the block 808 may be omitted, such as when a preview of the draft or in-progress display view configuration is continuously generated and displayed upon the working canvas of the graphical configuration application, e.g., seamlessly during the work flow of defining the display view configuration as various graphical display view elements, configurations, properties and the like are added, deleted, configured, changed, defined, etc. In such an embodiment, the preview user control need not be provided by the graphical configuration application at the user interface.

In an embodiment, the method 800 may further comprise providing, on the user interface of the graphical configuration application, a publish user control; receiving an indication of an activation of the publish user control; generating, based on the received indication of the activation of the publish user control, a published version or publication of the draft display view configuration; allowing the published version or publication of the display view configuration to be provided to the operating environment of the process plant for execution; and preventing the draft display view configuration from being provided to the operating environment of the process plant. Further, of note in this embodiment, even though a publication of the draft display view configuration has been generated and stored within the configuration environment, nonetheless generating the preview of the display view (block 808) comprises generating the preview of the display view independently of (e.g., without utilizing) any publication of the display view.

In some embodiments, a first graphical element object defines a configuration of a first graphical element of the one or more graphical elements of the display view, and a second graphical element object defines a configuration of a second graphical element of the one or more graphical elements of the display view. In these embodiments, the method 800 may further comprise receiving, via the user interface of the graphical configuration application, an indication of an inclusion, within the first graphical element object, of a reference to the second graphical element object. Thus, in these embodiments, presenting the preview depicting the at least one of the runtime appearance or the run-time behavior of the display view (block 810) comprises presenting the preview depicting at least one of an appearance or a behavior of the first graphical element as defined by the second graphical element object referenced by the first graphical element object.

For example, the first graphical element may be a text box and the second graphical element may be at least one of a datalink or a hyperlink. As such, presenting the preview of the display view (block 810) includes presenting, within the text box, data obtained via the at least one of the datalink or the hyperlink in-line with static text indicated by the configuration of the text box.

In another example, the first graphical element is a graphic and the second graphical element is an animation. In this example, presenting the preview of the display view (block 810) comprises presenting the preview of the display view depicting a runtime behavior of the animation of the graphic. In some embodiments, the method 800 may further comprise providing, via the user interface of the graphical configuration application, one or more graphical handles associated with the graphic and the animation of the graphic, and the runtime behavior of at least a portion of the animation of the graphic may be defined via a manipulation of the one or more graphical handles at the user interface of the graphical configuration application.

Additionally or alternatively, the second graphical element object may be an animation conversion function object that includes one or more inputs defining one or more triggering conditions, a logic definition that is applied to the one or more inputs, and an output indicating whether or not the animation is to be applied based upon a result of the logic definition applied to the one or more inputs. Accordingly, presenting the preview of the display view (block 810) may additionally or alternatively include presenting the preview depicting the runtime appearance and behavior of at least a portion of the animation of the graphic based on the output of the animation conversion function object referenced by the first graphical element object.

In yet another example, the second graphical element includes an operator interaction, where the operator interaction is a user control. As such, presenting the preview of the display view (block 810) comprises presenting an interactive preview of the display view that (i) receives, via the user interface of the graphical configuration application, an activation of the operator interaction at the first graphical element depicted by the preview, and (ii) responsive to the activation of the operator interaction at the first graphical element, depicts a corresponding run-time appearance and/or a corresponding run-time behavior of the display view.

In some implementations, the draft display view configuration includes a plurality of operator interactions configured into a subset of the totality of graphical elements thus far included in the display view. Each configured operator interaction corresponds to a respective user control at a respective graphical element of the subset. Accordingly, the method 800 may further comprise, upon activation of a show interactions user control (e.g., that is provided by the user interface of the graphical configuration application), distinguishing the subset of graphical elements into which the plurality of operator interactions are configured from other graphical elements depicted on the preview of the display view.

In another example, the second graphical element is a contextual display and the second graphical element object indicates a content for presentation via the contextual display. Additionally, the configuration of the first graphical element includes a user control that activates the contextual display. As such, presenting the preview of the display view (block 810) in this example comprises presenting an interactive preview that (i) receives an indication of an activation, via the user interface of the graphical configuration application, of the user control that activates the contextual display, and (ii) responsive to the activation of the user control that activates the contextual display, depicts a run-time appearance and/or behavior of the contextual display and its content.

In an embodiment, the first graphical element is a line graphical element configured with one or more properties, one of which is a crossover convention property. In this embodiment, the method 800 further comprises automatically configuring the line graphical element with the one or more properties of the line graphical element including the indicated crossover convention, so that any crossovers occurring in the line graphical element follow the convention indicated by the crossover convention property. The crossover convention property may be defined to indicate a particular style of depicting, on the display view, a lack of a physical intersection between physical control elements represented by the line graphical element and an intersecting line graphical element, such as a line break or gap, semi-circle, etc. In some implementations, the method 800 further comprises automatically adjusting the respective appearances of instances of the crossover convention in response to a change to one or more other properties of the line graphical element (e.g., line widths, orientation, location, length, and/or other properties) to thereby accommodate the change to the one or more other properties on the display view.

In yet another example, the second graphical element is a timer configured with one or more properties, where the one or more properties may include at least one of an action, a duration, a state of activation, or a trigger condition of the timer. In this example, presenting the preview of the display view (block 810) comprises presenting a depiction of a runtime appearance and/or behavior of at least one graphical element of the display view based on the at least one of the action, the duration, the state of activation, or the trigger condition of the timer.

Still, in another example, the first graphical element is a tabbed display view graphical element and the second graphical element is a particular display view. Presenting the preview of the display view (block 810) comprises presenting an interactive preview that (i) receives an activation, via the user interface of the graphical configuration application, of a user control configured into the tabbed display view graphical element, and (ii) responsive to the received activation at the tabbed display view graphical element, depicts a runtime appearance and/or behavior of the particular display view.

In some embodiments of the tabbed display view graphical element, the tabbed display view graphical element includes a plurality of tab graphical elements, each of which is configured with a respective user control, and each of which is defined to reference a respective display view. In such embodiments, presenting the interactive preview of the tabbed display view graphical element (block 810) comprises: presenting a respective indication of each tab graphical element of the plurality of tab graphical elements; receiving, via the user interface of the graphical configuration application, an indication of an activation of a particular user control at a particular tab graphical element; and responsive to the activation of the particular user control, depicting, at a foreground of the user interface of the graphical configuration application, the respective display view of the particular tab graphical element.

In some embodiments, the method 800 includes providing, on the user interface of the graphical configuration application, a bulk-edit user control; and respectively applying a particular property to each graphical element of a selected group of graphical elements responsive to a single activation, via the user interface of the graphical configuration application, of the bulk-edit user control, e.g., while the configuration of the display view is being created or edited. Advantageously, the selected group graphical elements may include at least one of an animation or a script.

In some embodiments, the method 800 further includes automatically maintaining, by the graphical configuration application, a connection of a line graphical element to a shape graphical element included in the draft of the display view configuration while the shape graphical element and/or a location of the shape graphical element on the display view is being modified via the graphical configuration application, e.g., while the configuration of the display view is being created or edited.

In some embodiments, the method 800 further includes providing (e.g., at the user interface of the graphical configuration application 110), a locking user control; receiving an indication of an activation of the locking user control with respect to a particular graphical element of the one or more graphical elements; and responsive to the reception of the activation of the locking user control, preventing a location of the particular graphical element within the display view from being modified absent a reception of an indication of a deactivation of the locking user control with respect to the particular graphical element, e.g., while the configuration of the display view is being created or edited.

In some embodiments, the method 800 further includes providing (e.g., at the user interface of the graphical configuration application 110) a hide or grey-out user control; receiving an indication of an activation of the hide or grey-out user control with respect to a particular graphical element of the one or more graphical elements; and responsive to the reception of the activation of the hide or grey-out user control, hiding or greying-out the particular graphical element presented on the user interface of the graphical configuration application, e.g., while the configuration of the display view is being created or edited.

In some embodiments, the method 800 further includes providing (e.g., via the user interface of the graphical configuration application 110), one or more graphical handles respectively associated with one or more types of graphical elements; receiving an indication of a manipulation, via the user interface of the graphical configuration application, of at least one of the one or more graphical handles; and responsive to the manipulation of the at least one of the one or more graphical handles, automatically modifying one or more properties of corresponding instances of the one or more types of graphical elements, e.g., while the configuration of the display view is being created or edited.

Of course, the method 800 may include additional, less, or alternate actions, including those discussed elsewhere herein.

The present disclosure discusses various features and aspects within the configuration environment 102 of the process plant 10 which may be utilized by the configuration engineer or user while creating, designing, developing, or generating display views that are to execute in the operating environment 105 of the process plant 10, and that may be provided by the graphical display configuration and usage systems and methods described herein. It is understood, though, that the graphical display configuration and usage system and methods described herein are not limited to only the features and aspects of the configuration environment 102 and/or of the configuration application 110 described herein. Generally speaking, the novel techniques described herein may be applied to any feature or aspect of the configuration environment 102 that allows a configuration engineer to create, define, preview, and edit graphical elements and/or graphical element displays in-line during the configuration workflow, without having to compile and/or download draft graphical configurations into the operating environment 105 to ascertain runtime appearance and/or behavior, and/or without requiring specialized scripts to be implemented within the operating environment 105. By using these various features and aspects, the configuration engineer may significantly reduce the amount of time it takes for configuring, defining, developing, and/or editing display views and graphical elements included thereon.

Embodiments of the techniques described in the present disclosure may include any number of the following aspects, either alone or combination:

1. A graphical configuration system for a process plant, the graphical configuration system comprising a graphical configuration application executing in a configuration environment of the process plant, the graphical configuration application having a user interface via which a draft of a configuration of a display view is presented, the draft of the configuration of the display view including one or more graphical elements;

the display view configuration defining respective links between one or more graphical elements included on the display view and one or more control elements included in an operating environment of the process plant so that, upon download and execution of the display view at a user interface device included in the operating environment of the process plant, respective indications of one or more values that are generated by the one or more control elements while executing in the operating environment of the process plant to control the process are presented and repeatedly updated at the executing display view; and the graphical configuration application providing, on the user interface, a preview user control that, when activated prior to a publication of the configuration of the display view, causes a preview depicting at least one of a runtime appearance or a run-time behavior of the one or more graphical elements included in the draft of the configuration of the display view to be generated and displayed at the user interface of the graphical configuration application, wherein publications of configurations of display views are allowed to be provided to the operating environment of the process control system, and wherein drafts of configurations of display views are prohibited from being provided to the operating environment of the process control system.

2. The graphical configuration system of the previous aspect, wherein: the graphical configuration application further provides, at the user interface of the graphical configuration application, a publish user control that, when activated, publishes the configuration of the display view to thereby generate a particular publication of the configuration of the display view; and the preview of the draft configuration of the display view within the configuration environment is generated without accessing any published configuration of the display view.

3. The graphical configuration system of any one of the previous aspects, wherein: the draft of the configuration of the one or more graphical elements is included in a draft of a configuration of the display view presented on the user interface of the graphical configuration application; the activation of the preview user control causes a preview of a runtime appearance and a runtime behavior of the draft of the display view configuration to be generated and displayed at the user interface of the graphical configuration application; the preview of the display view includes the preview of the one or more graphical elements. Optionally, the preview of the display view is generated independently of the operating environment of the process plant, e.g., is generated entirely within the configuration environment of the process plant.

4. The graphical configuration system of any one of the previous aspects, wherein: a first graphical element object defines a configuration of a first graphical element of the one or more graphical elements; a second graphical element object defines a configuration of a second graphical element of the one or more graphical elements; the first graphical element object is defined to reference the second graphical element object; and at least one of an appearance or a behavior of the first graphical element during runtime is defined by the second graphical element object referenced by the first graphical element object.

5. The graphical configuration system of any one of the previous aspects, wherein: the first graphical element is a text box and the second graphical element is at least one of a datalink or a hyperlink; and the preview depicts a runtime appearance of the draft configuration of the text box, the runtime appearance of the draft configuration of the text box including content, obtained via the at least one of the datalink or the hyperlink, presented in-line with static text indicated by the draft configuration of the text box.

6. The graphical configuration system of the previous aspect, wherein the first graphical element is a graphic, the second graphical element is an animation, and the preview depicts a runtime behavior of the draft configuration of the animation of the graphic.

7. The graphical configuration system of the previous aspect, wherein at least a portion of the animation of the graphic is defined via the user interface of the graphical configuration application via manipulation of one or more graphical handles.

8. The graphical configuration system of any one of the previous aspects, wherein the second graphical element object includes an animation conversion function object configured to generate at least a portion of the animation.

9. The graphical configuration system of the previous aspect, wherein: the animation conversion function object includes one or more inputs defining one or more triggering conditions, a logic definition that is applied to the one or more inputs, and an output indicating whether or not the animation is to be applied based upon a result of the logic definition applied to the one or more inputs; and the preview depicting the runtime behavior of the draft of the configuration of the at least the portion of the animation of the graphic is based on the output of the animation conversion function object referenced by the first graphical element object.

10. The graphical configuration system of any one of the previous aspects, wherein: the second graphical element comprises an operator interaction, the operator interaction being a user control; and the preview of the draft configuration of one or more graphical elements is an interactive preview that receives an indication of an activation, via the user interface of the graphical configuration application, of the operator interaction user control at the first graphical element, and depicts a respective runtime appearance and/or a respective runtime behavior of the draft configuration of the one or more graphical elements responsive to the activation of the operator interaction user control.

11. The graphical configuration system of any one of the previous aspects, wherein: the draft of the configuration of the one or more graphical elements is included in a draft of the configuration of the display view; the draft configuration of the display view includes a plurality of operator interactions configured into a subset of a set of graphical elements, each operator interaction included in the plurality of operator interactions being a respective user control configured into a respective graphical element of the subset; a preview of the draft of the display view configuration includes the set of graphical elements; and the graphical configuration application further provides, on the user interface, a show interactions user control that, when activated, distinguishes the subset of graphical elements into which the plurality of operator interactions are respectively configured from other graphical elements depicted on the preview of the draft of the display view configuration.

12. The graphical configuration system of any one of the previous aspects, wherein: the second graphical element is a contextual display and the second graphical element object indicates a content that is to be presented via the contextual display; the first graphical element comprises a particular user control that activates the contextual display; and the preview of the draft of the configuration of the one or more graphical elements is an interactive preview that (i) receives an indication of an activation, via the user interface of the graphical configuration application, of the particular user control corresponding to the first graphical element, and (ii) responsive to the activation of the particular user control corresponding to the first graphical element, depicts a runtime appearance of the draft configuration of contextual display including the content presented via the contextual display.

13. The graphical configuration system of any one of the previous aspects, wherein: the first graphical element is a line graphical element configured with one or more properties; the one or more properties including a crossover convention property to indicate or define a particular style of depicting, on display views, a lack of a physical intersection between respective physical control elements represented by intersecting line graphical elements.

14. The graphical configuration of the previous aspect, wherein an appearance of an instance of a crossover of the line graphical element automatically adjusts, on the user interface and in response to a change to the one or more other properties of the line graphical element, to accommodate the change to the one or more other properties.

15. The graphical configuration system of any one of the previous aspects, wherein: the second graphical element is a timer graphical element configured with one or more properties, the one or more properties including at least one of an action, a duration, a state of activation, or a trigger condition of the timer graphical element; and the preview of the one or more graphical elements included on the display view depicts the runtime behavior of the draft configuration of the one or more graphical elements, the runtime behavior of the one or more graphical elements including the at least one of the action, the duration, the state of activation, or the trigger condition of the timer graphical element.

16. The graphical configuration system of any one of the previous aspects, wherein: the first graphical element is a tabbed display view graphical element; the second graphical element is a particular display view; and the preview of the draft configuration of the one or more graphical elements is an interactive preview that (i) receives an activation, via the user interface of the graphical configuration application, of a user control configured into the tabbed display view graphical element, and (ii) responsive to the received activation at the tabbed display view graphical element, depicts at least one of a runtime appearance or a runtime behavior of the particular display view in a foreground of the user interface of the graphical configuration application.

17. The graphical configuration system of the previous aspect, wherein the tabbed display view graphical element includes a plurality of tab graphical elements, each of which is configured with a respective user control, and each of which is defined to reference a respective display view; and wherein the interactive preview depicts a respective indication of each tab graphical element and depicts, at a foreground of the user interface of the graphical configuration application, the respective display view of a particular tab graphical element upon activation, via the user interface of the graphical configuration application, of the respective user control of the particular tab graphical element.

18. The graphical configuration system of claim 17, wherein the each tab graphical element is further defined to change an appearance of at least one visual characteristic of the each tab graphical element responsive to data generated by at least one of the one or more control elements while executing in the operating environment of the process plant.

19. The graphical configuration system of any one of the previous aspects, wherein the graphical configuration application further provides, on the user interface, a bulk-edit user control; and wherein a single activation, via the user interface of the graphical configuration application, of the bulk-edit user control causes a particular property to be respectively applied to each graphical element included in a plurality of selected graphical elements, the plurality of selected graphical elements including at least one of an animation or a script.

20. The graphical configuration system of any one of the previous aspects, wherein the graphical configuration application automatically maintains a connection of a line graphical element to a shape graphical element included in the draft of the configuration of the one or more graphical elements during a modification to the shape graphical element via the graphical configuration application.

21. The graphical configuration system of any one of the previous aspects, wherein the graphical configuration application further provides a locking user control that, when activated with respect to a particular graphical element of the one or more graphical elements displayed on the user interface of the graphical configuration application, prevents a location or positioning of the particular graphical element within the display view from being modified absent a deactivation of the locking user control with respect to the particular graphical element.

22. The graphical configuration system of any one of the previous aspects, wherein the graphical configuration application further provides a hide or grey-out user control that, when activated with respect to a particular graphical element of the one or more graphical elements, hides or greys-out the particular graphical element on the user interface of the graphical configuration application.

23. The graphical configuration system of any one of the previous aspects, wherein the graphical configuration application further provides one or more graphical handles, respectively associated with one or more types of graphical elements, via which respective properties of instances of the one or more types of graphical elements are graphically modifiable via the user interface of the graphical configuration application.

24. A method of configuring a display view for execution in an operating environment of a process plant, the method comprising: prior to publishing a draft of a configuration of a display view, the display view configuration defining respective links between one or more graphical elements included on the display view and one or more control elements included in an operating environment of the process plant so that, upon download and execution of the display view at a user interface device included in the operating environment of the process plant, respective indications of one or more values that are generated by the one or more control elements while executing in the operating environment of the process plant to control the process are presented and updated at the executing display view;

presenting, at a user interface provided by a graphical configuration application executing in a configuration environment of the process plant, a preview of the draft of the configuration of the display view, the preview depicting at least one of a run-time appearance or a run-time behavior of the draft of the display view configuration, wherein published display view configurations are allowed to be provided to the operating environment of the process control system, and wherein draft display view configurations are prohibited from being provided to the operating environment of the process control system.

25. The method of aspect 24, wherein the method further comprises: providing, on the user interface of the graphical configuration application, a publish user control; receiving an indication of an activation of the publish user control; publishing, based on the received indication of the activation of the publish user control, the draft of the display view configuration to generate a particular publication of the display view configuration, the particular publication of the display view configuration included in the published display view configurations allowed to be provided to the operating environment of the process control system; and wherein generating the preview of the draft display view configuration comprises generating the preview of the draft display view configuration without utilizing the particular publication of the display view configuration.

26. The method of any one of aspects 24-25, wherein: a first graphical element object defines a configuration of a first graphical element of the one or more graphical elements; a second graphical element object defines a configuration of a second graphical element of the one or more graphical elements; the method further comprises receiving, via the user interface of the graphical configuration application, an indication of an inclusion, within the first graphical element object, of a reference to the second graphical element object; and presenting the preview depicting the at least one of the runtime appearance or the run-time behavior of the draft display view configuration comprises presenting the preview depicting at least one of an appearance or a behavior of the first graphical element as defined by the second graphical element object referenced by the first graphical element object.

27. The method of any one of aspects 24-26, wherein: the first graphical element is a text box and the second graphical element is at least one of a datalink or a hyperlink; and presenting the preview of the display view includes presenting, within the text box, data obtained via the at least one of the datalink or the hyperlink in-line with static text indicated by the configuration of the text box.

28. The method of any one of aspects 24-27, wherein: the first graphical element is a graphic; the second graphical element is an animation; and presenting the preview of the draft display view configuration comprises presenting a runtime behavior of the animation of the graphic.

29. The method of any one of aspects 24-28, further comprising providing, via the user interface of the graphical configuration application, one or more graphical handles associated with the graphic and at least a portion of the animation of the graphic; and wherein the runtime behavior of the at least a portion of the animation of the graphic is defined via a manipulation of the one or more graphical handles at the user interface of the graphical configuration application.

30. The method of any one of aspects 24-29, wherein: the second graphical element object is an animation conversion function object; the animation conversion function object includes one or more inputs defining one or more triggering conditions, a logic definition that is applied to the one or more inputs, and an output indicating whether or not the animation is to be applied based upon a result of the logic definition applied to the one or more inputs; and presenting the preview of the draft display view configuration comprises presenting a runtime behavior of the animation of the graphic based on the output of the animation conversion function object referenced by the first graphical element object.

31. The method of any one of aspects 24-30, wherein: the second graphical element comprises an operator interaction, the operator interaction being an operator interaction user control; and presenting the preview of the draft display view configuration comprises presenting an interactive preview of the draft display view configuration that (i) receives, via the user interface of the graphical configuration application, an activation of the operator interaction user control at the first graphical element, and (ii) responsive to the activation of the operator interaction user control at the first graphical element, depicts a corresponding run-time appearance and/or a corresponding run-time behavior of the draft display view configuration.

32. The method of any one of aspects 24-31, wherein: the display view configuration includes a plurality of operator interactions configured into a subset of a set of graphical elements included in the draft display view configuration, each operator interaction corresponding to a respective user control at a respective graphical element of the subset; and the method further comprises, upon activation of a show interactions user control provided by the user interface of the graphical configuration application, distinguishing the subset of graphical elements into which the plurality of operator interactions are configured from other graphical elements depicted on the preview of the draft display view configuration.

33. The method of any one of aspects 24-32, wherein: the second graphical element is a contextual display and the second graphical element object indicates a content for presentation via the contextual display; the configuration of the first graphical element includes a particular user control that activates the contextual display; and presenting the preview of the draft display view configuration comprises presenting an interactive preview that (i) receives an indication of an activation, via the user interface of the graphical configuration application, of the particular user control that activates the contextual display, and (ii) responsive to the received indication of activation of the particular save and go to sleep user control that activates the contextual display, depicts a runtime appearance of the contextual display and its content.

34. The method of any one of aspects 24-33, wherein: the first graphical element is a line graphical element configured with one or more properties, the one or more properties include a crossover convention property indicating or defining a particular style of depicting, on the display view, a lack of a physical intersection between physical control elements represented by the line graphical element and an intersecting line graphical element.

35. The method of any one of aspects 24-34, further comprising automatically adjusting an appearance of a crossover of the line graphical element in response to a change to one or more other properties of the line graphical element to thereby accommodate the change to the one or more other properties on the display view.

36. The method of any one of aspects 24-35, wherein: the second graphical element is a timer configured with one or more properties, the one or more properties including at least one of an action, a duration, a state of activation, or a trigger condition of the timer; and presenting the preview of the draft display view configuration comprises presenting a depiction of a runtime behavior of at least one graphical element of the display view based on the at least one of the action, the duration, the state of activation, or the trigger condition of the timer.

37. The method of any one of aspects 24-36, wherein: the first graphical element is a tabbed display view graphical element; the second graphical element is a particular display view; and presenting the preview of the draft display view configuration comprises presenting an interactive preview that (i) receives an activation, via the user interface of the graphical configuration application, of a user control configured into the tabbed display view graphical element, and (ii) responsive to the received activation at the tabbed display view graphical element, depicts a runtime appearance of the particular display view.

38. The method of any one of aspects 24-37, wherein: the tabbed display view graphical element includes a plurality of tab graphical elements, each of which is configured with a respective user control, and each of which is defined to reference a respective display view; and presenting the interactive preview comprises: presenting a respective indication of each tab graphical element of the plurality of tab graphical elements; receiving, via the user interface of the graphical configuration application, an indication of an activation of a particular user control at a particular tab graphical element; and responsive to the activation of the particular user control, depicting, at a foreground of the user interface of the graphical configuration application, the respective display view of the particular tab graphical element.

39. The method of any one of aspects 24-38, further comprising: providing, on the user interface of the graphical configuration application, a bulk-edit user control; and respectively applying a particular property to each graphical element of a selected group of graphical elements responsive to a single activation, via the user interface of the graphical configuration application, of the bulk-edit user control, the selected group graphical elements including at least one of an animation or a script.

40. The method of any one of aspects 24-39, further comprising automatically maintaining, by the graphical configuration application, a connection of a line graphical element to a shape graphical element included in the draft of the display view configuration while the shape graphical element and/or a location of the shape graphical element on the display view is being modified via the graphical configuration application.

41. The method of any one of aspects 24-40, further comprising: providing, at the user interface of the graphical configuration application, a locking user control; receiving an indication of an activation of the locking user control with respect to a particular graphical element of the one or more graphical elements; and responsive to the reception of the activation of the locking user control, preventing a location of the particular graphical element within the draft display view configuration from being modified absent a reception of an indication of a deactivation of the locking user control with respect to the particular graphical element.

42. The method of any one of aspects 24-41, further comprising: providing, at the user interface of the graphical configuration application, a hide or grey-out user control; receiving an indication of an activation of the hide or grey-out user control with respect to a particular graphical element of the one or more graphical elements; and responsive to the reception of the activation of the hide or grey-out user control, hiding or greying-out the particular graphical element on the user interface of the graphical configuration application.

43. The method of any one of aspects 24-42, further comprising: providing, via the user interface of the graphical configuration application, one or more graphical handles respectively associated with one or more types of graphical elements; receiving an indication of a manipulation, via the user interface of the graphical configuration application, of at least one of the one or more graphical handles; and responsive to the manipulation of the at least one of the one or more graphical handles, automatically modifying one or more properties of corresponding instances of the one or more types of graphical elements.

44. The method of any one of aspects 24-43, wherein presenting the preview of the draft at the display view configuration at the user interface of the graphical configuration application comprises continuously presenting the preview of the draft of the display view configuration at the user face of the graphical configuration application.

45. The method of any one of aspects 24-43, further comprising presenting, via the user interface provided by a graphical configuration application, a preview user control, and receiving an activation of the preview user control prior to publishing the draft of the display view configuration; and wherein presenting the preview of the draft of the display view configuration is responsive to the activation of the preview user control.

46. Any one of the previous aspects in combination with any other one of the previous aspects.

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device), such as illustrated in FIG. 1B. The instructions, when executed by one or more processors of a corresponding device (e.g., a server, a user interface device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A graphical configuration system for a process plant, the graphical configuration system comprising:
    a graphical configuration application executing in a configuration environment of the process plant, the graphical configuration application having a user interface via which a draft of a configuration of a display view is presented, the draft of the configuration of the display view including one or more graphical elements,
    a first graphical element object defining a configuration of a first graphical element of the one or more graphical elements, the first graphical element being a graphic;
    a second graphical element object defining a configuration of a second graphical element of the one or more graphical elements, the second graphical element being an animation;
    the first graphical element object is defined to reference the second graphical element object;
    at least one of an appearance or a behavior of the first graphical element during runtime is defined by the second graphical element object referenced by the first graphical element object;
    the display view configuration defining respective links between one or more graphical elements included on the display view and one or more control elements included in an operating environment of the process plant so that, upon download and execution of the display view at a user interface device included in the operating environment of the process plant, respective indications of one or more values that are generated by the one or more control elements while executing in the operating environment of the process plant to control the process are presented and repeatedly updated at the executing display view; and
    the graphical configuration application providing, on the user interface, a preview user control that, when activated prior to a publication of the configuration of the display view:
        causes a preview of the draft of the configuration of the display view to be generated and simultaneously presented on the user interface in conjunction with the presentation, on the user interface, of the draft of the configuration of the display view, the preview depicting at least one of a runtime appearance or a runtime behavior of the one or more graphical elements included in the draft of the configuration of the display view and depicting respective graphical handles of the at least one of the one or more graphical elements, the at least one of the runtime appearance or the runtime behavior of the one or more graphical elements dynamically responsive to changes in the one or more values generated by the one or more control elements that are included in the operating environment of the process plant and to which the one or more graphical elements are linked, and the at least one of the runtime appearance or the runtime behavior of the one or more graphical elements including a runtime behavior of a draft of the configuration of the animation of the graphic; and causes the presentation of the preview of the draft of the configuration of the display view to be continuously updated responsive to on-canvas editing of the draft of the configuration of the display view as at least a portion of the draft of the configuration of the display view is being graphically defined by a user manipulating or moving the respective graphical handles of the at least one of the one or more graphical elements via the user interface of the graphical configuration application, wherein publications of display view configurations are allowed to be provided to the operating environment of the process control system, and wherein drafts of the configuration of display view are prohibited from being provided to the operating environment of the process control system.

2. The graphical configuration system of claim 1, wherein:

the graphical configuration application further provides, at the user interface of the graphical configuration application, a publish user control that, when activated, publishes the configuration of the display view to thereby generate a particular publication of the configuration of display view; and the preview of the draft of the configuration of the display view within the configuration environment is generated without accessing any published configuration of the display view.

3. The graphical configuration system of claim 1, wherein:

the one or more graphical elements further include a text box and at least one of a datalink or a hyperlink; and the preview of the draft of the configuration of the display view depicts a runtime appearance of a draft of a configuration of the text box, the runtime appearance of the draft of the configuration of the text box including content, obtained via the at least one of the datalink or the hyperlink, presented in-line with static text indicated by the draft of the configuration of the text box.

4. The graphical configuration system of claim 1, wherein the at least the portion of the draft of the configuration of the display view is a first portion of the display view configuration, and wherein:

the second graphical element object includes an animation conversion function object configured to generate at least a second portion of the draft of the configuration of the animation, the animation conversion function object including one or more inputs defining one or more triggering conditions, a logic definition that is applied to the one or more inputs, and an output indicating whether or not the at least the second portion of the animation is to be applied based upon a result of the logic definition applied to the one or more inputs; and the preview of the draft of the configuration of the display view depicting a runtime behavior of the draft of the configuration of the animation of the graphic based on the output of the animation conversion function object that is included in the second graphical element object referenced by the first graphical element object.

5. The graphical configuration system of claim 1, wherein:

the one or more graphical elements further comprise an operator interaction, the operator interaction being an operator interaction user control; and the preview of the draft of the configuration of the display view including the one or more graphical elements is an interactive preview that receives an indication of an activation, via the user interface of the graphical configuration application, of the operator interaction user control, and depicts a respective runtime appearance and/or a respective runtime behavior of a draft of a configuration of the one or more graphical elements responsive to the activation of the operator interaction user control.

6. The graphical configuration system of claim 1, wherein:

a draft of a configuration of the one or more graphical elements is included in the draft of the configuration of the display view;

the draft of the configuration of the display view includes a plurality of operator interactions configured into a subset of a set of graphical elements, each operator interaction included in the plurality of operator interactions being a respective user control configured into a respective graphical element of the subset;

the preview of the draft of the configuration of the display view includes the set of graphical elements; and the graphical configuration application further provides, on the user interface, a show interactions user control that, when activated, distinguishes the subset of graphical elements into which the plurality of operator interactions are respectively configured from other graphical elements of the set of graphical elements depicted by the preview of the draft of the configuration of the display view.

7. The graphical configuration system of claim 1, wherein:

the one or more graphical elements further include a contextual display and a particular user control;

a particular graphical element object defines a configuration of the contextual display indicates a content that is to be presented via the contextual display; and the preview of the draft of the configuration of the display view including the one or more graphical elements is an interactive preview that (i) receives an indication of an activation, via the user interface of the graphical configuration application, of the particular user control, and (ii) responsive to the activation of the particular user control, depicts a runtime appearance of a draft of the configuration of the contextual display including the content presented via the contextual display.

8. The graphical configuration system of claim 1, wherein:

the one or more graphical elements further include a line graphical element configured with one or more properties, the one or more properties including a crossover convention property that indicates a particular style of depicting, on display views, a lack of a physical intersection between respective physical control elements represented by intersecting line graphical elements; and an appearance of an instance of a crossover of the line graphical element automatically adjusts, on the user interface and in response to a change to the one or more other properties of the line graphical element, to accommodate the change to the one or more other properties.

9. The graphical configuration system of claim 1, wherein:
the one or more graphical elements further include a timer graphical element configured with one or more properties, the one or more properties including at least one of an action, a duration, a state of activation, or a trigger condition of the timer graphical element; and
the preview of the draft of the configuration of the display view including the one or more graphical elements depicts a runtime behavior of a draft of a configuration of the one or more graphical elements, the runtime behavior of the draft of the configuration of the one or more graphical elements including the at least one of the action, the duration, the state of activation, or the trigger condition of the timer graphical element.

10. The graphical configuration system of claim 1, wherein:
the one or more graphical elements further include a tabbed display view graphical element including a plurality of tab graphical elements, each tab graphical element configured with a respective tab user control, and each tab graphical element defined to reference a respective display view; and
the preview of the draft of the configuration of the display view including the one or more graphical elements is an interactive preview that (i) receives an activation, via the user interface of the graphical configuration application, of a particular tab user control at a particular tab graphical element, and (ii) responsive to the received activation of the particular tab user control, depicts, at a foreground of the user interface of the graphical configuration application, the respective display view of the particular tab graphical element.

11. The graphical configuration system of claim 10, wherein the each tab graphical element is further defined to change an appearance of at least one visual characteristic of the each tab graphical element responsive to data generated by at least one of the one or more control elements while executing in the operating environment of the process plant.

12. The graphical configuration system of claim 1,
wherein the graphical configuration application further provides, on the user interface, a bulk-edit user control; and
wherein a single activation, via the user interface of the graphical configuration application, of the bulk-edit user control causes a particular property to be respectively applied to a respective draft of a configuration of each graphical element included in a plurality of selected graphical elements, the plurality of selected graphical elements including at least one of the animation, another animation, or a script.

13. The graphical configuration system of claim 1, wherein the graphical configuration application automatically maintains a connection of a line graphical element to a shape graphical element included in a draft of a configuration of the one or more graphical elements during a modification to the shape graphical element via the graphical configuration application.

14. The graphical configuration system of claim 1, wherein the graphical configuration application further provides a locking user control that, when activated with respect to a particular graphical element of the one or more graphical elements presented on the user interface of the graphical configuration application, prevents a location or positioning of the particular graphical element presented on the user interface of the graphical configuration application from being modified absent a deactivation of the locking user control with respect to the particular draft graphical element.

15. The graphical configuration system of claim 1, wherein the graphical configuration application further provides a hide or gray-out user control that, when activated with respect to a particular draft graphical element of the one or more graphical elements, hides or grays-out the particular draft graphical element presented on the user interface of the graphical configuration application.

16. The graphical configuration system of claim 1, wherein respective properties of draft configurations of the at least one of the one or more graphical elements are graphically modifiable by the user manipulating or moving the respective graphical handles via the user interface of the graphical configuration application.

17. A method of configuring a display view for execution in an operating environment of a process plant, the method comprising:
prior to publishing a draft of a configuration of a display view,
the display view configuration defining respective links between one or more graphical elements included on the display view and one or more control elements included in an operating environment of the process plant so that, upon download and execution of the display view at a user interface device included in the operating environment of the process plant, respective runtime appearances and/or respective runtime behaviors of the one or more graphical elements included on the display view are dynamically responsive to changes in one or more values that are generated by the one or more control elements while executing in the operating environment of the process plant to control the process,
a first graphical element object defining a configuration of a first graphical element of the one or more graphical elements, the first graphical element being a graphic, a second graphical element object defining a configuration of a second graphical element of the one or more graphical elements, the second graphical element being an animation, wherein the first graphical element object is defined to reference the second graphical element object, and at least one of an appearance or a behavior of the first graphical element during runtime is defined by the second graphical element object referenced by the first graphical element object;
presenting, at a user interface provided by a graphical configuration application executing in a configuration environment of the process plant, the graphical configuration application having a configuration mode and a preview mode, the draft of the configuration of the display view in the configuration mode of the graphical configuration application; and
simultaneously presenting, at the user interface in conjunction with the presentation of the draft of the configuration of the display view, a preview of the draft of the configuration of the display view in the preview mode of the graphical configuration application, including:
depicting, within the preview of the draft of the configuration of the display view presented on the user interface of the graphical configuration application, (i) the dynamically responsive runtime appearance and/or the dynamically responsive runtime behavior of the first graphical element included in the one or more graphical elements included on the display view, including depicting a runtime behavior of a draft of the configuration of the animation of the graphic, and (ii) one or more graphical handles of the first graphical element; and continuously updating the presentation of the preview of the draft of the configuration of the display view in the preview mode of the graphical configuration application responsive to on-canvas, graphical editing of the draft of the configuration of the display view in the configuration mode of the graphical configuration application via user manipulation or movement, via the user interface provided by the graphical configuration application, of the one or more graphical handles of the first graphical element depicted within the preview of the draft of the configuration of the display view, wherein published display view configurations are allowed to be provided to the operating environment of the process control system, and wherein draft display view configurations are prohibited from being provided to the operating environment of the process control system.

18. The method of claim 17, wherein the method further comprises:

providing, on the user interface of the graphical configuration application, a publish user control;

receiving an indication of an activation of the publish user control;

publishing, based on the received indication of the activation of the publish user control, the draft of the configuration of the display view to generate a particular publication of the display view configuration, the particular publication of the display view configuration included in the published display view configurations allowed to be provided to the operating environment of the process control system; and wherein presenting the preview of the draft of the configuration of the display view comprises generating the preview of the draft of the configuration of the display view without utilizing the particular publication of the display view configuration.

19. The method of claim 17, wherein:

a third graphical element object defines a configuration of a third graphical element of the one or more graphical elements;

a fourth graphical element object defines a configuration of a fourth graphical element of the one or more graphical elements;

the method further comprises receiving, via the user interface of the graphical configuration application, an indication of an inclusion, within the third graphical element object, of a reference to the fourth graphical element object; and depicting the dynamically responsive runtime appearance and/or the dynamically response runtime behavior of the third graphical element comprises presenting the preview of the draft of the configuration of the display view depicting at least one of an appearance or a behavior of the third graphical element as defined by the fourth graphical element object referenced by the third graphical element object.

20. The method of claim 19, wherein:

the third graphical element is a text box and the fourth graphical element is a datalink or a hyperlink; and presenting the preview of the draft of the configuration of the display view includes presenting, within the text box, data obtained via the datalink or the hyperlink in-line with static text indicated by the configuration of the text box.

21. The method of claim 17, wherein the one or more graphical handles of the graphic are displayed in the preview and are associated with at least a portion of the animation of the graphic; and wherein the runtime behavior of the at least the portion of the animation of the graphic is defined via a user manipulation of the one or more graphical handles of the graphic at the user interface of the graphical configuration application to graphically define the configuration of the first graphical element.

22. The method of claim 1, wherein:

the second graphical element object is an animation conversion function object;

the animation conversion function object includes one or more inputs defining one or more triggering conditions, a logic definition that is applied to the one or more inputs, and an output indicating whether or not the animation is to be applied based upon a result of the logic definition applied to the one or more inputs; and presenting the preview of the draft of the configuration of the display view comprises presenting a runtime behavior of the animation of the graphic based on the output of the animation conversion function object referenced by the first graphical element object.

23. The method of claim 19, wherein:

the fourth graphical element comprises an operator interaction, the operator interaction being an operator interaction user control; and presenting the preview of the draft of the configuration of the display view comprises presenting an interactive preview of the draft of the configuration of the display view that (i) receives, via the user interface of the graphical configuration application, an activation of the operator interaction user control, and (ii) responsive to the received activation of the operator interaction user control, depicts a corresponding runtime appearance and/or a corresponding runtime behavior of the draft of the configuration of the display view.

24. The method of claim 17, wherein:

the draft of the configuration of the display view includes a plurality of operator interactions configured into a subset of a set of graphical elements included in the draft of the configuration of the display view, each operator interaction corresponding to a respective user control at a respective graphical element included in the subset; and the method further comprises, upon activation of a show interactions user control provided by the user interface of the graphical configuration application, distinguishing the subset of graphical elements into which the plurality of operator interactions are configured from other graphical elements of the set of graphical elements depicted on the preview of the draft of the configuration of the display view.

25. The method of claim 19, wherein:

the third graphical element is a contextual display and the fourth graphical element object indicates a content for presentation via the contextual display;

the configuration of the third graphical element includes a particular user control that activates the contextual display; and presenting the preview of the draft of the configuration of the display view comprises presenting an interactive preview that (i) receives an indication of an activation, via the user interface of the graphical configuration application, of the particular user control that activates the contextual display, and (ii) responsive to the received indication of the activation of the particular user control that activates the contextual display, depicts a runtime appearance of the contextual display and its content.

26. The method of claim 19, wherein:

the fourth graphical element is a timer configured with one or more properties, the one or more properties including at least one of an action, a duration, a state of activation, or a trigger condition of the timer; and presenting the preview of the draft of the configuration of the display view comprises presenting a runtime behavior of at least one graphical element of the draft of the configuration of the display view based on the at least one of the action, the duration, the state of activation, or the trigger condition of the timer.

27. The method of claim 19, wherein:

the draft of the configuration of the display view includes a tabbed display view graphical element, the tabbed display view graphical element including a plurality of tab graphical elements, each of which is configured with a respective user control, and each of which is defined to reference a respective display view; and presenting the preview of the draft of the configuration of the display view comprises presenting an interactive preview, including:

presenting a respective indication of each tab graphical element of the plurality of tab graphical elements;

receiving, via the user interface of the graphical configuration application, an indication of an activation of a particular tab user control at a particular tab graphical element; and responsive to the received indication of the activation of the particular tab user control, depicting, at a foreground of the user interface of the graphical configuration application, the respective display view of the particular tab graphical element.

28. The method of claim 19, further comprising providing, by the user interface of the graphical configuration application, one or more additional ease-of-use features, the one or additional ease-of-use features including at least one of:

(i) automatically configuring a line graphical element include one or more properties with which the line graphical element has been configured, the one or more properties including a crossover convention property defining a particular style of depicting, on the display view, a lack of a physical intersection between physical control elements represented by the line graphical element and an intersecting line graphical element;

(ii) providing, on the user interface of the graphical configuration application, a bulk-edit user control; and respectively applying a particular property to each graphical element of a selected group of graphical elements responsive to a single activation, via the user interface of the graphical configuration application, of the bulk-edit user control, the selected group graphical elements including at least one of an animation or a script;

(iii) automatically maintaining, by the graphical configuration application, a connection of a line graphical element to a shape graphical element included in the draft of the configuration of the of the display view while the shape graphical element and/or a location of the shape graphical element is being modified via the graphical configuration application;

(iv) providing, at the user interface of the graphical configuration application, a locking user control; receiving an indication of an activation of the locking user control with respect to a first particular graphical element of the one or more graphical elements; and responsive to the reception of the activation of the locking user control, preventing a location of the first particular graphical element within the draft of the configuration of the display view from being modified absent a reception of an indication of a deactivation of the locking user control with respect to the first particular graphical element;

(v) providing, at the user interface of the graphical configuration application, a hide or gray-out user control; receiving an indication of an activation of the hide or gray-out user control with respect to a second particular graphical element of the one or more graphical elements; and responsive to the reception of the activation of the hide or gray-out user control, hiding or graying-out the second particular graphical element on the user interface of the graphical configuration application; or (vi) providing, via the user interface of the graphical configuration application, one or more graphical handles respectively associated with one or more types of graphical elements; receiving an indication of a manipulation, via the user interface of the graphical configuration application, of at least one of the one or more graphical handles associated with the one or more types of graphical elements; and responsive to the manipulation of the at least one of the one or more graphical handles associated with the one or more types of graphical elements, automatically modifying one or more properties of corresponding instances of the one or more types of graphical elements.

29. The method of claim 17, further comprising presenting, via the user interface provided by the graphical configuration application, a preview user control, and receiving an activation of the preview user control prior to publishing the draft of the configuration of the display view; and wherein presenting the preview of the draft of the configuration of the display view in the preview mode of the graphical configuration application is responsive to the activation of the preview user control.

* * * * *